(12) United States Patent
Loehr et al.

(10) Patent No.: US 12,069,714 B2
(45) Date of Patent: *Aug. 20, 2024

(54) LOGICAL CHANNEL PRIORITIZATION PROCEDURE FOR SIDELINK LOGICAL CHANNELS

(71) Applicant: Panasonic Intellectual Property Corporation of America, Torrance, CA (US)

(72) Inventors: Joachim Loehr, Hessen (DE); Prateek Basu Mallick, Hessen (DE); Takako Hori, Kanagawa (JP); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/296,857

(22) Filed: Apr. 6, 2023

(65) Prior Publication Data

US 2023/0309138 A1    Sep. 28, 2023

Related U.S. Application Data

(63) Continuation of application No. 17/229,597, filed on Apr. 13, 2021, now Pat. No. 11,653,379, which is a
(Continued)

(30) Foreign Application Priority Data

Jan. 30, 2015  (EP) ..................................... 15153298
May 15, 2015  (EP) ..................................... 15167898

(51) Int. Cl.
*H04W 72/00*    (2023.01)
*H04L 5/00*    (2006.01)
(Continued)

(52) U.S. Cl.
CPC ........... *H04W 72/56* (2023.01); *H04L 5/0044* (2013.01); *H04W 28/0263* (2013.01);
(Continued)

(58) Field of Classification Search
CPC ........... H04W 72/1268; H04W 72/044; H04W 72/1284; H04W 56/001; H04W 74/0833; H04W 72/02; H04L 5/0032
See application file for complete search history.

(56) References Cited

U.S. PATENT DOCUMENTS 10,142,880 B2    11/2018    Lee et al.
2012/0302272 A1    11/2012    Hakola et al.
(Continued)

FOREIGN PATENT DOCUMENTS

CN    102802209 A    11/2012
CN    104041159 A    9/2014
(Continued)

OTHER PUBLICATIONS

General Dynamics UK Ltd. "Format of the ProSe-BSR," R2-144485, Agenda Item: 7.3.2.2.2, 3GPP TSG-RAN2#87bis, Shanghai, China, Oct. 6-10, 2014. (4 pages).
(Continued)

*Primary Examiner* — Iqbal Zaidi
(74) *Attorney, Agent, or Firm* — Seed IP Law Group LLP

(57) ABSTRACT

A user equipment in a wireless communications system supporting direct communication between user equipments selects a sidelink destination group (ProSe destination) associated with a sidelink logical channel having a highest logical channel priority among sidelink logical channels, which have data available for transmission in a sidelink control period (SC period) and which have not previously been selected in the same SC period, wherein each of the sidelink logical channels belongs to a sidelink destination
(Continued)

group, each of the sidelink logical channels is allocated to a logical channel group (LCG) depending on a priority of said each sidelink logical channel and on a priority of the logical channel group, and the logical channel group is defined per sidelink destination group. The user equipment allocates radio resources to sidelink logical channels belonging to the selected sidelink destination group in decreasing priority order, and transmits the data using the allocated radio resources.

13 Claims, 25 Drawing Sheets

Related U.S. Application Data continuation of application No. 16/514,243, filed on Jul. 17, 2019, now Pat. No. 11,013,015, which is a continuation of application No. 15/603,307, filed on May 23, 2017, now Pat. No. 10,405,327, which is a continuation of application No. PCT/JP2015/006351, filed on Dec. 21, 2015.

(51) Int. Cl.
*H04W 28/02* (2009.01)
*H04W 72/02* (2009.01)
*H04W 72/12* (2023.01)
*H04W 72/51* (2023.01)
*H04W 72/56* (2023.01)

(52) U.S. Cl.
CPC ....... *H04W 28/0278* (2013.01); *H04W 72/00* (2013.01); *H04W 72/51* (2023.01); *H04L 5/0064* (2013.01); *H04L 5/0076* (2013.01); *H04W 72/02* (2013.01); *H04W 72/12* (2013.01)

(56) References Cited

U.S. PATENT DOCUMENTS

| | | | |
|---|---|---|---|
| 2014/0162644 | A1 | 6/2014 | Ou |
| 2014/0241265 | A1 | 8/2014 | Pragada et al. |
| 2014/0301307 | A1 | 10/2014 | Lee et al. |
| 2016/0128082 | A1 | 5/2016 | Chen et al. |
| 2016/0219620 | A1 | 7/2016 | Lee et al. |
| 2017/0019812 | A1 | 1/2017 | Lee et al. |
| 2017/0093541 | A1 | 3/2017 | Pan et al. |
| 2017/0230939 | A1 | 8/2017 | Rudolf et al. |
| 2017/0257876 | A1 | 9/2017 | Loehr et al. |
| 2017/0290028 | A1 | 10/2017 | Lee et al. |
| 2017/0303291 | A1 | 10/2017 | Chae et al. |
| 2018/0139794 | A1* | 5/2018 | Chae .................. H04W 56/002 |

FOREIGN PATENT DOCUMENTS

| | | |
|---|---|---|
| JP | 2018509789 A | 4/2018 |
| WO | 2015023043 A1 | 2/2015 |

OTHER PUBLICATIONS

General Dynamics UK Ltd, "Reporting on res, ource pool utilization," R2-145085, Agenda Item: 7.3.2.3, 3GPP TSG-RAN2#88, San Francisco, Nov. 17-21, 2014. (3 pages).
InterDigital Communications,"Multiple Tx Resource Pools for ProSe Discovery," R2-145211, Agenda Item: 7.3.2.1, 3GPP TSG-RAN WG2 #88, San Francisco, USA, Nov. 17-21, 2014. (4 pages).
Potevio., "D2D Priority of group id," R2-145177, Agenda item: 7.3.3.3, 3GPP TSG-RAN WG2 #88, San Francisco, U.S.A, Nov. 17-21, 2014. (2 pages).
Qualcomm Incorporated, "Signaling for ProSe Direct Communication," R2-144543, Agenda item: 7.3.2.1.4, 3GPP TSG-RAN WG2 #87 Bis, Shanghai, P.R. China, Oct. 6-10, 2014. (7 pages).
ZTE Corporation, "Contents of D2D BSR," R2-143603, Agenda item: 7.4.2.2.2, 3GPP TSG-RAN WG2 Meeting #87, Dresden, Germany, Aug. 18-22, 2014. (2 pages).
3GPP TS 22.179, v.13.0.1, "Mission Critical Push to Talk (MCPTT) over LTE; Stage 1 (Release13)", Jan. 2015.
3GPP TS 22.179, v.13.1.0, "Mission Critical Push to Talk (MCPTT) over LTE; Stage 1 (Release13)", Mar. 2015.
3GPP TS 23.303, v12.3.0, "Proximity-based services (ProSe); Stage2 (Release 12)", Dec. 2014.
3GPP TS 36.211, V8.9.0, "Evolved Universal Terrestrial Radio Access (E-UTRA); Physical Channels and Modulation (Release 8)", Dec. 2009.
3GPP TS 36.300, v12.4.0, "Evolved Universal Terrestrial Radio Access (E-UTRA) and Evolved Universal Terrestrial Radio Access Network (E-UTRAN); Overall description; Stage2 (Release 12)", Dec. 2014.
3GPP TS 36.321, v12.4.0, "Evolved Universal Terrestrial Radio Access (E-UTRA); Medium Access Control (MAC) protocol specification (Release 12)", Dec. 2014.
3GPP TS 36.331, V12.5.0, "Evolved Universal Terrestrial Radio Access (E-UTRA); Radio Resource Control (RRC); Protocol specification (Release12)", Mar. 2015.
3GPP TSG-RAN WG2 #87, "ProSe BSR content", R2-143215, Aug. 2014.
3GPP TSG-RAN WG2 #88, "Resource pool selection with group priority", R2-145078, Nov. 2014.
3GPP TSG-RAN WG2 #88, R2-145064, Nov. 2014.
3GPP TSG-RAN WG2 #89bis, "Support for MCPTT priority requirements for Rel-3", R2-151617, Apr. 2015.
3GPP TSG-RAN WG2 #91, "Report of the LTE break-out session (ProSe and eDRX)", R2-153885, Aug. 2015.
ASUSTeK, "Discussion of multiple SA transmission in mode 2 D2D communication," R1-144287, Agenda Item: 7.2.1.2.7, 3GPP TSG RAN WG1 Meeting #78bis, Ljubljana, Slovenia, Oct. 6-10, 2014, 3 pages.
Communication pursuant to Article 94(3) EPC, dated Feb. 9, 2018, for the related European Patent Application No. 15153298.3-1219, 6 pages.
English Translation of Chinese Search Report dated Aug. 19, 2019 for the related Chinese Patent Application No. 201580057179.7.
Ericsson, "Introduction of ProSe," R2-145064, 3GPP TSG-RAN WG2 Meeting #88, San Francisco, USA, Nov. 17-21, 2014, 26 pages.
Ericsson, "ProSe communication and Group priority," Tdoc R2-145137, 3GPP TSG-RAN WG2 #88, Agenda Item: 7.3.3.2, San Francisco, USA, Nov. 17-21, 2014, 4 pages.
Ericsson, "ProSe Group Priorities in Rel-12," R3-142915, Agenda Item: 15, 3GPP TSG- RAN WG3 #86, San Francisco, USA, Nov. 17-21, 2014, 3 pages.
ETRI, "ProSe BSR handling for D2D Communication," R2-145016, Agenda Item: 7.3.3.3, 3GPP TSG-RAN WG2 Meeting #88, San Francisco, USA, Nov. 17-21, 2014, 3 pages.
Indian Examination Report dated Mar. 5, 2021 for the related Indian Patent Application No. 201747013982, 6 pages.
Intel Corporation, "ProSe BSR content," R2-143215, 3GPP TSG-RAN WG2 Meeting #87, Agenda Item: 7.4.2.1, Dresden, Germany, Aug. 18-22, 2014, 2 pages.
InterDigital Communications, Multiple Transmission Pools for ProSe Communications, R2-145204, Agenda Item: 7.3.2.1, 3GPP TSG-RAN WG2 #88, San Francisco, USA, Nov. 17-21, 2014, 3 pages.
International Search Report of PCT application No. PCT/JP2015/006351 dated Mar. 22, 2016.
LG Electronics Inc., "Resource pool selection with group priority," R2-145078, Agenda item: 7.3.2.1, 3GPP TSG-RAN WG2 #88, San Francisco, USA, Nov. 17-21, 2014, 2 pages.
Samsung: "Group Priority Handling", 3GPP Draft; R2-151207, 3rd Generation Partnership Project (3GPP), Mobile Competence Centre; 650, Route Des Lucioles ; F-06921 Sophia-Antipolis Cedex ; France, vol. RAN WG2, No. Bratislava, Slovakia; Apr. 20, 2015-Apr. 24, 2015 Apr. 19, 2015 (Apr. 19, 2015), XP050936168.

(56) References Cited

OTHER PUBLICATIONS

Sony, "Discovery/Communication Resource Pool Priority Information," R2-144864, Agenda item: 7.3.2.1, 3GPP TSG-RAN WG2 Meeting #88, San Francisco, USA, Nov. 17-21, 2014, 1 page.
The Extended European Search Report dated Nov. 15, 2021 for the related European Patent Application No. 21189291.4.

* cited by examiner

FIG. 11
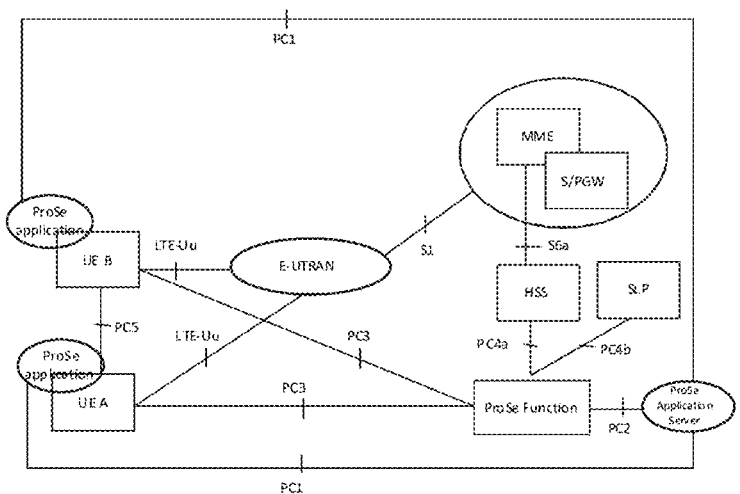
FIG. 12
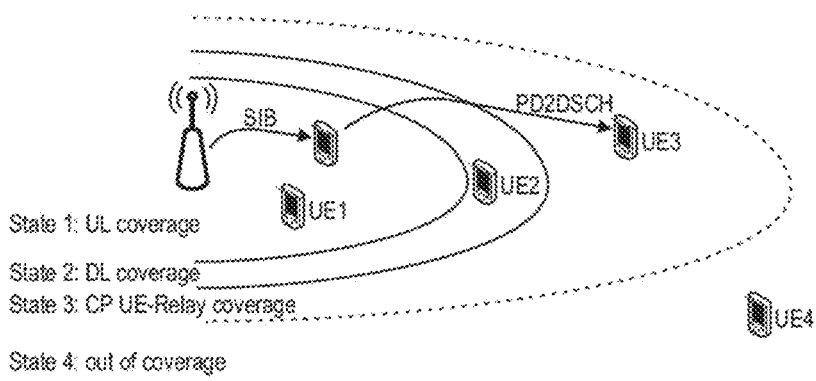
State 1: UL coverage
State 2: DL coverage
State 3: CP UE-Relay coverage
State 4: out of coverage
FIG. 13
| Group index$_1$ | LCG ID$_1$ | Buffer Size$_1$ | Oct 1 |
| Buffer Size$_1$ | Group index$_2$ | | Oct 2 |
| LCG ID$_2$ | Buffer Size$_2$ | | Oct 3 |
...
| Group index$_{N-1}$ | LCG ID$_{N-1}$ | Buffer Size$_{N-1}$ | Oct 1.5*N-2 |
| Buffer Size$_{N-1}$ | Group index$_N$ | | Oct 1.5*N-1 |
| LCG ID$_N$ | Buffer Size$_N$ | | Oct 1.5*N |

| Group index$_1$ | LCG ID$_1$ | Buffer Size (LCH#1) | | | | Oct 1 |
| Buffer Size (LCH#1) | Group index$_1$ | | | | | Oct 2 |
| LCG ID$_2$ | Buffer Size (LCH#2) | | | | | Oct 3 |
| Group index$_2$ | LCG ID$_2$ | Buffer Size (LCH#3) | | | | Oct 4 |
| Buffer Size (LCH#3) | R | R | R | R | | Oct 5 |

LOGICAL CHANNEL PRIORITIZATION PROCEDURE FOR SIDELINK LOGICAL CHANNELS

BACKGROUND

1. Technical Field

The present disclosure relates to methods for allocating radio resources to sidelink logical channels when performing a logical channel prioritization procedure. The present disclosure is also providing the user equipment for participating in the methods described herein.

2. Description of the Related Art

Long Term Evolution (LTE)

The specification of Long-Term Evolution (LTE) has been finalized as Release 8 (LTE Rel. 8) as a system following the 3rd Generation Partnership Project (3GPP) Universal Mobile Terrestrial Network. The LTE system represents efficient packet-based radio access that provides full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA) based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

LTE Architecture

The overall architecture is shown in FIG. 1 and a more detailed representation of the E-UTRAN architecture is given in FIG. 2. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle state user equipments, the SGW terminates the downlink data path and triggers paging when downlink data arrives for the user equipment. It manages and stores user equipment contexts, e.g. parameters of the IP bearer service, network internal routing information. It also performs replication of the user traffic in case of lawful interception.

The MME is the key control-node for the LTE access-network. It is responsible for idle mode user equipment tracking and paging procedure including retransmissions. It is involved in the bearer activation/deactivation process and is also responsible for choosing the SGW for a user equipment at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE

The downlink component carrier of a 3GPP LTE system is subdivided in the time-frequency domain in so-called subframes. In 3GPP LTE each subframe is divided into two downlink slots, wherein the first downlink slot includes the control channel region (PDCCH region) within the first OFDM symbols. Each subframe consists of a give number of OFDM symbols in the time domain (12 or 14 OFDM symbols in 3GPP LTE (Release 8)), wherein each OFDM symbol spans over the entire bandwidth of the component carrier. The OFDM symbols thus each consists of a number of modulation symbols transmitted on respective subcarriers as also shown in FIG. 3.

Assuming a multi-carrier communication system, e.g. employing OFDM, as for example used in 3GPP Long Term Evolution (LTE), the smallest unit of resources that can be assigned by the scheduler is one "resource block". A physical resource block (PRB) is defined as consecutive OFDM symbols in the time domain (e.g. 7 OFDM symbols) and consecutive subcarriers in the frequency domain as exemplified in FIG. 3 (e.g. 12 subcarriers for a component carrier). In 3GPP LTE (Release 8), a physical resource block thus consists of resource elements, corresponding to one slot in the time domain and 180 KHz in the frequency domain (for further details on the downlink resource grid, see for example 3GPP TS 36.211, "Evolved Universal Terrestrial Radio Access (E-UTRA); Physical Channels and Modulation (Release 8)", Section 6.2, available at www.3gpp.org, and incorporated herein by reference).

One subframe consists of two slots, so that there are 14 OFDM symbols in a subframe when a so-called "normal" CP (cyclic prefix) is used, and 12 OFDM symbols in a subframe when a so-called "extended" CP is used. For sake of terminology, in the following the time-frequency resources equivalent to the same consecutive subcarriers spanning a full subframe is called a "resource block pair", or equivalent "RB pair" or "PRB pair".

The term "component carrier" refers to a combination of several resource blocks in the frequency domain. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Similar assumptions for the component carrier structure apply to later releases too.

Carrier Aggregation in LTE-A for Support of Wider Bandwidth

In carrier aggregation available in LTE from Release 10 on, two or more component carriers are aggregated in order to support wider transmission bandwidths up to 100 MHz. Several cells in the LTE system are aggregated into one wider channel in the LTE-Advanced system which is wide enough for 100 MHz even though these cells in LTE may be in different frequency bands.

All component carriers can be configured to be LTE Rel. 8/9 compatible, at least when the bandwidth of a component carrier do not exceed the supported bandwidth of a LTE Rel. 8/9 cell. Not all component carriers aggregated by a user equipment may necessarily be Rel. 8/9 compatible. Existing mechanism (e.g. barring) may be used to avoid Rel-8/9 user equipments to camp on a component carrier.

A user equipment may simultaneously receive or transmit one or multiple component carriers (corresponding to multiple serving cells) depending on its capabilities. A LTE-A Rel. 10 user equipment with reception and/or transmission capabilities for carrier aggregation can simultaneously receive and/or transmit on multiple serving cells, whereas an LTE Rel. 8/9 user equipment can receive and transmit on a single serving cell only, provided that the structure of the component carrier follows the Rel. 8/9 specifications.

Carrier aggregation is supported for both contiguous and non-contiguous component carriers with each component carrier limited to a maximum of 110 Resource Blocks in the frequency domain using the 3GPP LTE (Release 8/9) numerology. It is possible to configure a 3GPP LTE-A (Release 10) compatible user equipment to aggregate a different number of component carriers originating from the same eNodeB (base station) and of possibly different bandwidths in the uplink and the downlink. The number of downlink component carriers that can be configured depends on the downlink aggregation capability of the UE. Conversely, the number of uplink component carriers that can be configured depends on the uplink aggregation capability of the UE. It may currently not be possible to configure a mobile terminal with more uplink component carriers than downlink component carriers.

The spacing between center frequencies of contiguously aggregated component carriers shall be a multiple of 300 kHz. This is in order to be compatible with the 100 KHz frequency raster of 3GPP LTE (Release 8/9) and at the same time preserve orthogonality of the subcarriers with 15 kHz spacing. Depending on the aggregation scenario, the n*300 kHz spacing can be facilitated by insertion of a low number of unused subcarriers between contiguous component carriers.

The nature of the aggregation of multiple carriers is only exposed up to the MAC layer. For both uplink and downlink there is one HARQ entity required in MAC for each aggregated component carrier. There is (in the absence of SU-MIMO for uplink) at most one transport block per component carrier. A transport block and its potential HARQ retransmissions need to be mapped on the same component carrier.

LTE Layer 2—User Plane and Control Plane Protocol Stack

The LTE layer 2 user-plane/control-plane protocol stack includes three sublayers as shown in FIG. 4, PDCP, RLC and MAC. At the transmitting side, each layer receives a Service Data Unit, SDU, from a higher layer for which the layer provides a service and outputs a PDU to the layer below. The RLC layer receives packets from the PDCP layer. These packets are called PDCP PDUs from a PDCP point of view and represent RLC SDUs from an RLC point of view. The RLC layer creates packets which are provided to the layer below, i.e. the MAC layer. The packets provided by RLC to the MAC layer are RLC PDUs from an RLC point of view and MAC SDUs from a MAC point of view.

At the receiving side, the process is reversed, with each layer passing SDUs up to the layer above, where they are received as PDUs.

While the physical layer essentially provides a bitpipe, protected by turbo-coding and a cyclic redundancy check (CRC), the link-layer protocols enhance the service to upper layers by increased reliability, security and integrity. In addition, the link layer is responsible for the multi-user medium access and scheduling. One of the main challenges for the LTE link-layer design is to provide the required reliability levels and delays for Internet Protocol (IP) data flows with their wide range of different services and data rates. In particular, the protocol over-head must scale. For example, it is widely assumed that voice over IP (VOIP) flows can tolerate delays on the order of 100 ms and packet losses of up to 1 percent. On the other hand, it is well-known that TCP file downloads perform better over links with low bandwidth-delay products. Consequently, downloads at very high data rates (e.g., 100 Mb/s) require even lower delays and, in addition, are more sensitive to IP packet losses than VoIP traffic.

Overall, this is achieved by the three sublayers of the LTE link layer that are partly intertwined.

The Packet Data Convergence Protocol (PDCP) sublayer is responsible mainly for IP header compression and ciphering. In addition, it supports lossless mobility in case of inter-eNB handovers and provides integrity protection to higher layer-control protocols.

The radio link control (RLC) sublayer includes mainly ARQ functionality and supports data segmentation and concatenation. The latter two minimize the protocol overhead independent of the data rate.

Finally, the medium access control (MAC) sublayer provides HARQ and is responsible for the functionality that is required for medium access, such as scheduling operation and random access. FIG. 5 exemplary depicts the data flow of an IP packet through the link-layer protocols down to the physical layer. The figure shows that each protocol sublayer adds its own protocol header to the data units.

Uplink Access Scheme for LTE

For uplink transmission, power-efficient user-terminal transmission is necessary to maximize coverage. Single-carrier transmission combined with FDMA with dynamic bandwidth allocation has been chosen as the evolved UTRA uplink transmission scheme. During each time interval, Node B assigns users a unique time/frequency resource for transmitting user data, thereby ensuring intra-cell orthogonality. An orthogonal access in the uplink promises increased spectral efficiency by eliminating intra-cell interference. Interference due to multipath propagation is handled at the base station (Node B), aided by insertion of a cyclic prefix in the transmitted signal.

The basic physical resource used for data transmission consists of a frequency resource of size BWgrant during one time interval, e.g. a sub-frame of 0.5 ms, onto which coded information bits are mapped. It should be noted that a sub-frame, also referred to as transmission time interval (TTI), is the smallest time interval for user data transmission. It is however possible to assign a frequency resource BWgrant over a longer time period than one TTI to a user by concatenation of sub-frames.

UL Scheduling Scheme for LTE

The uplink scheme allows for both scheduled access, i.e. controlled by eNB, and contention-based access.

In case of scheduled access, the UE is allocated a certain frequency resource for a certain time (i.e. a time/frequency resource) for uplink data transmission. However, some time/frequency resources can be allocated for contention-based access. Within these time/frequency resources, UEs can transmit without first being scheduled. One scenario where UE is making a contention-based access is for example the random access, i.e. when UE is performing initial access to a cell or for requesting uplink resources.

For the scheduled access the Node B scheduler assigns a user a unique frequency/time resource for uplink data transmission. More specifically the scheduler determines which UE(s) is (are) allowed to transmit, which physical channel resources (frequency), and the transport format (Modulation Coding Scheme (MCS)) to be used by the mobile terminal for transmission.

The allocation information is signaled to the UE via a scheduling grant, sent on the L1/L2 control channel (called "uplink grant channel" in the following). A scheduling grant message contains information which part of the frequency band the UE is allowed to use, the validity period of the grant, and the transport format the UE has to use for the upcoming uplink transmission. The shortest validity period is one sub-frame. Additional information may also be included in the grant message for the UE, depending on the selected scheme. The UE then distributes the allocated resources among its radio bearers according to some rules. The eNB decides the transport format based on some information, e.g. reported scheduling information and QoS info, and the UE has to follow the selected transport format. Since the scheduling of radio resources is the most important function in a shared-channel access network for determining Quality of Service, there are a number of requirements that should be fulfilled by the UL scheduling scheme for LTE in order to allow for an efficient QoS management.

Starvation of low priority services should be avoided. Starvation means that the data from the low-priority logical channels cannot be transmitted because the data from high-priority logical channels take up all the MAC PDU space;

Clear QoS differentiation for radio bearers/services should be supported by the scheduling scheme;

The UL reporting should allow fine granular buffer reports (e.g. per radio bearer or per radio bearer group) in order to allow the eNB scheduler to identify for which Radio Bearer/service data is to be sent;

It should be possible to make clear QoS differentiation between services of different users; and It should be possible to provide a minimum bit rate per radio bearer.

As can be seen from the above list, one essential aspect of the LTE scheduling scheme is to provide mechanisms with which the operator can control the partitioning of its aggregated cell capacity between the radio bearers of the different QoS classes.

Logical Channel Prioritization, LCP, Procedure

For the uplink the process by which a UE creates a MAC PDU to transmit using the allocated radio resources is fully standardized; this is designed to ensure that the UE satisfies the QoS of each configured radio bearer in a way which is optimal and consistent between different UE implementations. Based on the uplink transmission resource grant message signaled on the PDCCH, the UE has to decide on the amount of data for each logical channel to be included in the new MAC and, if necessary, also to allocate space for a MAC Control Element.

In constructing a MAC PDU with data from multiple logical channels, the simplest and most intuitive method is the absolute priority-based method, where the MAC PDU space is allocated to logical channels in decreasing order of logical channel priority. This is, data from the highest priority logical channel are served first in the MAC PDU, followed by data from the next highest priority logical channel, continuing until the MAC PDU space runs out. Although the absolute priority-based method is quite simple in terms of UE implementation, it sometimes leads to starvation of data from low-priority logical channels.

In LTE, a Prioritized Bit Rate (PBR) is defined for each logical channel, in order to transmit data in order of importance but also to avoid starvation of data with lower priority. The PBR is the minimum data rate guaranteed for the logical channel. Even if the logical channel has low priority, at least a small amount of MAC PDU space is allocated to guarantee the PBR. Thus, the starvation problem can be avoided by using the PBR.

Constructing a MAC PDU with PBR consists of two rounds. In the first round, each logical channel is served in decreasing order of logical channel priority, but the amount of data from each logical channel included in the MAC PDU is initially limited to the amount corresponding to the configured PBR value of the logical channel. After all logical channels have been served up to their PBR values, if there is room left in the MAC PDU, the second round is performed. In the second round, each logical channel is served again in decreasing order of priority. The major difference for the second round compared to the first round is that each logical channel of lower priority can be allocated with MAC PDU space only if all logical channels of higher priority have no more data to transmit.

A MAC PDU may include not only the MAC SDUs from each configured logical channel but also a MAC CE (Control Elements). Except for a Padding BSR (Buffer Status Report), the MAC CE has a higher priority than a MAC SDU from the logical channels because it controls the operation of the MAC layer. Thus, when a MAC PDU is composed, the MAC CE, if it exists, is the first to be included, and the remaining space is used for MAC SDUs from the logical channels. Then, if additional space is left and it is large enough to include a BSR, a Padding BSR is triggered and included in the MAC PDU.

The Logical Channel Prioritization for uplink is standardized e.g. in 3GPP TS 36.321, "Evolved Universal Terrestrial Radio Access (E-UTRA); Medium Access Control (MAC) protocol specification", (latest version v12.4.0) in Section 5.4.3.1, available at www.3gpp.org, and incorporated herein.

The Logical Channel Prioritization (LCP) procedure is applied when a new transmission of a transport block is performed (i.e. not at retransmissions of the same data).

RRC controls the scheduling of uplink data by signaling for each logical channel:
priority where an increasing priority value indicates a lower priority level;
prioritisedBitRate which sets the Prioritized Bit Rate (PBR); and
bucketSizeDuration which sets the Bucket Size Duration (BSD).

The UE shall maintain a variable Bj for each logical channel j. Bj shall be initialized to zero when the related logical channel is established, and incremented by the product PBR×TTI duration for each TTI, where PBR is Prioritized Bit Rate of logical channel j. However, the value of Bj can never exceed the bucket size, and if the value of Bj is larger than the bucket size of logical channel j, it shall be set to the bucket size. The bucket size of a logical channel is equal to PBR*BSD, where PBR and BSD are configured by upper layers.

The UE (MAC entity) shall perform the following Logical Channel Prioritization procedure when a new transmission is performed:
The UE (MAC entity) shall allocate resources to the logical channels in the following steps:
Step 1: All the logical channels with Bj>0 are allocated resources in a decreasing priority order. If the PBR of a radio bearer is set to "infinity", the UE shall allocate resources for all the data that is available for transmission on the radio bearer before meeting the PBR of the lower priority radio bearer(s);
Step 2: the UE (MAC entity) shall decrement Bj by the total size of MAC SDUs served to logical channel j in Step 1,
NOTE: The value of Bj can be negative; and
Step 3: if any resources remain, all the logical channels are served in a strict decreasing priority order (regardless of the value of Bj) until either the data for that logical channel or the UL grant is exhausted, whichever comes first. Logical channels configured with equal priority should be served equally.

The UE (MAC entity) shall also follow the rules below during the scheduling procedures above:
The UE (MAC entity) should not segment an RLC SDU (or partially transmitted SDU or retransmitted RLC PDU) if the whole SDU (or partially transmitted SDU or retransmitted RLC PDU) fits into the remaining resources;
if the UE (MAC entity) segments an RLC SDU from the logical channel, it shall maximize the size of the segment to fill the grant as much as possible;
the UE (MAC entity) should maximize the transmission of data; and
if the UE (MAC entity) is given an UL grant size that is equal to or larger than 4 bytes while having data available for transmission, the UE (MAC entity) shall not transmit only padding BSR and/or padding (unless the UL grant size is less than 7 bytes and an AMD PDU segment needs to be transmitted).

The UE shall not transmit data for a logical channel corresponding to a radio bearer that is suspended (the conditions for when a radio bearer is considered suspended are defined in 3GPP TS 36.331, 12.5.0, "Evolved Universal Terrestrial Radio Access (E-UTRA); Radio Resource Control (RRC); Protocol specification", available at www.3gpp.org).

For the Logical Channel Prioritization procedure, the UE shall take into account the following relative priority in decreasing order:

MAC control element for C-RNTI or data from UL-CCCH;
MAC control element for BSR, with exception of BSR included for padding;
MAC control element for PHR or Extended PHR, or Dual Connectivity PHR;
data from any Logical Channel, except data from UL-CCCH; and
MAC control element for BSR included for padding.

When the UE is requested to transmit multiple MAC PDUs in one TTI, steps 1 to 3 and the associated rules may be applied either to each grant independently or to the sum of the capacities of the grants. Also the order in which the grants are processed is left up to UE implementation. It is up to the UE implementation to decide in which MAC PDU a MAC control element is included when the UE is requested to transmit multiple MAC PDUs in one TTI.

Buffer Status Reporting

The usual mode of scheduling is dynamic scheduling, by means of downlink assignment messages for the allocation of downlink transmission resources and uplink grant messages for the allocation of uplink transmission resources; these are usually valid for specific single subframes. They are transmitted on the PDCCH using the C-RNTI of the UE. Dynamic scheduling is efficient for services types in which the traffic is bursty and dynamic in rate, such as TCP.

In addition to the dynamic scheduling, a persistent scheduling is defined, which enables radio resources to be semi-statically configured and allocated to a UE for a longer time period than one subframe, thus avoiding the need for specific downlink assignment messages or uplink grant messages over the PDCCH for each subframe. Persistent scheduling is useful for services such as VoIP for which the data packets are small, periodic and semi-static in size. Thus, the overhead of the PDCCH is significantly reduced compared to the case of dynamic scheduling.

Buffer status reports (BSR) from the UE to the eNodeB are used to assist the eNodeB in allocating uplink resources, i.e. uplink scheduling. For the downlink case, the eNB scheduler is obviously aware of the amount of data to be delivered to each UE; however, for the uplink direction, since scheduling decisions are done at the eNB and the buffer for the data is in the UE, BSRs have to be sent from the UE to the eNB in order to indicate the amount of data that needs to be transmitted over the UL-SCH.

Buffer Status Report MAC control elements for LTE consist of either: a long BSR (with four buffer size fields corresponding to LCG IDs #0-3) or a short BSR (with one LCG ID field and one corresponding buffer size field). The buffer size field indicates the total amount of data available across all logical channels of a logical channel group, and is indicated in number of bytes encoded as an index of different buffer size levels (see also 3GPP TS 36.321, "Evolved Universal Terrestrial Radio Access (E-UTRA); Medium Access Control (MAC) protocol specification" v 12.4.0 Section 6.1.3.1, available at www.3gpp.org, and incorporated herewith by reference).

Which one of either the short or the long BSR is transmitted by the UE depends on the available transmission resources in a transport block, on how many groups of logical channels have non-empty buffers and on whether a specific event is triggered at the UE. The long BSR reports the amount of data for four logical channel groups, whereas the short BSR indicates the amount of data buffered for only the highest logical channel group.

The reason for introducing the logical channel group concept is that even though the UE may have more than four logical channels configured, reporting the buffer status for each individual logical channel would cause too much signaling overhead. Therefore, the eNB assigns each logical channel to a logical channel group; preferably, logical channels with same/similar QoS requirements should be allocated within the same logical channel group.

In order to be robust against transmission failures, there is a BSR retransmission mechanism defined for LTE; the retransmission BSR timer is started or restarted whenever an uplink grant is restarted; if no uplink grant is received before the retransmission BSR timer expires, another BSR is triggered by the UE.

A BSR is triggered for events, such as:
Whenever data arrives for a logical channel, which has a higher priority than the logical channels whose buffer are non-empty (i.e. whose buffer previously contained data);
Whenever data becomes available for any logical channel, when there was previously no data available for transmission (i.e. all buffers previously empty);
Whenever the retransmission BSR time expires;
Whenever periodic BSR reporting is due, i.e. periodicBSR timer expires; and
Whenever there is a spare space in a transport block which can accommodate a BSR.

More detailed information with regard to BSR and in particular the triggering of same is explained in the specification 3GPP TS 36.321 v12.4.0 in Section 5.4.5, available at www.3gpp.org, and incorporated herewith by reference.

If the UE has no uplink resources allocated for including a BSR in the transport block when a BSR is triggered, the UE sends a scheduling request (SR) to the eNodeB so as to be allocated with uplink resources to transmit the BSR. Either a single-bit scheduling request is sent over the PUCCH (dedicated scheduling request, D-SR), or the random access procedure (RACH) is performed to request an allocation of an uplink radio resource for sending a BSR.

LTE Device to Device (D2D) Proximity Services (ProSe)

Proximity-based applications may be used in areas including services related to commercial services and Public Safety that would be of interest to operators and users. Device-to-Device (D2D) communication is a technology component for LTE-Rel. 12 which enables direct communication between user terminals without the traffic passing any base station. The Device-to-Device (D2D) communication technology allows D2D as an underlay to the cellular network to increase the spectral efficiency. For example, if the cellular network is LTE, all data carrying physical channels use SC-FDMA for D2D signaling.

D2D Communication in LTE

The D2D communication in LTE is focusing on two areas: Discovery and Communication.

ProSe (Proximity based Services) Direct Discovery is defined as the procedure used by the ProSe-enabled UE to discover other ProSe-enabled UE(s) in its proximity using E-UTRA direct radio signals via the PC5 interface. FIG. 6 schematically illustrates a PC5 interface for device-to-device direct discovery between UE A and UE B. It also schematically illustrates a Radio Protocol Stack (AS) for ProSe Direct Discovery including the physical layer, the L2 radio protocol (which can be MAC) and a ProSe protocol of a "higher layer".

In D2D communication UEs transmit data signals to each other over a direct link using the cellular resources instead of through the base station (BS). D2D users communicate directly while remaining controlled under the BS, i.e. at least when being in coverage of an eNB. Therefore, D2D can improve system performances by reusing cellular resources.

It is assumed that D2D operates in the uplink LTE spectrum (in the case of FDD) or uplink sub-frames of the cell giving coverage (in case of TDD, except when out of coverage). Furthermore, D2D transmission/reception does not use full duplex on a given carrier. From individual UE perspective, on a given carrier D2D signal reception and LTE uplink transmission do not use full duplex, i.e. no simultaneous D2D signal reception and LTE UL transmission is possible.

In D2D communication when one particular UE1 has a role of transmission (transmitting user equipment or transmitting terminal), UE1 sends data, and another UE2 (receiving user equipment) receives it. UE1 and UE2 can change their transmission and reception role. The transmission from UE1 can be received by one or more UEs like UE2.

With respect to the User plane protocols, in the following part of the agreement from D2D communication perspective is given (see also 3GPP TR 36.843, current version 12.0.1, "Study on LTE device to device proximity services; Radio aspects", Section 9.2.2, available at www.3gpp.org incorporated herein by reference):

PDCP:
1:M (one device transmits to M devices, M being an integer) D2D broadcast communication data (i.e. IP packets) should be handled as the normal user-plane data; and
Header-compression/decompression in PDCP is applicable for 1:M D2D broadcast communication,
U-Mode is used for header compression in PDCP for D2D broadcast operation for public safety.

RLC:
RLC UM is used for 1:M D2D broadcast communication;
Segmentation and Re-assembly is supported on L2 by RLC UM;
A receiving UE needs to maintain at least one RLC UM entity per transmitting peer UE;
An RLC UM receiver entity does not need to be configured prior to reception of the first RLC UM data unit; and
So far no need has been identified for RLC AM or RLC TM for D2D communication for user plane data transmission.

MAC:
No HARQ feedback is assumed for 1:M D2D broadcast communication;
The receiving UE needs to know a source ID in order to identify the receiver RLC UM entity;
The MAC header includes a L2 target ID which allows filtering out packets at MAC layer;
The L2 target ID may be a broadcast, group cast or unicast address:
L2 Groupcast/Unicast: A L2 target ID carried in the MAC header would allow discarding a received RLC UM PDU even before delivering it to the RLC receiver entity; and
L2 Broadcast: A receiving UE would process all received RLC PDUs from all transmitters and aim to re-assemble and deliver IP packets to upper layers;
MAC sub header contains LCIDs (to differentiate multiple logical channels); and
At least Multiplexing/de-multiplexing, priority handling and padding are useful for D2D.

ProSe Direct Communication Related Identities
3GPP TS 36.300, "Evolved Universal Terrestrial Radio Access (E-UTRA) and Evolved Universal Terrestrial Radio Access Network (E-UTRAN); Overall description; Stage 2", current version 12.4.0, available at www.3gpp.org, defines in Section 8.3 the following identities to use for ProSe Direct Communication:

SL-RNTI: Unique identification used for ProSe Direct Communication Scheduling;

Source Layer-2 ID: Identifies the sender of the data in sidelink ProSe Direct Communication. The Source Layer-2 ID is 24 bits long and is used together with ProSe Layer-2 Destination ID and LCID for identification of the RLC UM entity and PDCP entity in the receiver; and Destination Layer-2 ID: Identifies the target of the data in sidelink ProSe Direct Communication. The Destination Layer-2 ID is 24 bits long and is split in the MAC layer into two bit strings:

One bit string is the LSB part (8 bits) of Destination Layer-2 ID and forwarded to physical layer as Sidelink Control Layer-1 ID. This identifies the target of the intended data in Sidelink Control and is used for filtering of packets at the physical layer; and Second bit string is the MSB part (16 bits) of the Destination Layer-2 ID and is carried within the MAC header. This is used for filtering of packets at the MAC layer.

No Access Stratum signaling is required for group formation and to configure Source Layer-2 ID, Destination Layer-2 ID and Sidelink Control L1 ID in the UE. These identities are either provided by higher layer or derived from identities provided by higher layer. In case of groupcast and broadcast, the ProSe UE ID provided by higher layer is used directly as the Source Layer-2 ID, and the ProSe Layer-2 Group ID provided by higher layer is used directly as the Destination Layer-2 ID in the MAC layer.

Radio Resource Allocation for Proximity Services

From the perspective of a transmitting UE, a Proximity-Services-enabled UE (ProSe-enabled UE) can operate in two modes for resource allocation:

Mode 1 refers to the eNB-scheduled resource allocation, where the UE requests transmission resources from the eNB (or Release-10 relay node), and the eNodeB (or Release-10 relay node) in turn schedules the exact resources used by a UE to transmit direct data and direct control information (e.g. Scheduling Assignment). The UE needs to be RRC_CONNECTED in order to transmit data. In particular, the UE sends a scheduling request (D-SR or Random Access) to the eNB followed by a buffer status report (BSR) in the usual manner (see also following chapter "Transmission procedure for D2D communication"). Based on the BSR, the eNB can determine that the UE has data for a ProSe Direct Communication transmission, and can estimate the resources needed for transmission.

On the other hand, Mode 2 refers to the UE-autonomous resource selection, where a UE on its own selects resources (time and frequency) from resource pool(s) to transmit direct data and sidelink control information (i.e. SA). One resource pool is defined e.g. by the content of SIB18, namely by the field commTxPoolNormalCommon, this particular resource pool being broadcast in the cell, and then commonly available for all UEs in the cell still in RRC_Idle state. Effectively, the eNB may define up to four different instances of said pool, respectively four resource pools for the transmission of SA messages and direct data. However, a UE shall always use the first resource pool defined in the list, even if it was configured with multiple resource pools for Release 12 LTE. Later versions of the standard may handle differently.

As an alternative, another resource pool can be defined by the eNB and signaled in SIB18, namely by using the field commTxPoolExceptional, which can be used by the UEs in exceptional cases.

What resource allocation mode a UE is going to use is configurable by the eNB. Furthermore, what resource allocation mode a UE is going to use for D2D data communication may also depend on the RRC state, i.e. RRC_IDLE or RRC_CONNECTED, and the coverage state of the UE, i.e. in-coverage, out-of-coverage. A UE is considered in-coverage if it has a serving cell (i.e. the UE is RRC_CONNECTED or is camping on a cell in RRC_IDLE).

The following rules with respect to the resource allocation mode apply for the UE:

If the UE is out-of-coverage, it can only use Mode 2;

If the UE is in-coverage, it may use Mode 1 if the eNB configures it accordingly; and If the UE is in-coverage, it may use Mode 2 if the eNB configures it accordingly.

When there are no exceptional conditions, UE may change from Mode 1 to Mode 2 or vice-versa only if it is configured by eNB to do so. If the UE is in-coverage, it shall use only the mode indicated by eNB configuration unless one of the exceptional cases occurs;

The UE considers itself to be in exceptional conditions e.g. while T311 or T301 is running; and When an exceptional case occurs the UE is allowed to use Mode 2 temporarily even though it was configured to use Mode 1.

While being in the coverage area of an E-UTRA cell, the UE shall perform ProSe Direct Communication Transmission on the UL carrier only on the resources assigned by that cell, even if resources of that carrier have been pre-configured e.g. in UICC (Universal Integrated Circuit Card).

For UEs in RRC_IDLE the eNB may select one of the following options:

The eNB may provide a Mode 2 transmission resource pool in SIB. UEs that are authorized for ProSe Direct Communication use these resources for ProSe Direct Communication in RRC_IDLE; and The eNB may indicate in SIB that it supports D2D but does not provide resources for ProSe Direct Communication. UEs need to enter RRC_CONNECTED to perform ProSe Direct Communication transmission.

For UEs in RRC_CONNECTED:— A UE in RRC_CONNECTED that is authorized to perform ProSe Direct Communication transmission, indicates to the eNB that it wants to perform ProSe Direct Communication transmission when it needs to perform ProSe Direct Communication transmission:

The eNB validates whether the UE in RRC_CONNECTED is authorized for ProSe Direct Communication transmission using the UE context received from MME; and The eNB may configure a UE in RRC_CONNECTED by dedicated signaling with a Mode-2 resource allocation transmission resource pool that may be used without constraints while the UE is RRC_CONNECTED. Alternatively, the eNB may configure a UE in RRC_CONNECTED by dedicated signaling with a Mode 2 resource allocation transmission resource pool which the UE is allowed to use only in exceptional cases and rely on Mode 1 otherwise.

The resource pool for Scheduling Assignment when the UE is out of coverage can be configured as below:

The resource pool used for reception is pre-configured; and

The resource pool used for transmission is pre-configured. The resource pool for Scheduling Assignment when the UE is in coverage can be configured as below:

- The resource pool used for reception is configured by the eNB via RRC, in dedicated or broadcast signaling;
- The resource pool used for transmission is configured by the eNB via RRC if Mode 2 resource allocation is used;
- The SA resource pool used for transmission is not known to the UE if Mode 1 resource allocation is used; and
- The eNB schedules the specific resource(s) to use for Scheduling Assignment transmission if Mode 1 resource allocation is used. The specific resource assigned by the eNB is within the resource pool for reception of Scheduling Assignment that is provided to the UE.

FIG. 7 illustrates the use of transmission/reception resources for overlay (LTE) and underlay (D2D) system.

Basically, the eNodeB controls whether UE may apply the Mode 1 or Mode 2 transmission. Once the UE knows its resources where it can transmit (or receive) D2D communication, it uses the corresponding resources only for the corresponding transmission/reception. For example, in FIG. 7, the D2D subframes will only be used to receive or transmit the D2D signals. Since the UE as a D2D device would operate in Half Duplex mode, it can either receive or transmit the D2D signals at any point of time. Similarly, the other subframes illustrated in FIG. 7 can be used for LTE (overlay) transmissions and/or reception.

Transmission Procedure for D2D Communication

The D2D data transmission procedure differs depending on the resource allocation mode. As described above for Mode 1, the eNB explicitly schedules the resources for the Scheduling Assignment and the D2D data communication after a corresponding request from the UE. Particularly, the UE may be informed by the eNB that D2D communication is generally allowed, but that no Mode 2 resources (i.e. resource pool) are provided; this may be done e.g. with the exchange of the D2D communication Interest Indication by the UE and the corresponding response, D2D Communication Response, where the corresponding exemplary Prose-CommConfig information element mentioned above would not include the commTxPoolNormalCommon, meaning that a UE that wants to start direct communication involving transmissions has to request E-UTRAN to assign resources for each individual transmission. Thus, in such a case, the UE has to request the resources for each individual transmission, and in the following the different steps of the request/grant procedure are exemplarily listed for this Mode 1 resource allocation:

Step 1: UE sends SR (Scheduling Request) to eNB via PUCCH;
Step 2: eNB grants UL resource (for UE to send BSR) via PDCCH, scrambled by C-RNTI;
Step 3: UE sends D2D BSR indicating the buffer status via PUSCH;
Step 4: eNB grants D2D resource (for UE to send data) via PDCCH, scrambled by D2D-RNTI; and
Step 5: D2D Tx UE transmits SA/D2D data according to grant received in step 4.

A Scheduling Assignment (SA) is a compact (low-payload) message containing control information, e.g. pointer(s) to time-frequency resources for the corresponding D2D data transmissions. The content of the SA is basically in accordance with the grant received in Step 4 above. The exact details of the D2D grant and SA content are not fixed yet but as a working assumption for the SA content the following agreements were achieved:

- Frequency resource is indicated by Rel-8 UL Type 0 resource allocation (5-13 bits depending on System BW);
- 1 bit frequency hopping indicator (as per Rel-8):
  - Note that some reinterpretation of the indexing is to be defined so that hopping does not use PRBs outside the configured resource pool for mode 2;
- Only single-cluster resource allocations are valid:
  - this implies that if there are gaps in the resource pool in the frequency domain, a resource allocation shall not straddle a gap;
- No RV indicator in SA; and
- RV pattern for data:{0, 2, 3, 1}.

On the other hand, for Mode 2 resource allocation, above steps 1-4 are basically not necessary, and the UE autonomously selects resources for the SA and D2D data transmission from the transmission resource pool(s) configured and provided by the eNB.

FIG. 8 exemplarily illustrates the transmission of the Scheduling Assignment and the D2D data for two UEs, UE-A and UE-B, where the resources for sending the scheduling assignments are periodic, and the resources used for the D2D data transmission are indicated by the corresponding Scheduling Assignment.

FIG. 9 illustrates the D2D communication timing for Mode 2, autonomous scheduling, during one SA/data period, also known as SC period, Sidelink Control period.

FIG. 10 illustrates the D2D communication timing for Mode 1, eNB-scheduled allocation during one SA/data period. A SC period is the time period consisting of transmission of Scheduling Assignments and their corresponding data. As can be seen from FIG. 9, the UE transmits after an SA-offset time, a Scheduling Assignment using the transmission pool resources for scheduling assignments for Mode 2, SA_Mode2_Tx_pool. The 1st transmission of the SA is followed e.g. by three retransmissions of the same SA message. Then, the UE starts the D2D data transmission, i.e. more in particular the T-RPT bitmap/pattern, at some configured offset (Mode2data_offset) after the first subframe of the SA resource pool (given by the SA_offset). One D2D data transmission of a MAC PDU consists of its 1st transmissions and several retransmissions. For the illustration of FIG. 9 (and of FIG. 10) it is assumed that three retransmissions are performed (i.e. 2nd, 3rd, and 4th transmission of the same MAC PDU). The Mode2 T-RPT Bitmap (time resource pattern of transmission (T-RPT)) basically defines the timing of the MAC PDU transmission (1st transmission) and its retransmissions (2nd, 3rd, and 4th transmission).

During one SA/data period, the UE can transmit multiple transport blocks (only one per subframe (TTI), i.e. one after the other), however to only one ProSe destination group. Also the retransmissions of one transport block must be finished before the first transmission of the next transport block starts, i.e. only one HARQ process is used for the transmission of the multiple transport blocks.

As apparent from FIG. 10, for the eNB-scheduled resource allocation mode (Mode 1), the D2D data transmission, i.e. more in particular the T-RPT pattern/bitmap, starts in the next UL subframe after the last SA transmission repetition in the SA resource pool. As explained already for FIG. 9, the Mode1 T-RPT Bitmap (time resource pattern of transmission (T-RPT)) basically defines the timing of the MAC PDU transmission (1st transmission) and its retransmissions (2nd, 3rd, and 4th transmission).

ProSe Network Architecture and ProSe Entities

FIG. 11 illustrates a high-level exemplary architecture for a non-roaming case, including different ProSe applications in the respective UEs A and B, as well as a ProSe Application Server and ProSe function in the network. The example architecture of FIG. 11 is taken from 3GPP TS 23.303, "Proximity-based services (ProSe); Stage 2", v.12.3.0 Section 4.2 titled "Architectural Reference Model", available at www.3gpp.org, and incorporated herein by reference.

The functional entities are presented and explained in detail in the above cited 3GPP TS 23.303 Section 4.4 titled "Functional Entities" incorporated herein by reference. The ProSe function is the logical function that is used for network-related actions required for ProSe, and plays different roles for each of the features of ProSe. The ProSe function is part of the 3GPP's EPC and provides all relevant network services like authorization, authentication, data handling etc. related to proximity services. For ProSe direct discovery and communication, the UE may obtain a specific ProSe UE identity, other configuration information, as well as authorization from the ProSe function over the PC3 reference point. There can be multiple ProSe functions deployed in the network, although for ease of illustration a single ProSe function is presented. The ProSe function consists of three main sub-functions that perform different roles depending on the ProSe feature: Direct Provision Function (DPF), Direct Discovery Name Management Function, and EPC-level Discovery Function. The DPF is used to provision the UE with necessary parameters in order to use ProSe Direct Discovery and ProSe Direct Communication.

The term "UE" used in said connection refers to a ProSe-enabled UE supporting ProSe functionality, such as:
  Exchange of ProSe control information between ProSe-enabled UE and the ProSe Function over PC3 reference point;
  Procedures for open ProSe Direct Discovery of other ProSe-enabled UEs over PC5 reference point;
  Procedures for one-to-many ProSe Direct Communication over PC5 reference point;
  Procedures to act as a ProSe UE-to-Network Relay. The Remote UE communicates with the ProSe UE-to-Network Relay over PC5 reference point. The ProSe UE-to Network Relay uses layer-3 packet forwarding;
  Exchange of control information between ProSe UEs over PC5 reference point, e.g. for UE-to-Network Relay detection and ProSe Direct Discovery;
  Exchange of ProSe control information between another ProSe-enabled UE and the ProSe Function over PC3 reference point. In the ProSe UE-to-Network Relay case the Remote UE will send this control information over PC5 user plane to be relayed over the LTE-Uu interface towards the ProSe Function; and
  Configuration of parameters (e.g. including IP addresses, ProSe Layer-2 Group IDs, Group security material, radio resource parameters). These parameters can be pre-configured in the UE, or, if in coverage, provisioned by signaling over the PC3 reference point to the ProSe Function in the network.

The ProSe Application Server supports the Storage of EPC ProSe User IDs, and ProSe Function IDs, and the mapping of Application Layer User IDs and EPC ProSe User IDs. The ProSe Application Server (AS) is an entity outside the scope of 3GPP. The ProSe application in the UE communicates with the ProSe AS via the application-layer reference point PC1. The ProSe AS is connected to the 3GPP network via PC2 reference point.

UE Coverage States for D2D

As already mentioned before, the resource allocation method for D2D communication depends apart from the RRC state, i.e. RRC_IDLE and RRC_CONNECTED, also on the coverage state of the UE, i.e. in-coverage, out-of-coverage. A UE is considered in-coverage if it has a serving cell (i.e. the UE is RRC_CONNECTED or is camping on a cell in RRC_IDLE).

The two coverage states mentioned so far, i.e. in-coverage (IC) and out-of-coverage (OOC), are further distinguished into sub-states for D2D. FIG. 12 shows the four different states a D2D UE can be associated to, which can be summarized as follows:
  State 1: UE1 has uplink and downlink coverage. In this state the network controls each D2D communication session. Furthermore, the network configures whether UE1 should use resource allocation Mode 1 or Mode 2;
  State 2: UE2 has downlink but no uplink coverage, i.e. only DL coverage. The network broadcasts a (contention-based) resource pool. In this state the transmitting UE selects the resources used for SA and data from a resource pool configured by the network; resource allocation is only possible according to Mode 2 for D2D communication in such a state;
  State 3: Since UE3 has no uplink and downlink coverage, the UE3 is, strictly speaking, already considered as out-of-coverage (OOC). However, UE3 is in the coverage of some UEs which are themselves (e.g. UE1) in the coverage of the cell, i.e. those UEs can be also referred as CP-relay UEs. Therefore, the area of the state-3 UEs in FIG. 12 can be denoted as CP UE-relay coverage area. UEs in this state 3 are also referred to as OOC-state-3 UEs. In this state the UEs receive some cell specific information which is sent by the eNB (SIB) and forwarded by the CP UE-relay UEs in the coverage of the cell via PD2DSCH to the OOC-state-3 UEs. A (contention-based) network-controlled resource pool is signaled by PD2DSCH; and
  State 4: UE4 is out of coverage and does not receive PD2DSCH from other UEs which are in the coverage of a cell. In this state, which is also referred to as state-4 OOC, the transmitting UE selects the resources used for the data transmission from a pre-configured pool of resources.

The reason to distinguish between state-3 OOC and state-4 OOC is mainly to avoid potentially strong interference between D2D transmissions from out-of coverage devices and legacy E-UTRA transmissions. In general D2D-capable UEs will have preconfigured resource pool(s) for transmission of D2D SAs and data for use while out of coverage. If these out-of-coverage UEs transmit on these preconfigured resource pools near cell boundaries, then, interference between the D2D transmissions and in-coverage legacy transmissions could have a negative impact on communications within the cell. If D2D-enabled UEs within coverage forwarded the D2D resource pool configuration to those out-of-coverage devices near the cell boundary, then, the out-of-coverage UEs could restrict their transmissions to the resources specified by the eNode B and therefore minimize interference with legacy transmissions in coverage. Thus, RAN1 introduced a mechanism where in-coverage UEs are forwarding resource pool information and other D2D related configurations to those devices just outside the coverage area (state-3 UEs).

The Physical D2D synchronization channel (PD2DSCH) is used to carry this information about in-coverage D2D resource pools to the UEs in network proximity, so that resource pools within network proximity are aligned. The detailed content of the PD2DSCH is not finalized yet though.

LCP Procedure for D2D, Sidelink, Logical Channels

The LCP procedure for D2D will be different than the above-presented LCP procedure for "normal" LTE data. The following information is taken from R2-145435, a Change Request 0744 for TS 36.321 in its version 12.3.0 directed at the Introduction of ProSe and its functionality; it is incorporated herewith in its entirety by reference.

The Logical Channel Prioritization procedure is applied when a new transmission is performed.

The UE shall perform the following Logical Channel Prioritization procedure when a new transmission is performed. The UE shall allocate resources to the sidelink logical channels according to the following rules:

the UE should not segment an RLC SDU (or partially transmitted SDU) if the whole SDU (or partially transmitted SDU) fits into the remaining resources;

if the UE segments an RLC SDU from the sidelink logical channel, it shall maximize the size of the segment to fill the grant as much as possible;

the UE should maximize the transmission of data; and if the UE is given an sidelink grant size that is equal to or larger than 10 bytes while having data available for transmission, the UE shall not transmit only padding.

NOTE: The rules above imply that the order by which the sidelink logical channels are served is left for UE implementation. Generally, for one PDU, MAC shall consider only logical channels with the same Source Layer-2ID-Destination Layer 2 ID pairs, i.e. for one PDU, the MAC entity in the UE shall consider only logical channels of the same ProSe destination group. Furthermore, in Rel-12 during one SA/data period the D2D transmitting UE can only transmit data to one ProSe destination group.

All D2D (sidelink) logical channels, e.g. STCH, Sidelink Traffic Channel, are allocated to the same logical channel group (LCG) with LCGID set to '11'. In Rel-12 there is no prioritization mechanism for D2D (sidelink) logical channels/groups. Essentially, all sidelink logical channels have the same priority from UE point of view, i.e. the order by which the sidelink logical channels are served is left for UE implementation.

Buffer Status Reporting for ProSe

The (D2D) sidelink Buffer Status Reporting procedure is used to provide the serving eNB with information about the amount of sidelink data available for transmission in the sidelink buffers of the UE. RRC controls sidelink BSR reporting by configuring the two timers Periodic-ProseBSR-Timer and RetxProseBSR-Timer. Each sidelink logical channel (STCH) is allocated to an LCG with LCGID set to "11" and belongs to a ProSe Destination group.

A sidelink Buffer Status Report (BSR) shall be triggered if some particular events occurs, as given section 5.14.1.4 of TS 36.321, v.12.5.0.

Section 6.1.3.1.a of TS 36.321, v.12.5.0 specifies the ProSe BSR MAC Control Elements and their corresponding content as follows.

The ProSe Buffer Status Report (BSR) MAC control element consists of one group index field, one LCG ID field and one corresponding Buffer Size field per reported D2D destination group. More in detail, for each included ProSe destination group, the following fields are defined:

Group index: The group index field identifies the ProSe destination group. The length of this field is 4 bits. The value is set to the index of the destination identity reported in ProseDestinationInfoList;

LCG ID: The Logical Channel Group ID field identifies the group of logical channel(s) which buffer status is being reported. The length of the field is 2 bits and it is set to "11";

Buffer Size: The Buffer Size field identifies the total amount of data available across all logical channels of a ProSe Destination group after all MAC PDUs for the TTI have been built. The amount of data is indicated in number of bytes; and R: Reserved bit, set to "0".

FIG. 13 shows the ProSe BSR MAC control element for even N (number of ProSe destination groups), taken from the above cited TS 36.321, v.12.5.0.

Mission Critical Push to Talk

Recently, a service called Mission Critical Push To Talk (MCPTT) service has been studied in 3GPP, which is also captured in 3GPP TS 22.179, v.13.1.0, "Mission Critical Push to Talk (MCPTT) over LTE; Stage 1", available at www.3gpp.org. A Push To Talk (PTT) service provides an arbitrated method by which two or more users may engage in communication. Users may request permission to transmit (e.g., traditionally by means of a press of a button). The Mission Critical Push To Talk over LTE (MCPTT) service supports an enhanced PTT service, suitable for mission critical scenarios, based upon 3GPP Evolved Packet System (EPS) services. The requirements for MCPTT service defined within can also form the basis for a non-mission critical Push To Talk (PTT) service. The MCPTT Service is intended to support communication between several users (a group call), where each user has the ability to gain access to the permission to talk in an arbitrated manner. However, the MCPTT Service also supports Private Calls between pairs of users. The MCPTT Service builds on the existing 3GPP transport communication mechanisms provided by the EPS architectures to establish, maintain, and terminate the actual communication path(s) among the users.

The MCPTT Service also builds upon service enablers: GCSE_LTE and ProSe. To the extent feasible, it is expected that the end user's experience to be similar regardless if the MCPTT Service is used under coverage of an EPC network or based on ProSe without network coverage. To clarify this intent, the requirements are grouped according to applicability to on-network use, off-network use, or both. The MCPTT Service allows users to request the permission to talk (transmit voice/audio) and provides a deterministic mechanism to arbitrate between requests that are in contention (i.e., Floor control). When multiple requests occur, the determination of which user's request is accepted and which users' requests are rejected or queued is based upon a number of characteristics (including the respective priorities of the users in contention). MCPTT Service provides a means for a user with higher priority (e.g., emergency condition) to override (interrupt) the current talker. MCPTT Service also supports a mechanism to limit the time a user talks (holds the floor) thus permitting users of the same or lower priority a chance to gain the floor.

The MCPTT Service provides the means for a user to monitor activity on a number of separate calls and enables the user to switch focus to a chosen call. An MCPTT Service user may join an already established MCPTT Group call (Late call entry). In addition the MCPTT Service provides the User ID of the current speaker(s) and user's Location determination features. The users of an MCPTT Service may have more stringent expectations of performance than the users of a commercial PTT service.

An MCPTT Service provides Group Call and Private Call capabilities, which have various process flows, states and permissions associated with them. FIGS. 14, FIG. 15, and FIG. 16 indicate the high level flows, states and permissions associated with Group Calls and Private Calls. The diagrams apply to the on-network case and off-network case, as from a user perspective the service and concepts should appear similar on the network and off the network. From a technical perspective there might be differences between the on-network states and off-network states (e.g., off the network Affiliation might not require notifying an application server of a user's affiliation and there might also be other differences in the detail depending on the extent to which the off-network capabilities can match the on-network capabilities).

If an MCPTT User wants to communicate with an MCPTT Group they have to be allowed to access the MCPTT Group (i.e., be an MCPTT Group Member), they then have to affiliate and then can have an MCPTT Group as their Selected MCPTT Group. If an MCPTT User is only affiliated to a group this is so that they can receive from the group, however if an MCPTT User has a Selected MCPTT Group this is their group for transmitting on. The differences in states enable an MCPTT User to receive from multiple MCPTT Groups, but specify which MCPTT Group they would like to transmit on.

In particular, FIGS. 14, 15 and 16 show respective MCPTT user state diagrams for a user which has allowed both receiving and transmitting with respect to a particular MCPTT group, a user that is only allowed to transmit and a user that is only allow to receive. In the present state of discussions, this diagram serves merely for illustrative purposes and does not supersede the requirements. It is not exhaustive and does not include all the different scenarios.

It is possible for an MCPTT User to be affiliated with one or more MCPTT Groups. Normally, while in operation, an MCPTT User informs the MCPTT Service about which MCPTT Groups he would like to be affiliated to. These affiliations remain in effect until the MCPTT User removes them, or changes them, or signs out of the service. Some MCPTT Users have permanent affiliations to certain MCPTT Groups and those affiliations are set up implicitly (i.e., automatically) when operating on the network. For those users, the MCPTT Group affiliation starts when the MCPTT Service successfully signs in the user and ends when the MCPTT User's explicit or implicit (e.g., due to inactivity or the turning off of all its devices) request to sign out of the MCPTT Service is acknowledged.

Every time a PTT request is granted a user can start an MCPTT transmission or "talk burst". An MCPTT Group Call consists of one or more MCPTT transmissions. Whether two consecutive transmissions from same or different users are part of the same call, or the second transmission starts a new call, depends on the configurable maximum length of the inactivity period between the consecutive MCPTT transmissions. This inactivity period can be seen as a Hang Time that starts at the end of the preceding transmission. While this timer is running, the resources associated with the call stay assigned to the call (except in case of pre-emption), which could reduce the latency of future floor requests for this group versus groups who are not involved in a call. When a new transmission starts during the inactivity period, the timer is stopped, reset and restarted again at the end of that transmission.

The MCPTT Service recognizes a number of "special" group calls including: Broadcast Group Call, Emergency Group Call and Imminent Peril group call.

MCPTT Priority Model

Many LTE non-public safety users today subscribe to one particular priority and QoS level of service (e.g., "gold", "silver" or "bronze"), which always provides fixed differentiation. This model, effective and relatively straightforward for non-public safety users, falls short when it comes to the needs of the public safety applications.

MCPTT Priority and QoS is situational. The MCPTT Service is intended to provide a real-time priority and QoS experience for MCPTT calls, as public safety users have significant dynamic operational conditions that determine their priority. For example, the type of incident a responder is serving or the responder's overall shift role needs to strongly influence a user's ability to obtain resources from the LTE system.

The MCPTT Priority handling for on-network use for MCPTT Calls is conceptually modeled as shown in FIG. 17. The conceptual model identifies three areas of prioritization: prioritization between and within calls, inter-system prioritization, and prioritization at the transport layer (EPS and UE). At the Application Layer a generic, network side, functional entity, "MCPTT Priority and QoS Control", processes with each request static, preconfigured information about users and groups participating in MCPTT, as well as dynamic (or situational) information about them. Based on the results of this processing, the "MCPTT Priority and QoS Control" provides information to and directs interactions with other functional entities, systems, or layers to ensure, to the extent possible, that from a quality of experience point of view, calls and transmissions are handled properly in accordance to established policy rules.

In FIG. 17, User Static Attributes include information categorizing the user, possibly by several criteria (e.g., first responder, second responder, supervisor, dispatcher, administrator), as well as jurisdictional boundaries and possibly a preconfigured system-wide individual priority level.

The Group Static Attributes include information about the nature/type of the group and the owning organization(s), the jurisdictional boundaries for transmitters and receivers within the group, the normal hours of operation for the group, pre-emption dispositions relative to other groups, and the default minimum priority of the group.

The User Dynamic Attributes include the user/Participant's operational status (e.g., on/off duty), his location, the type of incident (e.g., MCPTT Emergency or Imminent Peril) he might be involved in and whether or not he initiated it, whether or not he is individually involved in a formally managed incident and if yes, the boundaries of the incident area, the incident severity and his assigned role in the resolution of the incident.

The Group Dynamic Attributes include the type of incident (e.g., MCPTT Emergency or Imminent Peril), if any, the group is currently handling and in case of involvement in a formally managed incident the boundaries of the incident area and the incident severity.

As shown in FIG. 18, the higher layers for each particular bearer provide a priority based on the real time attributes (The User Static Attributes, The Group Static Attributes, The User Dynamic Attributes, The Group Dynamic Attributes) a priority value to the MAC layer.

MAC layer may further use this in at least two possible ways:
  A) As part of LCP mechanism i.e. together with the Logical Channel and/or destination group priority; and
  B) Independently (before/after LCP) to make a go/no-go decision: in this case Logical Channel Prioritization would decide on how much data to which logical channel is allocated (in which group(s)) and then MCPTT priority only reflects in floor arbitration.

At present, the particular procedure for prioritizing logical channels in a UE is not defined.

SUMMARY

One non-limiting and exemplary embodiment provides an improved method for allocating radio resources to logical channels when performing a logical channel prioritization procedure in a user equipment for Proximity Services.

In one general aspect, the techniques disclosed here feature a user equipment operable in a wireless communications system supporting direct communication between user equipments, including: a storage with a sidelink configuration stored and specifying a plurality of destination groups, each destination group including possible destinations for sidelink data as well as storing a logical channel priority for each logical channel out of logical channels configured for the sidelink destination groups; and a scheduling unit that: selects a sidelink destination group with a sidelink logical channel having sidelink data available for transmission with the highest logical channel priority among the sidelink logical channels having data available for transmission; and allocates radio resources to the sidelink logical channels belonging to the selected sidelink destination group in decreasing priority order.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 11 illustrates an exemplary architecture model for ProSe for a non-roaming scenario;

FIG. 12 illustrates that coverage regarding four different states the D2D UE can be associated to;

FIG. 13 illustrates the ProSe Buffer Status Reporting MAC Control Element defined in the standard;

DETAILED DESCRIPTION

Figure 1:
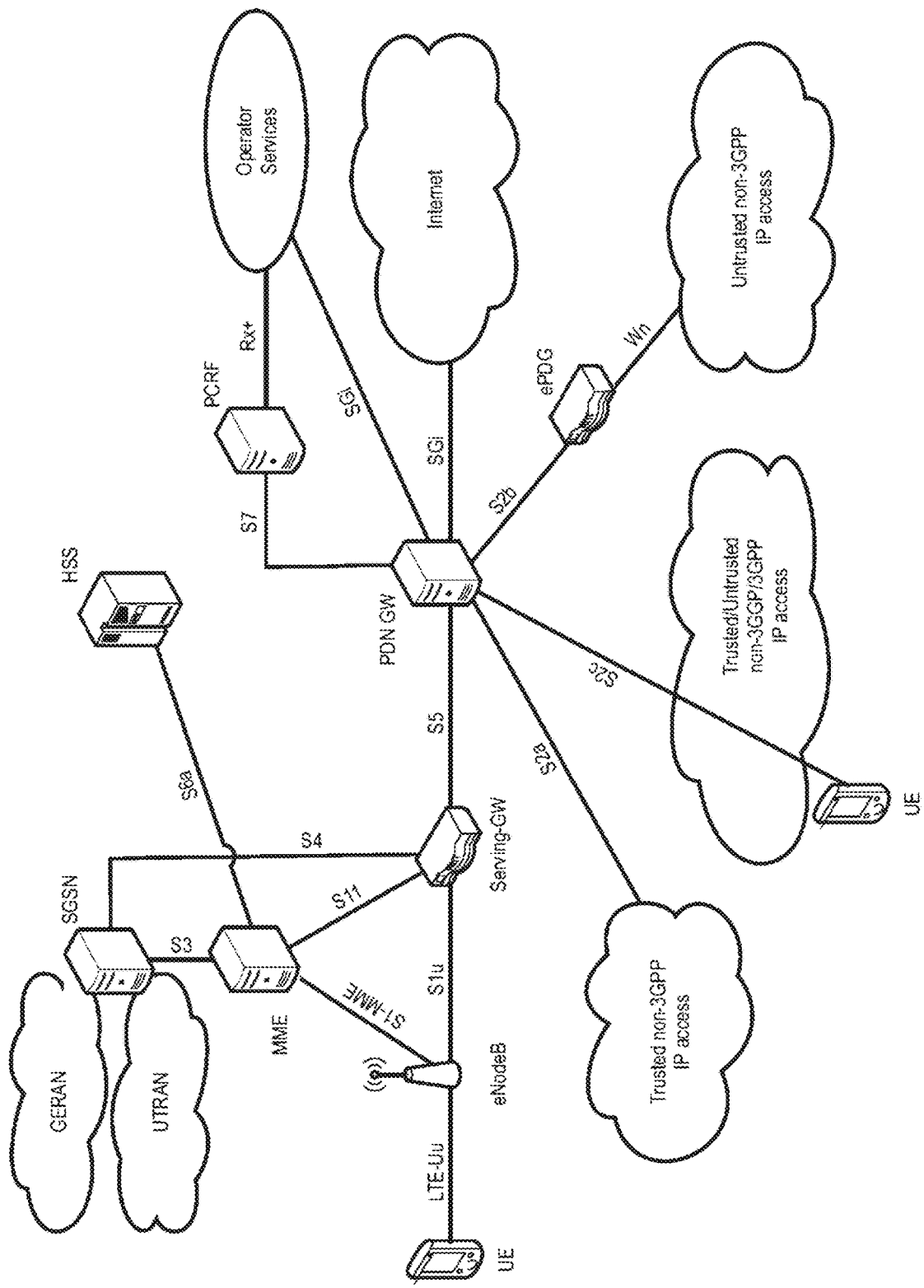
FIG. 1 shows an exemplary architecture of a 3GPP LTE system.
Figure 2:
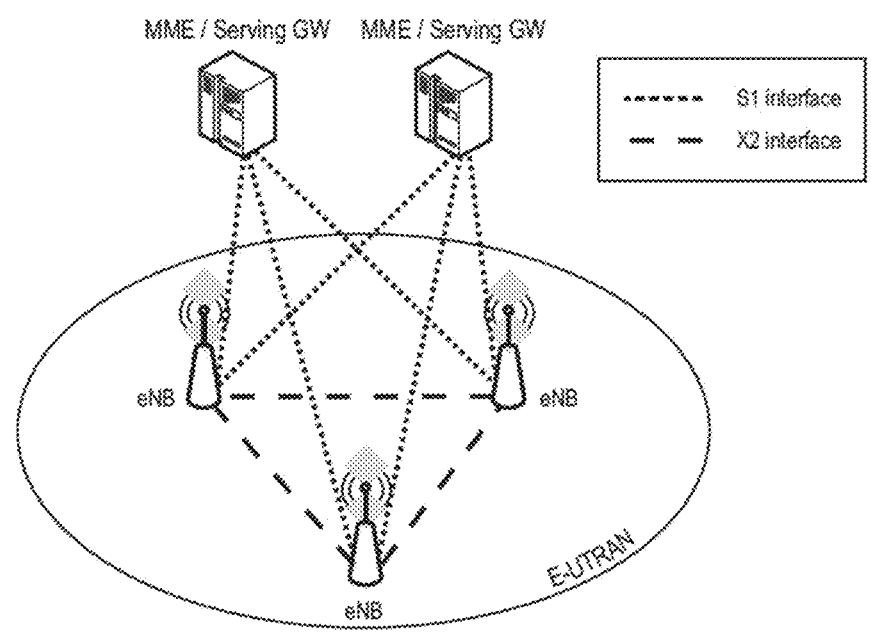
FIG. 2 shows an exemplary overview of the overall E-UTRAN architecture of 3GPP LTE.
Figure 3:
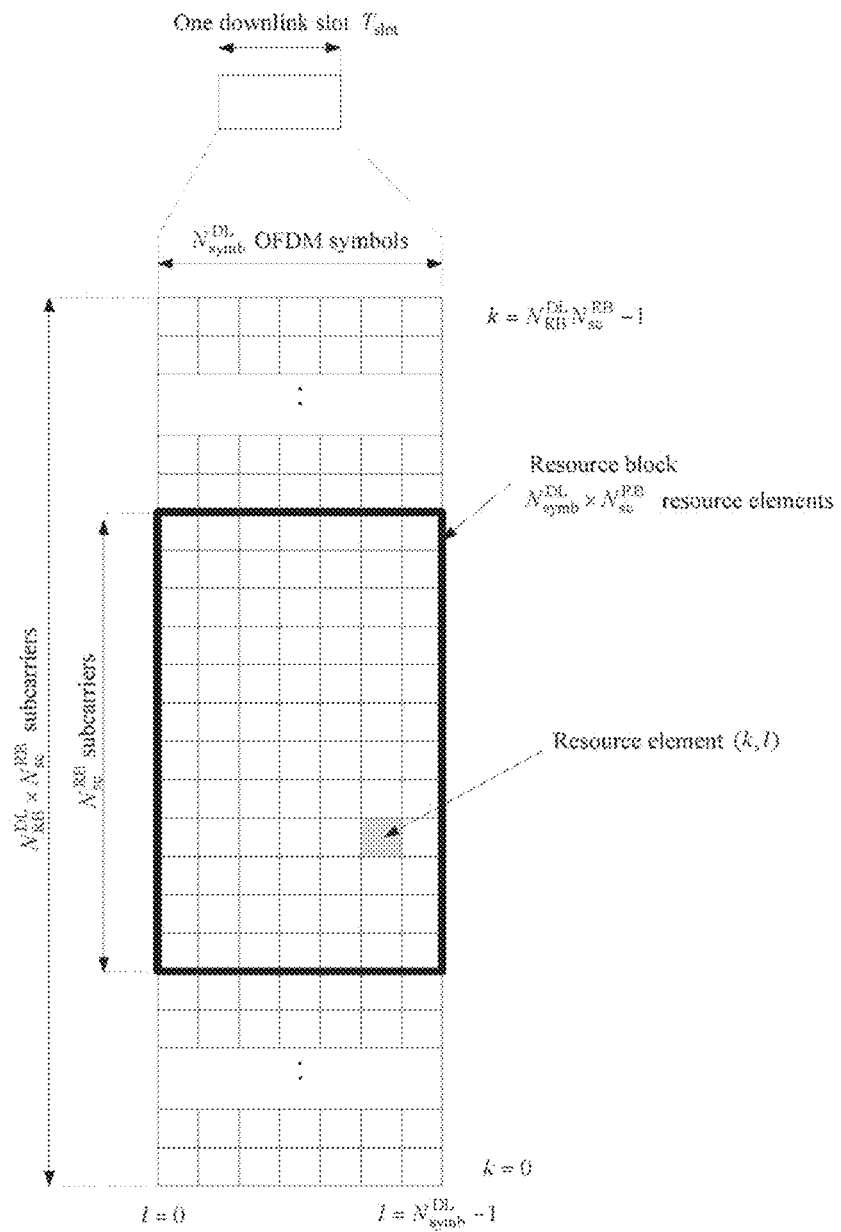
FIG. 3 shows an exemplary downlink resource grid of a downlink slot as defined for 3GPP LTE (Release 8/9)
Figure 4:
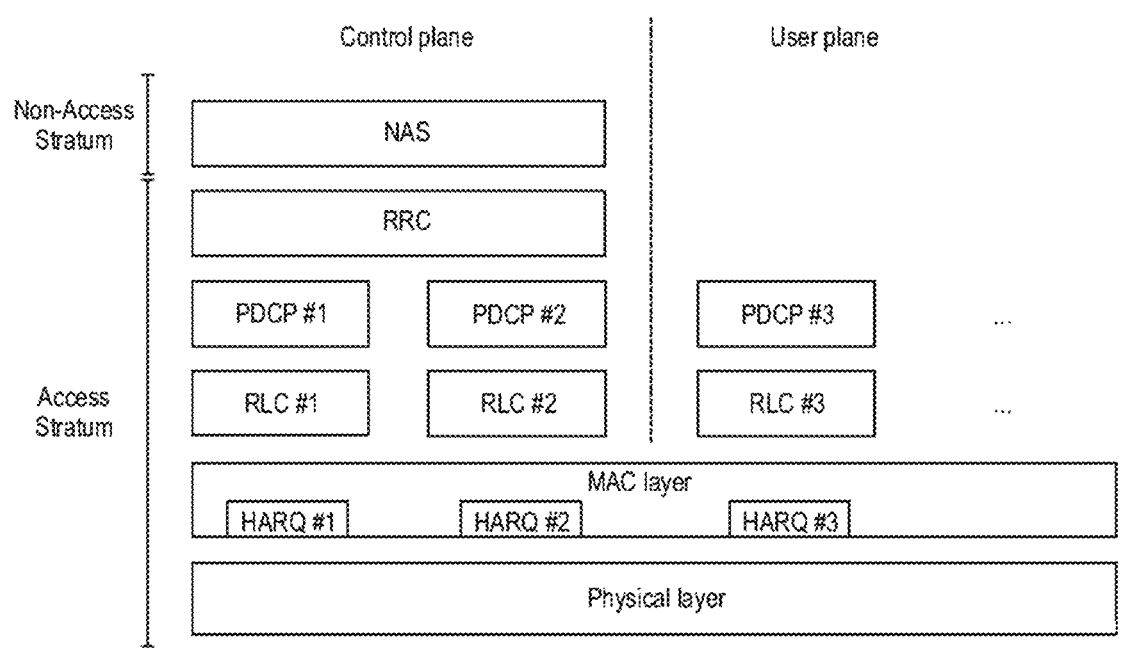
FIG. 4 illustrates the layer 2 user and control-plane protocol stack composed of the three sublayers, PDCP, RLC and MAC.
Figure 5:
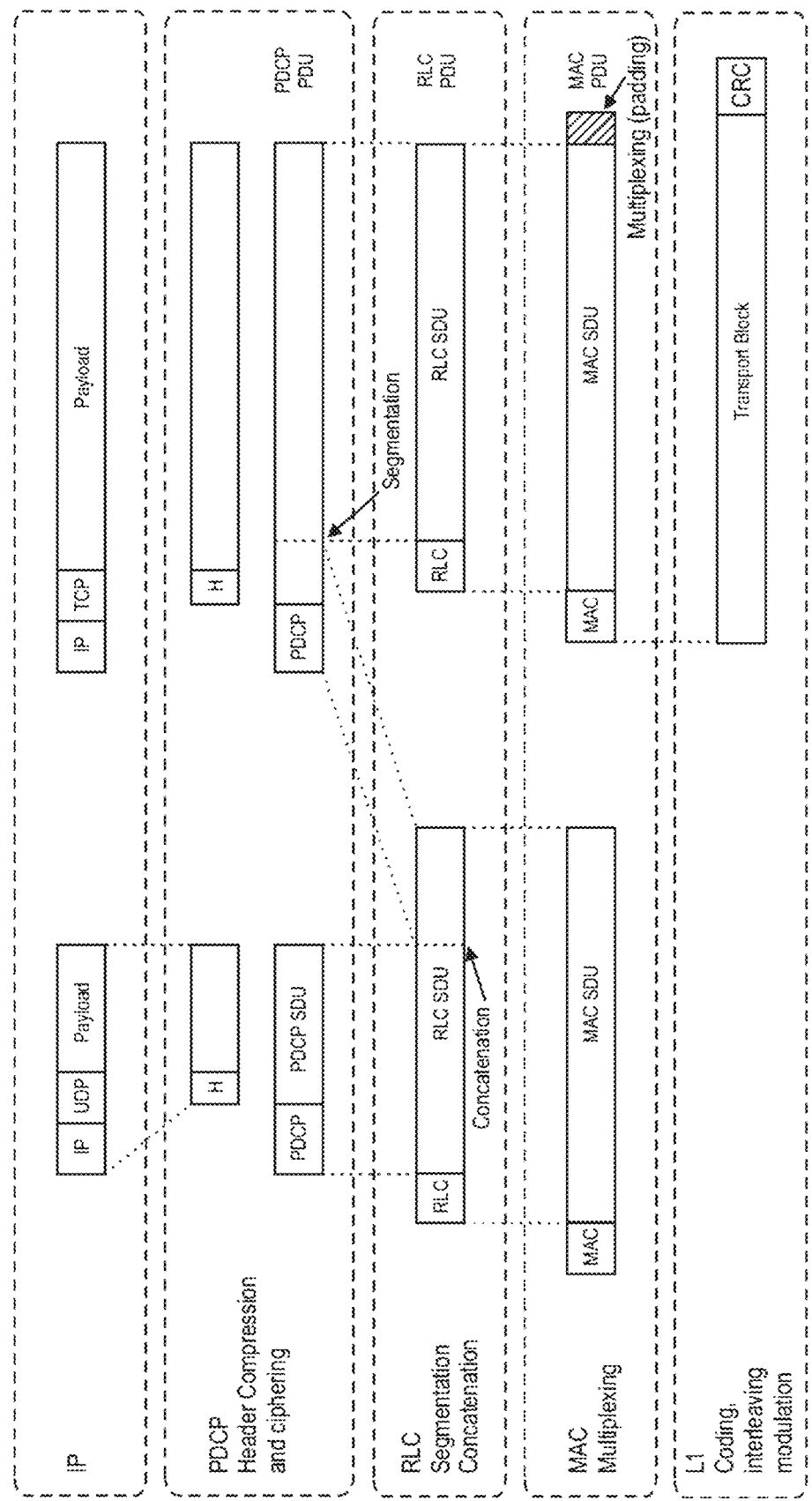
FIG. 5 gives an overview of the different functions in the PDCP, RLC and MAC layers as well as illustrates exemplary the processing of SDUs/PDUs by the various layers.
Figure 6:
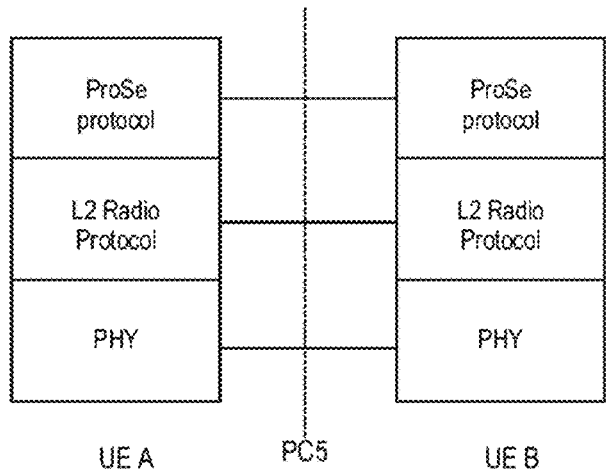
FIG. 6 schematically illustrates a PC 5 interface for device-to-device direct discovery.
Figure 7:
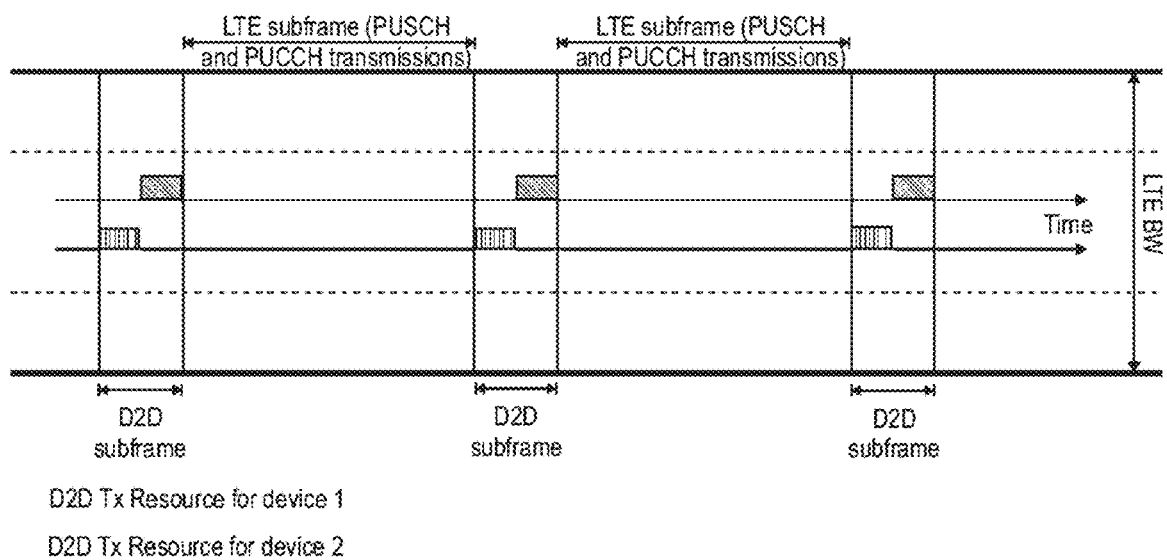
FIG. 7 illustrates the use of transmission/reception resources for overlay (LTE) and underlay (D2D) systems.
Figure 8:
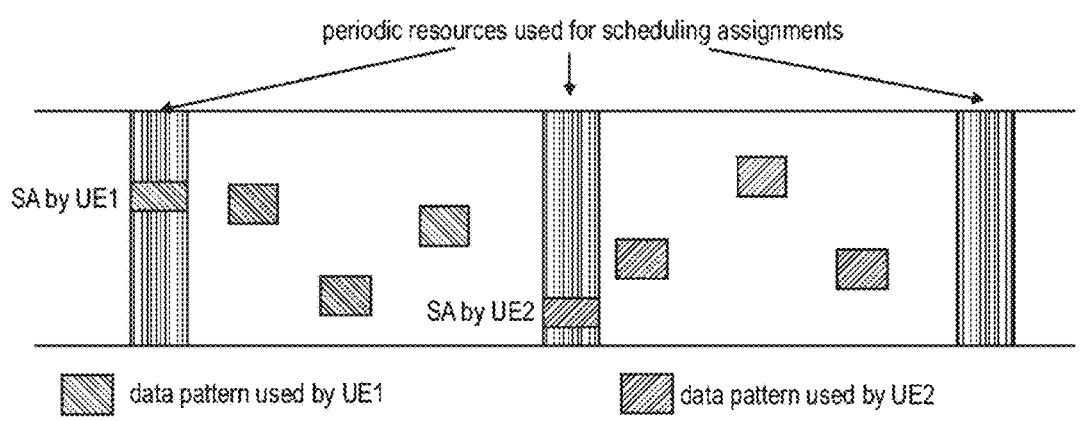
FIG. 8 illustrates the transmission of the Scheduling Assignment and the D2D data for two UEs.
Figure 9:
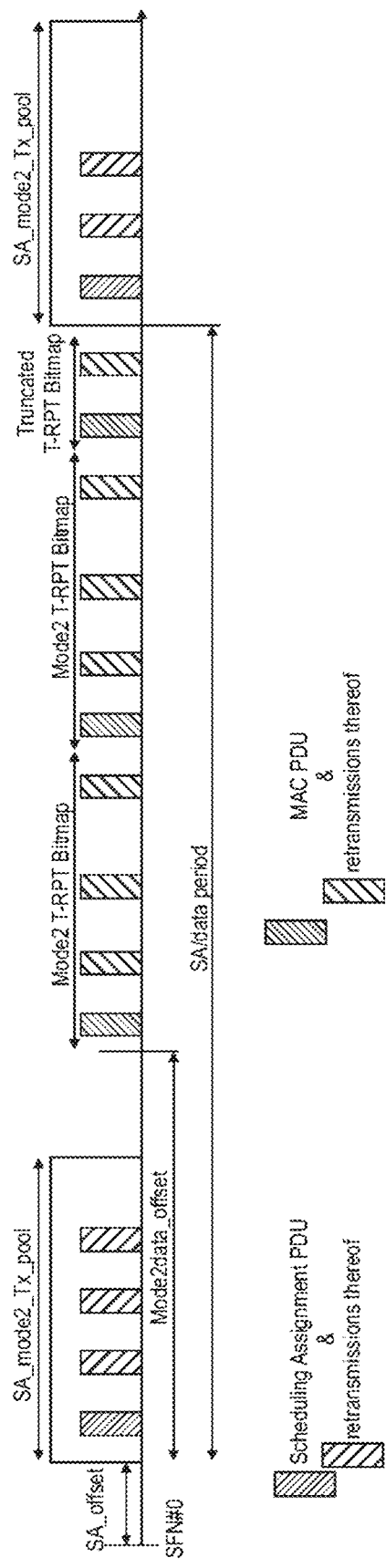
FIG. 9 illustrates the D2D communication timing for the UE-autonomous scheduling Mode 2.
Figure 10:
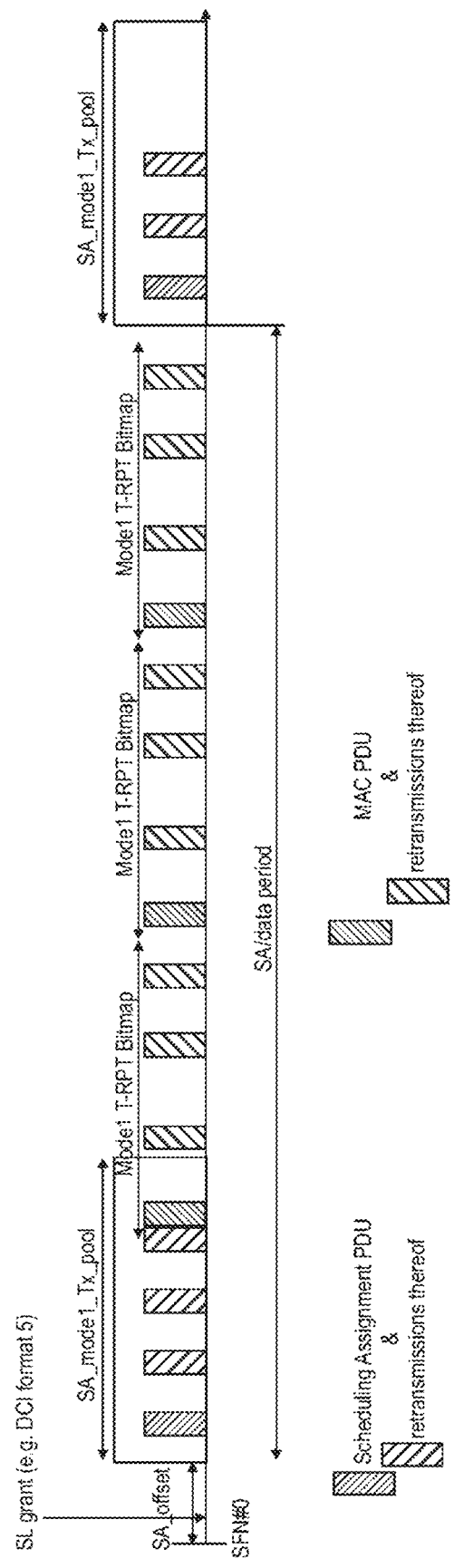
FIG. 10 illustrates the D2D communication timing for the eNB-scheduled scheduling Mode 1.
Figure 14:
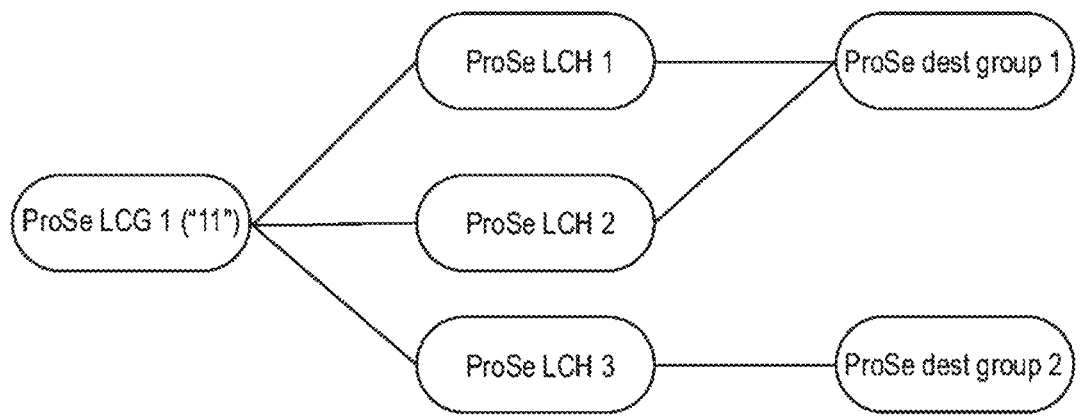
FIG. 14 illustrates the association between ProSe logical channels, ProSe LCGs, and ProSe destination groups for an exemplary scenario.

A mobile station or mobile node or user terminal or user equipment is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The term "radio resources" as used in the set of claims and in the application is to be broadly understood as referring to physical radio resources, such as time-frequency resources.

The term "ProSe" or in its unabbreviated form, "Proximity Services", used in the set of claims and in the application is applied in the context of Proximity-based applications and services in the LTE system as exemplarily explained in the background section. Other terminology such as "D2D" is also used in this context to refer to the Device-to-Device communication for the Proximity Services. Furthermore, in the claims the terminology of "ProSe logical channels" is used so as to be consistent with the overall terminology employed throughout the set of claims, such as "ProSe data", or "ProSe destination groups"; however, the different term "sidelink" is also used in this context, i.e. mostly as "sidelink logical channels", i.e. those logical channels set up for proximity services/D2D. The term "ProSe destination group" used in the set of claims and in the remaining application can be understood as e.g. one Source Layer-2 ID-Destination Layer 2 ID pair defined in 3GPP LTE.

As explained in the background section, one major goal is to continuously improve the implementation of the Proximity Services in the current overall LTE system. Currently, the LCP procedure for D2D communication is defined such that the order by which the sidelink logical channels are served is left for UE implementation, i.e. no prioritization mechanism for sidelink channels is supported and essentially all sidelink logical channels have the same priority from UE point of view. Furthermore, as currently implemented, for one MAC PDU, the MAC entity in the UE shall consider only logical channels of the same ProSe destination group. Again, it is up to the UE implementation in which order the ProSe destination groups are served.

The currently-standardized LCP procedure entails several disadvantages as will become apparent from below.

For example, the D2D resources are inefficiently used, and the half duplex problem (UE cannot receive and transmit at the same time, i.e. TTI) cannot be mitigated. In more detail, to explain the problem, a scenario is assumed where several members of a particular ProSe destination group (e.g. public safety) communicate between each other. Two UEs belonging to the same ProSe destination group receive respective grants to transmit ProSe data. Since the selection order of the ProSe destination groups (and the sidelink logical channels) is up to the UE implementation, the eNodeB e.g. cannot prevent these two UEs to use their grants for a transmission to the same ProSe destination group at the same TTI. Consequently, the two transmitting UEs will not be able to receive the transmission from the other transmitting UE in the same TTI since it is transmitting at the same time (due to the half duplex operation of ProSe). First, there is the risk that information among the group members differs due to said half duplex problem, i.e. it is not guaranteed that all group members receive all information. Furthermore, some of the scheduled resources are inefficiently used.

The following exemplary embodiments are conceived by the inventors to mitigate the problems explained above.

In the following, several illustrative embodiments will be explained in detail. Some of these are to be implemented in the wide specification as given by the 3GPP standards and explained partly in the present background section, with the particular key features as explained in the following pertaining to the various embodiments. It should be noted that the embodiments may be advantageously used for example in a mobile communication system, such as 3GPP LTE-A (Release 10/11/12/13) communication systems as described in the Technical Background section above, but the embodiments are not limited to its use in this particular exemplary communication networks.

The explanations should not be understood as limiting the scope of the disclosure, but as a mere example of embodiments to better understand the present disclosure. A skilled person should be aware that the general principles of the present disclosure as laid out in the claims can be applied to different scenarios and in ways that are not explicitly described herein. Correspondingly, the following scenarios assumed for explanatory purposes of the various embodiments shall not limit the present disclosure and its embodiments as such. For example, it is assumed for the following embodiments that in general the ProSe LCP procedure will be used for the same purpose as currently standardized, i.e. for a UE to allocate available radio resources to different logical channels with available data for transmission when constructing the MAC PDU for performing a new transmission. Also, it is assumed that several ProSe destination groups are already defined in a same or similar manner as currently standardized. Furthermore, when setting up the various ProSe logical channels, it is assumed that an association between the ProSe logical channels and the ProSe destination groups is performed in the UE, such that each ProSe logical channel set up in the UE is associated with a particular ProSe destination group to which the ProSe data of the ProSe logical channel is destined.

Moreover, various embodiments discuss the LCP procedure, according to which radio resources are distributed between the ProSe logical channels with available data for transmission. When no further indications or restrictions are given, it should be assumed that the radio resources to be allocated are either eNB-scheduled resources (resource allocation Mode 1) or radio resources autonomously determined by the UE from an appropriate resource pool (resource allocation Mode 2).

First Illustrative Embodiment

According to a first exemplary embodiment, a method for allocating radio resources to logical channels when performing a logical channel prioritization, LCP, procedure in a user equipment is provided for Proximity Services. The method allows a UE to allocate available radio resources to the ProSe logical channels with available ProSe data when generating a MAC PDU for a new transmission. The ProSe logical channels are set up appropriately in the UE, and according to the first embodiment all the ProSe logical channels are assigned to the same ProSe LCG ("11") as in the prior art. A main idea is to introduce a prioritization mechanism when performing the LCP procedure, which is based on the ProSe destination groups. As explained before, a MAC PDU shall only contain ProSe data relating to one particular ProSe destination group, such that the UE must first select the ProSe destination group. This is also the case for the first embodiment, which however in addition foresees that each of the ProSe destination groups is assigned a respective priority (e.g. termed "ProSe destination group priority").

The ProSe destination group priority may be different to the logical channel priority which is used in LTE within the LCP procedure for the generation of MAC PDUs transmitted on the Uu interface. As described in the technical background section for LTE uplink transmission on the Uu interface basically data of all logical channels can be multiplexed into a MAC PDU, the logical channel priority determines the order in which the logical channels are served. However for ProSe communication only data of logical channels which are assigned to the same ProSe destination group can be mapped in a ProSe PDU.

The assigning of the respective priorities to the ProSe destination groups can be e.g. performed by a higher-layer entity in the network, i.e. a corresponding ProSe function or entity which is responsible in said respect. For instance, said ProSe function/entity could be the same as the one that already sets up and manages the ProSe destination groups. As explained in the background section in connection with FIG. 15, such a ProSe entity could be the ProSe Function defined therein. In said case, the information on the ProSe destination groups and their priorities are distributed to other entities in the network, such as the ProSe-enabled UEs which can be performed directly via the PC3 interface, and/or such as the eNodeB. For example, the ProSe function/entity transmits information on the ProSe destination groups (such as ID) together with the assigned ProSe destination groups by some higher-layer protocol Furthermore, this information can be provided to the eNB(s) of the E-UTRAN first. The eNodeBs, instead of the ProSE function in turn can inform the UEs.

Alternatively, the ProSe destination group priorities may also be already pre-configured in the UE (and the eNB) (e.g. by the standard, or stored in the UICC), such that corresponding information does not have to be signaled over the network but is already available at the UE (and the eNB) from the beginning.

Furthermore, there are also several possibilities on how the actual priority levels available for the ProSe destination groups can be implemented. It is currently discussed that about 8 different ProSe destination groups can be configured for a UE. Consequently, one variant of the first embodiment would then provide a corresponding number of 8 different priority levels, encoded by 3 bits, where e.g. priority level 1 is the highest and priority level 8 is the lowest priority, or vice versa. For example, a ProSe destination group for public safety will have a high priority. However, there may be also less priority levels than ProSe destination groups. Furthermore, the various embodiments discussed herein based on the ProSe destination group priorities are not limited thereto, and any other suitable prioritization of the ProSe destination groups is possible.

The first embodiment implements a prioritization mechanism for the LCP procedure based on the above-discussed ProSe destination group priorities. In more detail, a first step is introduced according to which the UE, at the time when ProSe data is available and a corresponding MAC PDU shall be generated for a new transmission, selects one of the ProSe destination groups according to its priority, such that the MAC PDU to be generated and transmitted will only include ProSe data of ProSe logical channels destined to said selected ProSe destination group. For example, the UE selects that ProSe destination group with the highest priority. It should be noted that only those ProSe destination groups are considered for which data is actually available; i.e. ProSe destination groups, e.g. of higher priority, but without data to be transmitted, are disregarded.

As assumed before, radio resources are available for the UE to transmit data in D2D direct communication to another ProSe UE via the PC5 interface, be it Mode 1 or Mode 2 allocated resources. Correspondingly, in the second step, the UE shall allocate the available radio resources to the ProSe logical channels (e.g. STCHs), but only considers those ProSe logical channels that belong to the selected ProSe destination group. However, how exactly, e.g. in which order, the UE serves the various ProSe logical channels of said selected ProSe destination group is then left for the respective UE implementation, and is not specified in further detail at this point. It should be noted in said respect that all ProSe logical channels within said ProSe destination group have the same priority (which is changed according to the second embodiment, as will be explained later).

The MAC PDU is thus constructed with ProSe data of only said selected, high-priority, ProSe destination group.

In said respect, it should be noted that the MAC PDU cannot include ProSe data of two different ProSe destination groups, as currently-standardized. Consequently, even if radio resources are still available after all ProSe logical channels of the selected ProSe destination group are served (i.e. if there is room left in the MAC PDU), no further ProSe data of other ProSe logical channels can be included; e.g. the MAC PDU is filled with padding or ProSe MAC CE if existing.

The thus generated MAC PDU can then be further processed and transmitted in the usual manner. For instance, depending on the resource allocation mode, the transmission of the MAC PDU, and previously of the corresponding SA message, can be performed as explained in the background section, e.g. in connection with FIGS. 15 and 16.

As a further optional improvement to the first embodiment, the UE should further consider the following rules when performing the LCP procedure:
the UE should not segment an RLC SDU (or partially transmitted SDU) if the whole SDU (or partially transmitted SDU) fits into the remaining resources;
if the UE segments an RLC SDU from the sidelink logical channel, it shall maximize the size of the segment to fill the grant as much as possible;
the UE should maximize the transmission of data.
if the UE is given an sidelink grant size that is equal to or larger than 10 bytes while having data available for transmission, the UE shall not transmit only padding.

These optional rules are taken from the currently-standardized LCP procedure as presented in the background section, and can be likewise used for the improved/assisted LCP procedure of the first embodiment (also for the second and third embodiments).

The advantage achieved by the first embodiment is that the selection of the ProSe destination group is not left up to the UE implementation. Rather, by appropriately assigning priorities to the different ProSe destination groups and having the UE select the ProSe destination group based on the assigned priority, the UE behavior is predetermined in said respect, and thus foreseeable (for the eNB e.g.). Correspondingly, the eNB can use this foreseeable UE behavior to improve its scheduling (when eNB-scheduled resource allocation Mode 1 is used), and thus e.g. to mitigate the half-duplex problem. In particular, the eNB would not schedule two UEs for the same TTI if they have the same ProSe destination group as having the highest priority. In the above-discussed scenario when explaining the half-duplex problem, the eNB would thus only schedule one of the two UEs, and the other UE e.g. in the next or a subsequent TTI, so as to avoid that the two UEs transmit at the same time to the same ProSe destination group. Radio resources are no longer wasted, and can thus be used/scheduled more efficiently.

Furthermore, important ProSe data (such as for important ProSe destination groups, such as public safety, police, etc.) will not be delayed unnecessarily since the corresponding ProSe destination group priorities will be set high, and will thus be served preferentially in the UE when performing the LCP procedure, as presented above.

According to a variant of the first embodiment, the selection of the ProSe destination group based on their ProSe destination group priority is improved further, by taking into account the previous LCP procedure(s). In other words, the ProSe destination groups are not served strictly by decreasing order of their ProSe destination group priority, but there may be exceptions when considering previous LCP procedures such that delay and/or starvation of lower-priority ProSe destination groups is avoided.

The step of selecting that ProSe destination group among the ProSe destination groups with available data with the highest priority among them can be repeated at each time instance where a new transmission is to be performed, i.e. each time an LCP procedure is performed. In said case, one and the same ProSe destination group, having the highest priority among them, is selected every time, assuming that ProSe data is always available for said ProSe destination group. This can lead to significant delays and starvation of ProSe destination groups with lower priority, aggravated by the current standardization which requires that during one SA/data period (for which the LCP procedure is performed) the UE can transmit only to one ProSe destination group. Thus, even if unused resources would be available at some point during the SA/data period after serving that ProSe destination group with the highest priority, they could not be used for ProSe data destined to other ProSe destination groups.

In order to avoid the disadvantages for such scenarios, a variant of the first embodiment improves the first prioritization mechanism by avoiding that a particular ProSe destination group is repeatedly served for a prolonged time when ProSe data is likewise available for other, lower-priority, ProSe destination groups.

In more detail, the step of selecting that ProSe destination group among the ProSe destination groups with available data with the highest priority among them is not performed as such for a case where in a previous LCP (or in a LCP performed some predetermined time ago) that same ProSe destination group with the highest priority was already served, even though ProSe data (old or new) for this ProSe destination group is available for transmission when performing this subsequent LCP procedure. In such a case, that already-served ProSe destination group is momentarily disregarded for the LCP procedure, such that effectively the ProSe destination group among the remaining ProSe destination groups with available data with the second-highest priority among them is selected for further proceeding with the LCP procedure.

This improved variant of the first embodiment may also be applied in future scenarios, as will be explained below. At the moment it is standardized that the UE has only one valid ProSe grant per SA/data period, such that even if the UE would receive a second ProSe grant, it would discard the "old" grant in favor of the new one. Furthermore, during one SA/data period, for which this ProSe grant is valid, the UE can transmit only to one ProSe destination group. In consequence, even if no more data is available for the initially-selected ProSe destination group, it is not possible to use unused radio resources from the grant to transmit data to another ProSe destination group. This is a waste of resources, and thus this may change in future releases, such that during one SA/data period more than one ProSe destination group can be served and more than one ProSe grant can be received and used. Respectively for the autonomous selection (Mode 2), the UE may be allowed to select more than one SL grant for a SA/data period. Moreover, one MAC PDU may still be required to include only data for one ProSe destination group.

In such a case, where multiple ProSe MAC PDUs are to be transmitted (i.e. to multiple ProSe destination groups) and multiple ProSe grants are available, the selection of the ProSe destination groups is performed in a decreasing order of the ProSe destination group priority. In detail, the first ProSe grant is used during a first LCP procedure for that ProSe destination group with available data with the highest priority among them. However, the second ProSe grant is used during a second LCP procedure for that ProSe destination group with available data with the second-highest priority among them, even if there is remaining data available to be transmitted to the ProSe destination group with the highest priority among them. And so on for any further ProSe destination groups and ProSe grants.

Second Illustrative Embodiment

Although the first embodiment already provides various advantages over the corresponding LCP procedure of the prior art, the inventors have identified further disadvantages.

Another problem with the prior art and also with the procedure of the first embodiment is that there is no guarantee that the UE serves delay-critical services, like Voice over IP (VOIP), with the highest priority, since the selection order of the sidelink logical channels during the LCP procedure is left up to the UE implementation. A wrong or un-optimized UE implementation may result in delay-critical services to suffer large latencies and perhaps even starvation.

Figure 20:
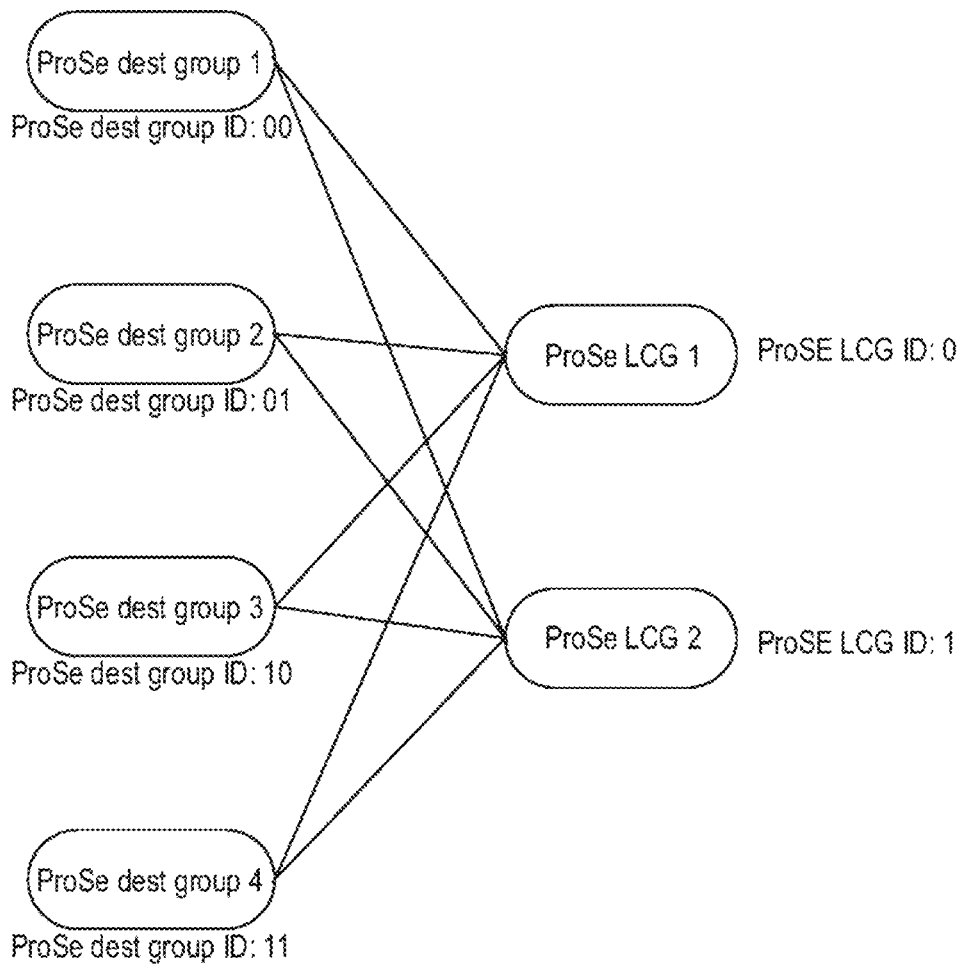
FIG. 20 illustrates the relationship between different ProSe LCGs and ProSe destination groups according to a particular variant of the second embodiment.

For illustration purposes only, the following exemplary scenario is considered where three ProSe logical channels, LCH #1, LCH #2, and LCH #3, are set up in the user equipment, and all three are associated with the same ProSe LCG (e.g. "11") as in the prior art. It is exemplarily assumed that LCH #1 and LCH #2 are assigned to ProSe destination group 1, and LCH #3 is assigned to ProSe destination group 2. This is illustrated in FIG. 20. ProSe destination group 1 is assumed to have a higher priority than ProSe destination group 2. ProSe data is available to be transmitted for all three logical channels, and radio resources are available to be allocated by the UE.

If the various variants of the first embodiment are applied to this scenario, the UE would first select ProSe destination group 1, for having the higher priority between the two ProSe destination groups for which data is to be transmitted. Then, since the order in which the logical channels of selected ProSe destination group 1 are served, i.e. LCH #1 and LCH #2, is up to the UE implementation, either LCH #1 or LCH #2 is served first. Thus, if there are not enough radio resources for the data of both LCHs, then data of one of the two ProSe LCHs will be delayed, and in the worst case starvation may happen. This is particularly detrimental if this happens to delay-critical services, such as VoIP. For instance, assuming that LCH #1 is carrying the delay-critical data, if the UE decides to serve LCH #2 first, the correspondingly constructed MAC PDU might not contain any of the data of the delay-critical service or only some of it.

The variants of the second embodiment shall overcome this problem, and for that purpose a second prioritization level is introduced as will be explained in detail below. In the following, the second embodiment will be explained for illustration purposes mainly as being completely based on the first embodiment, i.e. it extends the first embodiment by additionally implementing the second prioritization level but maintains the other features of the first embodiment (and its variants). However, it should be noted that the use of the secondary prioritization mechanism can be also used stand-alone, i.e. without having the first prioritization mechanism of selecting the ProSe destination group based on its priority. Consequently, while the following explanation focuses on a second embodiment which indeed includes the first prioritization mechanism of the first aspect (and all its variants explained above), the second embodiment shall not be restricted thereto but may be considered standalone.

The second prioritization mechanism used for the second embodiment distinguishes between different ProSe Logical Channel Groups, ProSe LCGs, and their corresponding priority. In short, in contrast to the current standardization where only one ProSe LCG ("11") is provided for ProSe logical channels (see background and e.g. FIG. 20), a plurality of ProSe LCGs is defined for ProSe direct communication to which the UE may associate the set-up ProSe logical channels. Further, each of the plurality of ProSe LCGs is assigned a respective priority, e.g. termed "ProSe LCG priority". Then, when performing an LCP procedure, the UE takes into account the respective priorities of the ProSe LCGs, to which the various ProSe logical channels belong, when allocating the available resources between the ProSe logical channels, namely such that the ProSe logical channels are served in a decreasing order of their associated priority. This will be explained in more detail in the following.

There are several possibilities on how the different ProSe LCGs are defined. Among other things, this will also depend on how the mapping between the ProSe logical channels and the ProSe LCG in relation to the various ProSe destination groups shall be implemented. Two alternative possible mappings will be presented below, although others may be equally possible.

Figure 21:
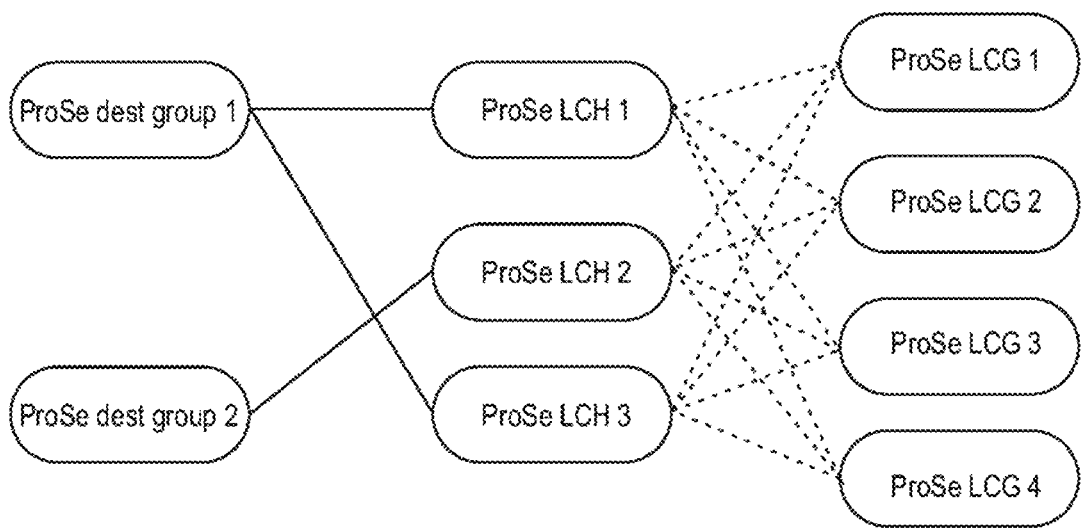
FIG. 21 illustrates the possible mappings between ProSe LCHs and ProSe LCGs for a particular association between ProSe LCHs and ProSe destination groups according to the particular variant of the second embodiment illustrated in FIG. 20.
Figure 22:
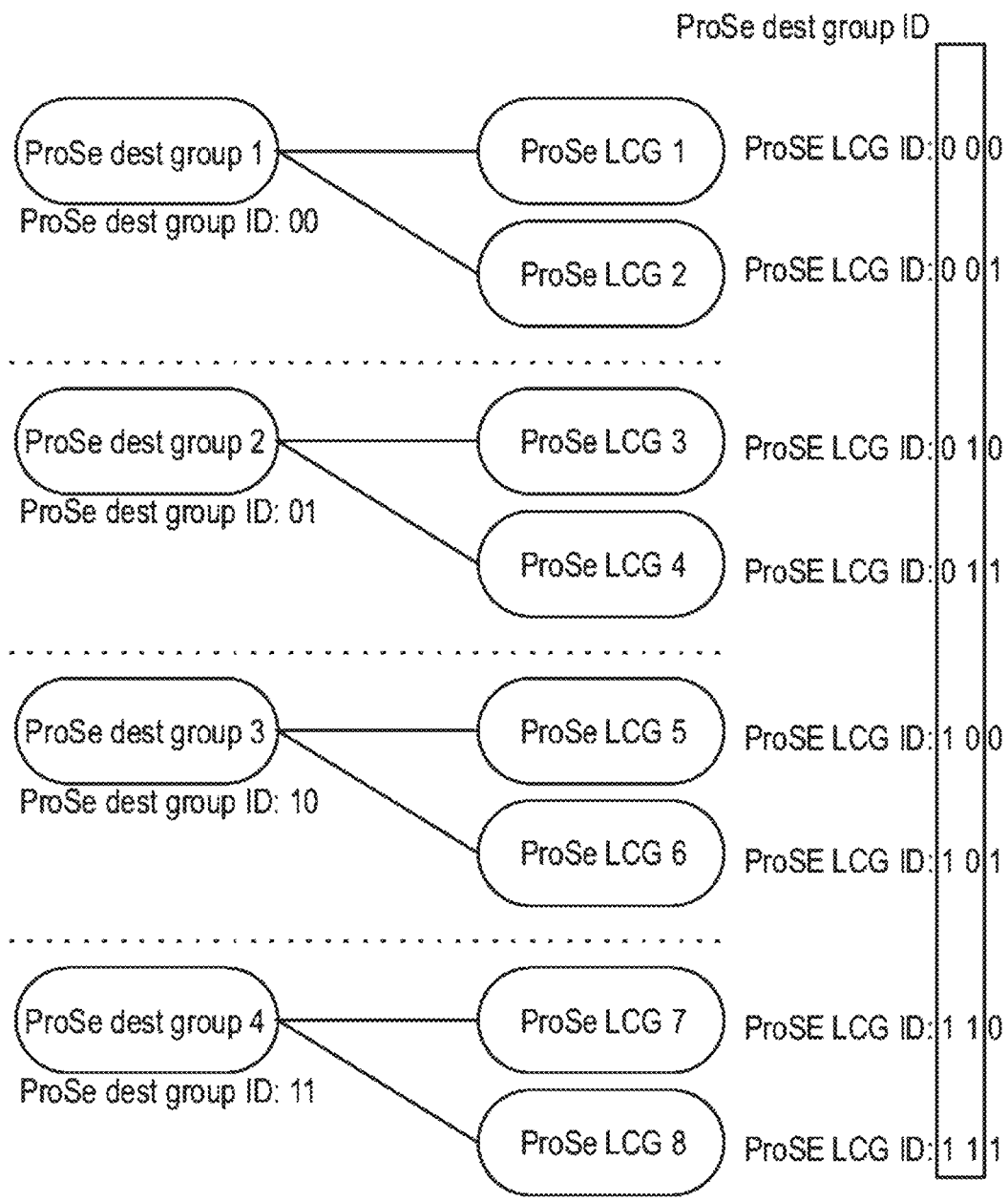
FIG. 22 illustrates the relationship between different ProSe LCGs and ProSe destination groups according to another particular variant of the second embodiment.

The two alternatives will be illustrated in connection with FIGS. 21 and 23, which shall illustrate the relationship between the ProSe destination groups and the ProSe LCGs. In both figures, it is exemplarily assumed that there are in total only four ProSe destination groups, i.e. with a corresponding ProSe destination group ID of 2 bits, and it is further assumed that for identifying a ProSe LCG 1 bit is available, 0 or 1. Respective examples are illustrated in FIGS. 22 and 24, where a different scenario is assumed with two ProSe destination groups and four ProSe LCGs.

The first alternative will be explained in connection with FIG. 21, which illustrates that each ProSe destination group can be related to any of the ProSe LCGs; in other words, the ProSe LCGs are defined irrespective of the defined ProSe destination groups. Consequently, by using the ProSe LCG ID it is possible to distinguish between the defined ProSe LCGs, i.e. ProSe LCG ID:0 identifies ProSe LCG #1, and ProSe LCG ID:1 identifies ProSe LCG #2. The corresponding mapping of the ProSe logical channels to the different ProSe LCGs by the UE takes this into account, and thus is independent from the ProSe destination group to which the ProSe logical channel belongs. For instance, a UE when setting up its ProSe logical channels will assign each of them to any one of the defined ProSe LCG as appropriate. This is exemplarily illustrated in FIG. 22, where ProSe LCH #1 and ProSe LCH #3 are assumed to be associated with ProSe destination group 1, and ProSe LCH #2 is associated with ProSe destination group 2. As depicted with dashed lines, each of the ProSe logical channels can be associated with any of the ProSe LCGs 1-4, irrespective of their association with the ProSe destination group. Put differently, ProSe LCHs associated with different ProSe destination groups can be mapped to the same ProSe LCG (which is not possible for the second alternative explained below).

Figure 23:
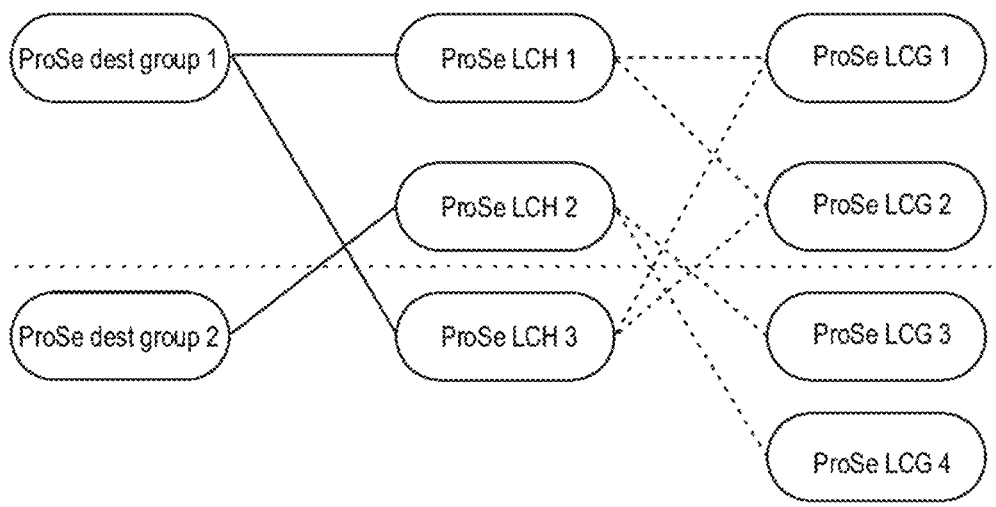
FIG. 23 illustrates the possible mappings between ProSe LCHs and ProSe LCGs for the same particular association between ProSe LCHs and ProSe destination groups as in FIG. 21 according to the particular variant of the second embodiment illustrated in FIG. 22.
Figure 24:
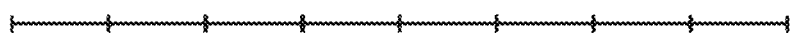
FIG. 24 illustrates the ProSe Buffer Status Reporting MAC Control Element according to a variant of the second embodiment.

According to the second alternative, illustrated in FIG. 23, for each ProSe destination group different ProSe LCGs are defined. For the exemplary scenario of FIG. 23, there may be in total 8 different ProSe LCGs, which is 4×2, where 4 relates to the total number of different ProSe destination groups, and 2 relates to the different ProSe LCGs per ProSe destination group. In order to unambiguously distinguish between all the different ProSe LCGs, it is necessary to consider the ProSe destination group (e.g. ProSe destination group ID) in addition to the ProSe LCG ID. Put differently, the ProSe LCGs are restricted tor only a particular ProSe destination group. Correspondingly, the ProSe destination group ID alone unambiguously defines the ProSe destination group, and in combination with the ProSe LCG ID provides a codepoint for unambiguously identifying the ProSe LCG. The corresponding possible mapping of the ProSe logical channels to the different ProSe LCGs by the UE is also different from the one explained for FIGS. 21 and 22. As explained above, the UE when setting up the ProSe logical channels will be assigned for each of them a particular ProSe destination group, as appropriate. The UE may then be assigned for each of the ProSe logical channels only those ProSe LCGs which belong to the ProSe destination group with which the logical channel is associated. This is exemplarily illustrated in FIG. 24, where the same association between ProSe LCHs and ProSe destination groups as for FIG. 22 is assumed. Here however, since ProSe LCHs 1 and 3 are associated with ProSe destination group 1, they can only be associated with ProSe LCGs 1 or 2, i.e. those which are themselves associated with ProSe destination group 1 (see dashed lines). The same applies to ProSe LCH 2 which thus can only be mapped by the UE to either ProSe LCG3 or LCG 4, i.e. those which are themselves associated with ProSe destination group 2.

Figure 15:
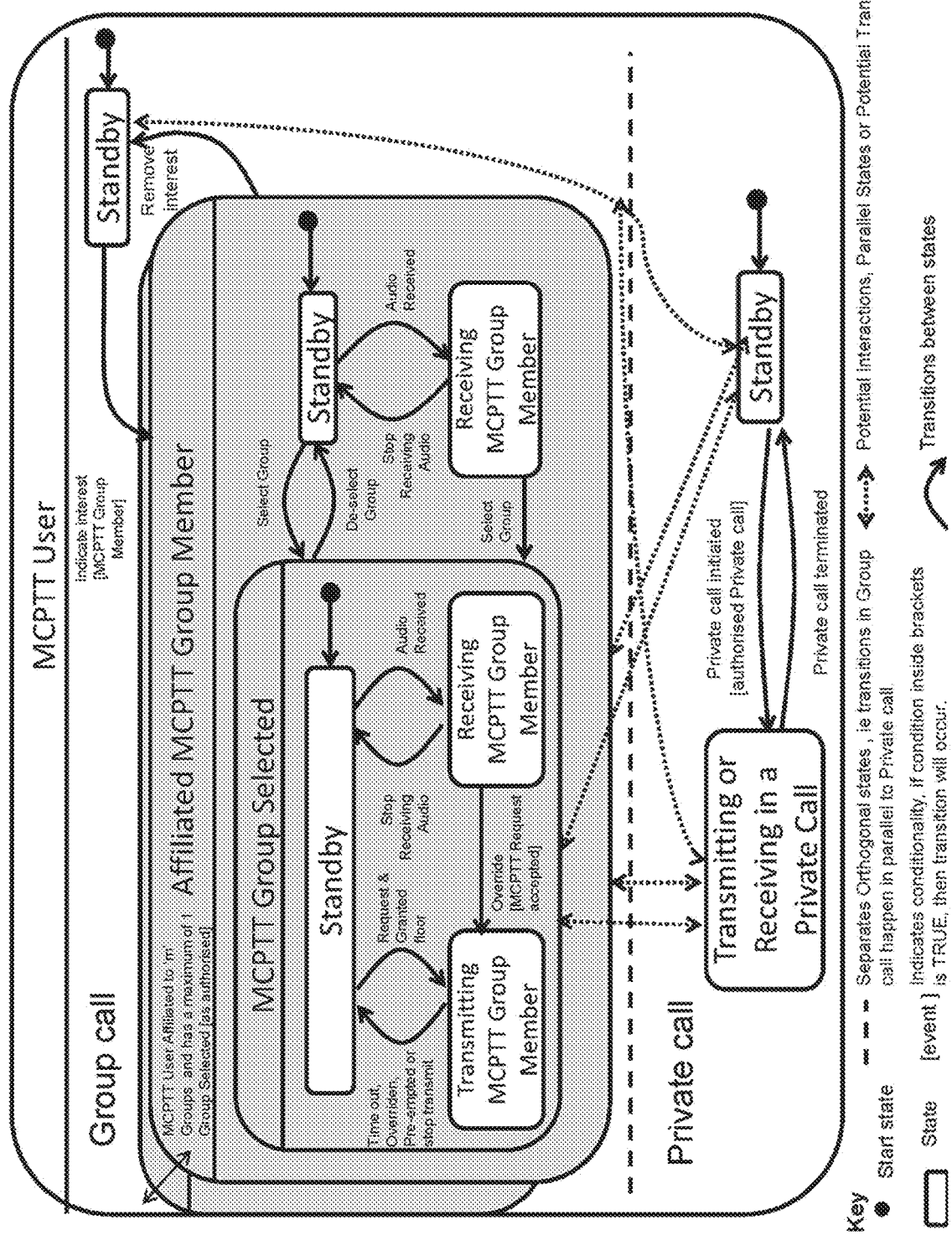
FIG. 15 illustrates a MCPTT user state diagram for a user which has allowed both receiving and transmitting with respect to a particular MCPTT group.
Figure 16:
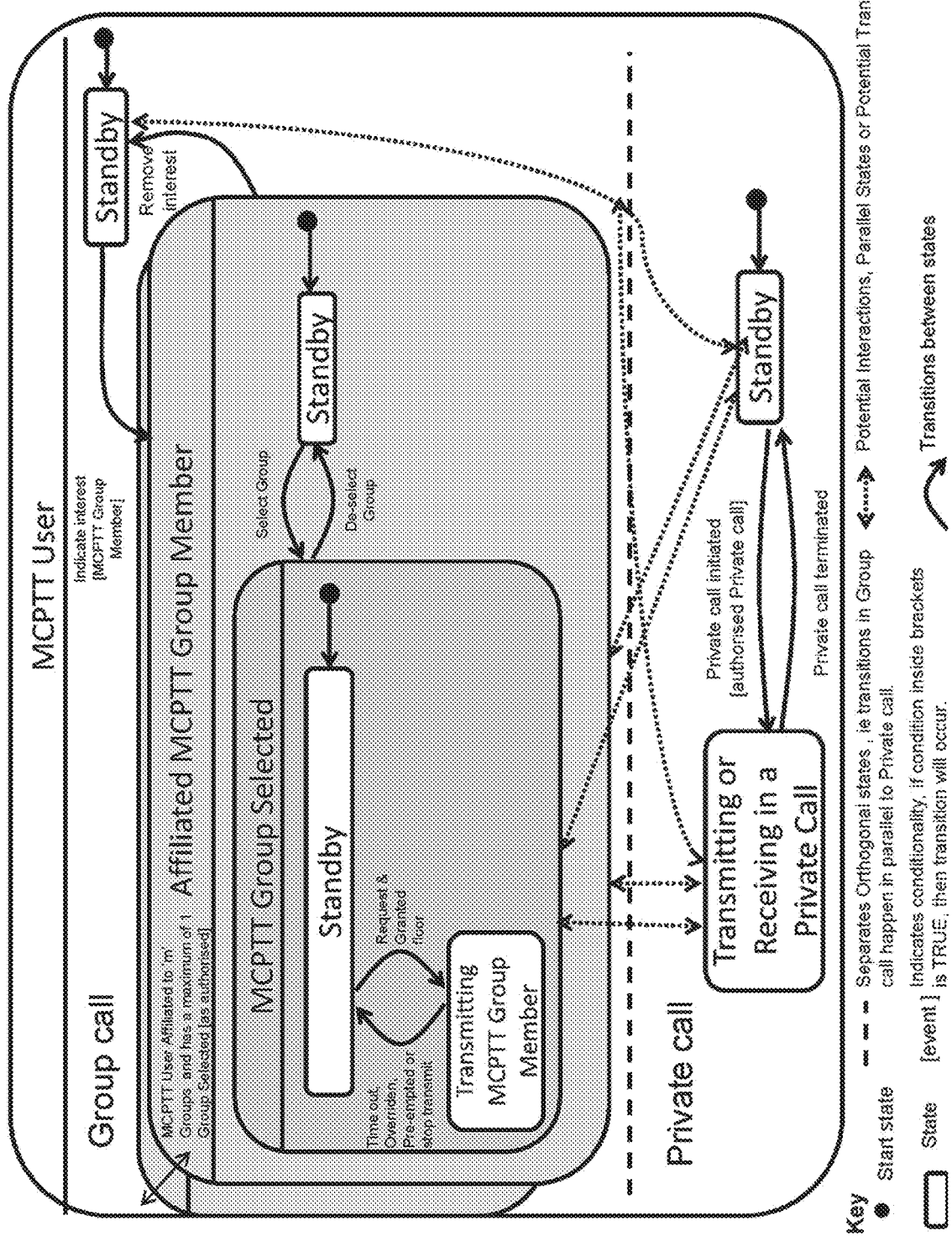
FIG. 16 illustrates a MCPTT user state diagram for a user which has allowed only transmitting with respect to a particular MCPTT group.
Figure 17:
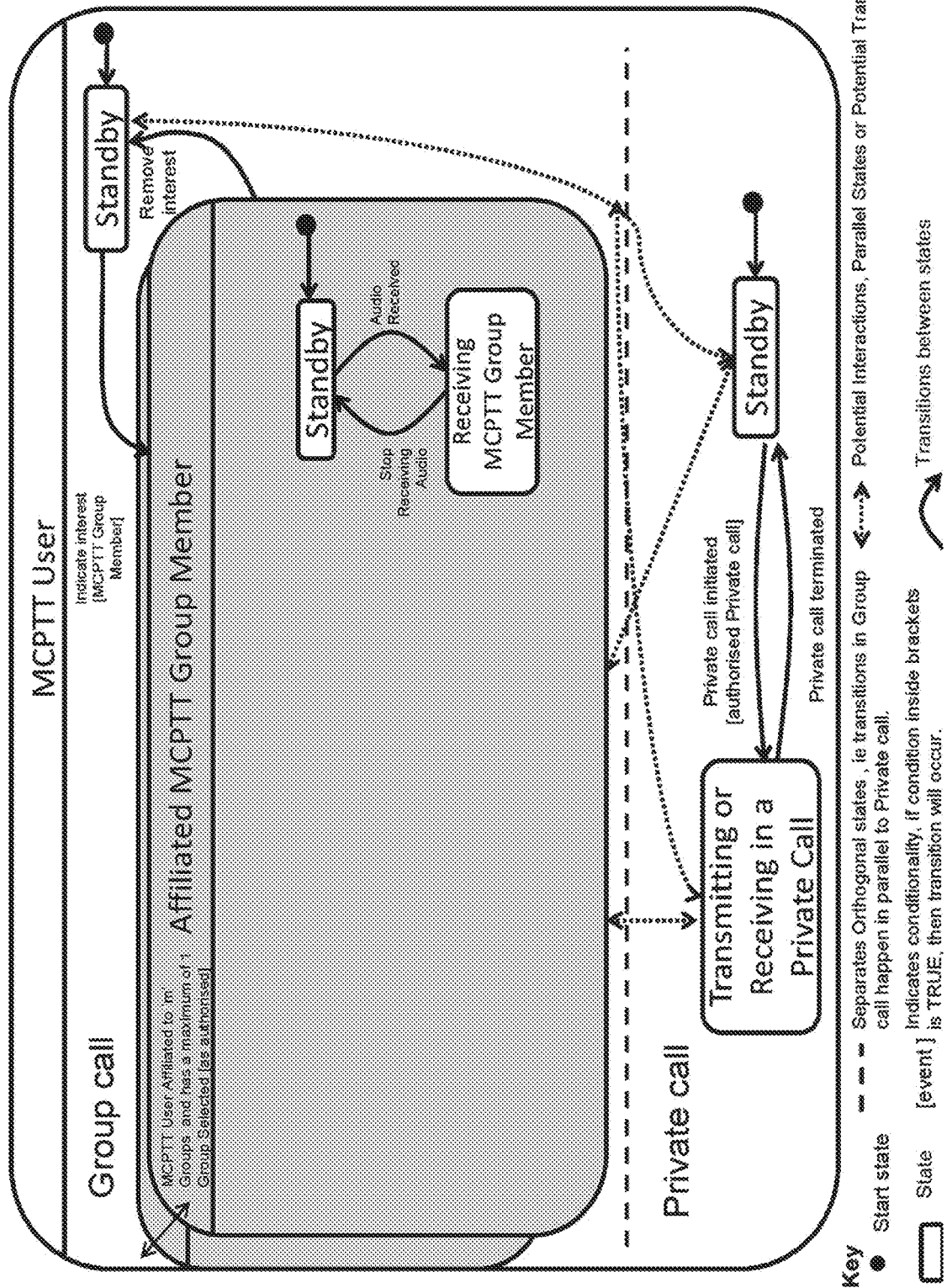
FIG. 17 illustrates a MCPTT user state diagram for a user which has allowed only receiving with respect to a particular MCPTT group.
Figure 18:
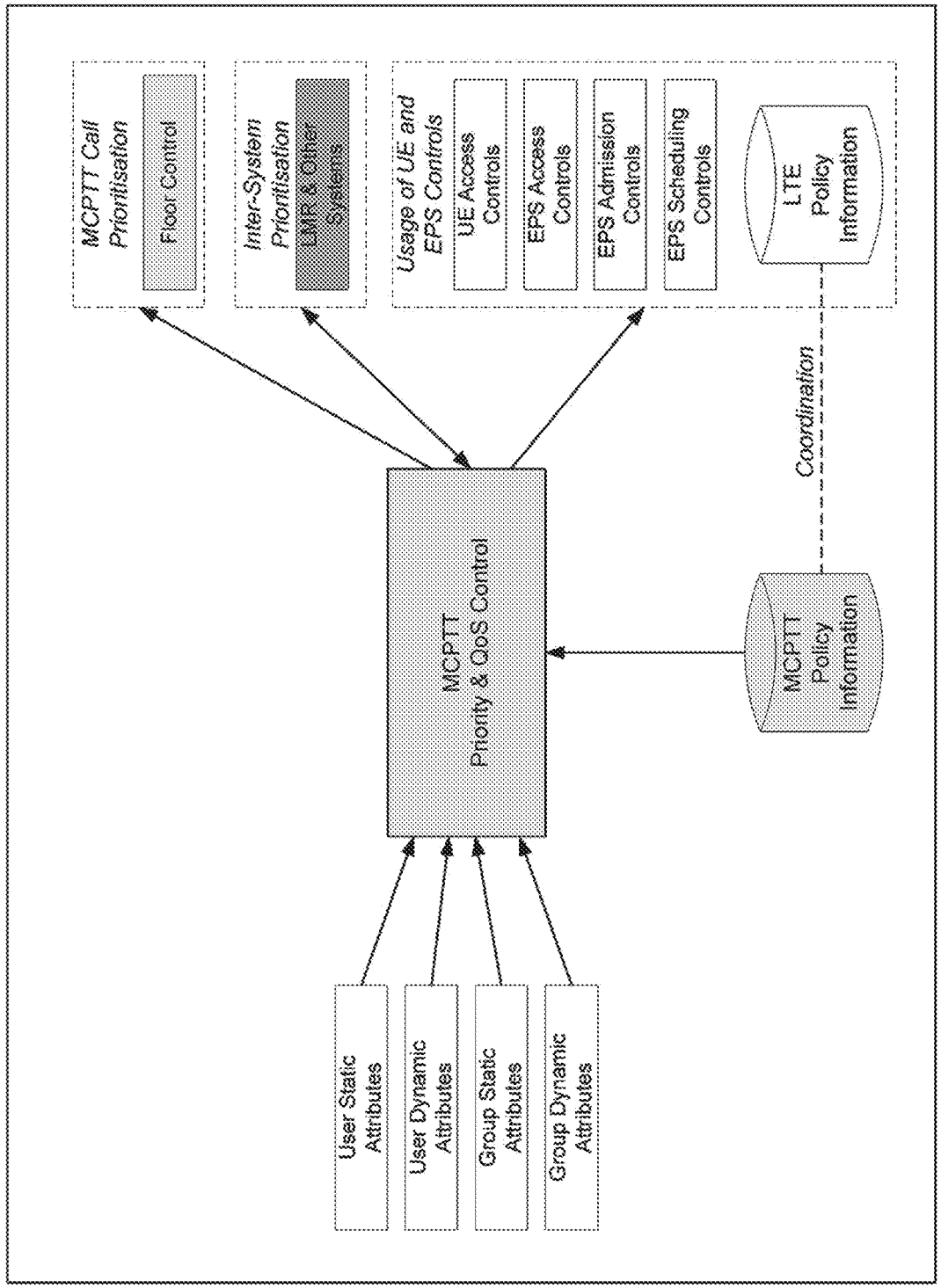
FIG. 18 shows a conceptual on-network MCPTT priority model.

According to one variant, the different ProSe LCGs and their priorities may be defined centrally, e.g. by a higher-layer entity in the network, i.e. a corresponding ProSe function or entity which shall be responsible in said respect, e.g. the ProSe Function already presented in the background section in connection with FIG. 15. In said case, the information on the ProSe LCGs and their priorities are distributed to other entities in the network, such as the ProSe-enabled UEs which can be performed directly via the PC3 interface, and to the eNodeB, e.g. by use of some higher-layer protocol.

Alternatively, the respective information on the ProSe LCGs and their priorities can be provided to the eNB(s) of the E-UTRAN first, which could in turn inform the UEs, instead of the ProSe Function directly contacting the UEs.

Alternatively, the ProSe LCGs and their priorities may also be pre-configured in the UE (and the eNB) (e.g. by the standard or stored in the UICC), such that corresponding information does not have to be signaled in the network but is already available at the UE (and the eNB) from the beginning.

Furthermore, there are also several possibilities on how the actual priority levels available for the ProSe LCGs can be implemented. This may e.g. depend on the total number of ProSe LCGs, which may vary depending on the actual implementation as explained in connection with FIG. 21-24. For example, one variant of the second embodiment would then provide the same number of priority levels as the number of ProSe LCGs, e.g. starting from priority level 1 as being the highest etc. However, there may be also less priority levels than ProSe LCGs. Any other suitable prioritization of the ProSe LCGs is possible, too.

The ProSe LCG priorities are used in the LCP procedure of the second embodiment for a second prioritization mechanism, which determines in which order the ProSe logical channels are served when allocating the available radio resources for constructing a MAC PDU for a new transmission. Particularly, the ProSe logical channels have a ProSe LCG priority associated via the ProSe LCG to which they have been mapped. According to the second prioritization, the available resources are allocated to the ProSe logical channels in a decreasing order of their corresponding ProSe LCG priority.

The MAC PDU is thus sequentially constructed with the ProSe data from the ProSe logical channels in a decreasing ProSe LCG priority order.

It should be noted that ProSe logical channels which are associated with the same ProSe LCG, will have the same priority, i.e. the same ProSe LCG priority; the order in which these particular ProSe logical channels with the same associated priority are served during the LCP procedure is e.g. up to the UE implementation.

The advantage of implementing said second level of prioritization based on the ProSe LCG priorities is that a fine prioritization control is possible for sidelink logical channels belonging to the same ProSe destination group. Since the UE behavior is predictable, the eNB can schedule more efficiently for the eNB-scheduled resource allocation Mode 1. Furthermore, delay-critical data, such as VoIP, will be transported by a ProSe logical channel which the UE would map to a ProSe LCG with a correspondingly high priority. Consequently, since the LCP procedure according to the second embodiment would take these ProSe LCG priorities into account while allocating the resources, the delay-critical data will be transmitted first, without any unnecessary delay.

As mentioned above, the second prioritization level can be implemented in various variants of the first embodiment, such that there are two subsequent levels of prioritization: in a first step the UE serves the ProSe destination groups in a decreasing order of their priorities, and then in a subsequent second step the UE serves the ProSe logical channels of the currently-selected (i.e. currently-served), high-priority, ProSe destination group in a decreasing order of their associated ProSe LCG priority.

In an alternative implementation the UE could derive, based on the ProSe destination group priorities and the ProSe LCG priorities associated to the logical channels, a logical channel priority and serve the logical channels in the priority order of the logical channels. More in particular, the priority of a logical channel would be a function of the priority of the ProSe destination group associated with this logical channel and the priority of the ProSe LCG associated with this logical channel. In one exemplary implementation the UE could first derive the priorities of the logical channels by using a function of the ProSe destination group priorities and ProSe LCG priorities as explained before and then perform the LCP procedure similar to LTE uplink case, where logical channels are served in the logical channel priority order.

Figure 19:
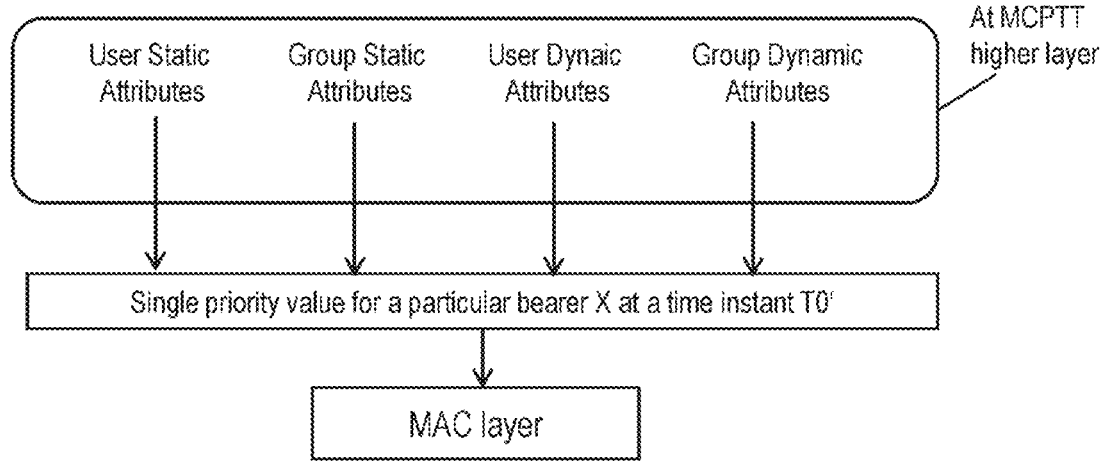
FIG. 19 shows schematically integration of priorities in the layer model.

A further variant of the second embodiment provides an adapted buffer status reporting such that the eNB receives more detailed information. At the moment, the ProSe buffer status report provides buffer size information per ProSe destination group, which indicates the amount of data available across all ProSe logical channels of said ProSe destination group (see background section and FIG. 19). Furthermore, all sidelink logical channels are mapped to one LCG in the prior art. Consequently, the currently-standardized ProSe Buffer Status Report MAC Control Element does not distinguish between data of different logical channels within one ProSe destination group.

According to one variant, the ProSe buffer status report provides more detailed information, namely buffer size information per pair of ProSe destination group and ProSe LCG, the buffer size information indicating the amount of ProSe data across all ProSe logical channels being associated with said pair, i.e. associated with both the ProSe destination group and ProSe LCG of said pair.

Figure 25:
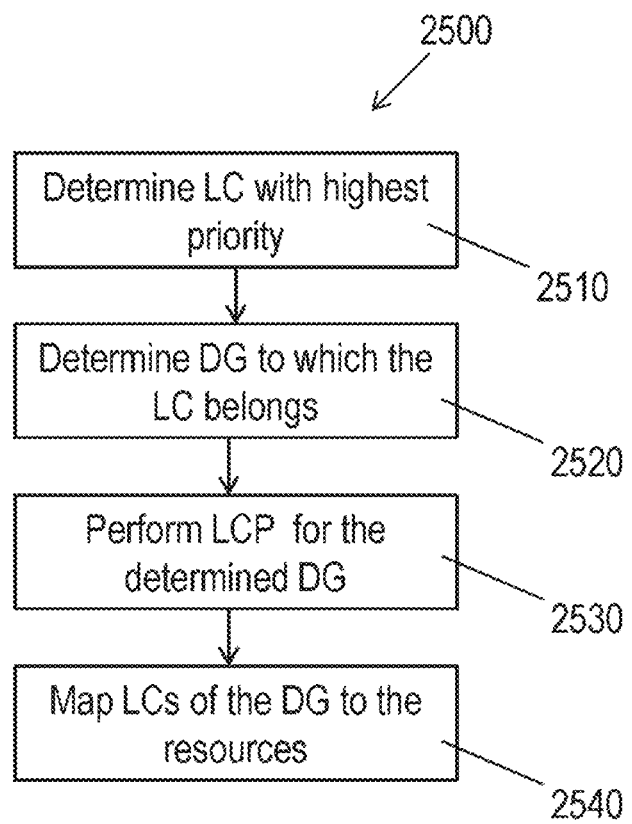
FIG. 25 is a flow diagram illustrating an exemplary method for prioritization according to the fifth embodiment.

FIG. 25 exemplarily discloses a ProSe BSR MAC control element according to this variant of the second embodiment, wherein for each pair of ProSe destination group and ProSe LCG, the MAC CE includes the following:

Group index: The group index field identifies the ProSe destination group of the pair. The length of this field is 4 bits. The value is set to the index of the destination identity reported in ProseDestinationInfoList;

LCG ID: The Logical Channel Group ID field identifies the ProSe LCG of the pair (and thus identifies logical channel(s) which buffer status is being reported). The length of the field is 2 bits;

Buffer Size: The Buffer Size field identifies the total amount of data available across all logical channels of the ProSe destination group—ProSe LCG pair, after all MAC PDUs for the TTI have been built. The amount of data is indicated in number of bytes;

Depending on the actual format used for the ProSe BSR MAC CE, there might be reserved bits, set to e.g. "0".

In the particular example taken for FIG. 25, it is assumed that LCH #1 is associated with ProSe destination group 1 and ProSe LCG 1, LCH #2 is associated with ProSe destination group 1 and ProSe LCG 2, and LCH #3 is associated with ProSe destination group 2 and ProSe LCG 2. Consequently, there are three pairs of ProSe destination group and ProSe LCG, namely ProSe destination group 1 with respectively ProSe LCG 1 and 2, and ProSe destination group 2 with ProSe LCG 2.

The advantage of the above-described improved ProSe BSR is that the eNB can now distinguish between different ProSe LCGs belonging to the same ProSe destination group, which allows the eNB to provide a more efficient scheduling.

With the above-described change with regard to the actual content of the ProSe BSR, the improved ProSe buffer status reporting can be additionally defined as in the prior art, e.g. explained in the background section (with reference to R2-145435, CR 0744 for TS 36.321, subclause 5.x.1.4). Only as a few examples: RRC may control the sidelink BSR reporting by configuring the two timers Periodic-ProseBSR-Timer and RetxProseBSR-Timer; different events trigger the ProSe BSR; different types of ProSe BSR exist, such as the Padding ProSe BSR, Regular and Periodic ProSe BSR.

Third Illustrative Embodiment

The third embodiment further improves the resource allocation procedure of the UE when performing an LCP procedure. In particular, the third embodiment focuses on the UE-autonomous scheduling Mode 2, where the UE selects radio resources from a resource pool when needed for a new transmission.

The third embodiment can be combined with any of the variants of the first and second embodiment, but can be also implemented as stand-alone.

As explained in the background section, the UE can be provided with multiple resource pools respectively for the transmission of the SA message and D2D data. Thus, in the following it is assumed that a plurality of resource pools for the D2D communication in the autonomous resource allocation mode is defined for the UE, i.e. more in particular a plurality of resource pools for the transmission of the scheduling assignments (SA) and a plurality of resource pools for the corresponding D2D data transmission. This can be done e.g. by the eNB and/or by a ProSe function/entity in the network, responsible in said respect. These pluralities of resource pools for SA and data are provided to the UE e.g. via SIB18, i.e. broadcasted in the System information of the corresponding cell.

Correspondingly, different resource pools are available to the UE when having to perform UE-autonomous resource allocation (Mode 2), i.e. when generating a new D2D MAC PDU. Furthermore, for the third embodiment it is assumed, as for all the variants of the first and second embodiments, that a plurality of ProSe destination groups is defined. For some variants of the third embodiment, it may be assumed that each of the ProSe destination groups is associated with a particular ProSe destination group priority; further details are already provided in the first and second embodiments, and are thus omitted here.

In order to further improve the resource allocation by the UE when in Mode 2, after the UE selects that ProSe destination group with ProSe data available for transmission (e.g. with the highest priority among them), the appropriate resource pool (more in particular a resource pool for transmission of the scheduling assignment and a resource pool for the corresponding data) among the various resource pools is selected by the UE based on the selected ProSe destination group. Put differently, the UE selects radio resource pools (for SA and data) which are appropriate for the selected ProSe destination group. This selection of the radio resource pool(s) can be implemented in different ways, two of which will be presented in the following.

According to the first variant, a new mapping between ProSe destination groups and resource pools is introduced, such that each ProSe destination group is assigned a resource pool for SA and a resource pool for D2D data. This mapping can be defined e.g. by a ProSe function/entity in the network, responsible in said respect. In said case, the information on the mapping is transmitted to the UE (and the eNB) e.g. by use of some higher-layer protocol. Alternatively, this mapping can be pre-configured in the UE (and the eNB) (e.g. by the standard, or stored in the UICC), such that the corresponding mapping does not need to be signaled over the network, but is already available at the UE (and the eNB).

In any case, based on the selected ProSe destination group, the UE may then simply select that resource pool, respectively resource pools (one for SA and one for the corresponding D2D data) which is associated to the selected ProSe destination group, based on the stored mapping information. Since within one SA/data period, also referred to as Sidelink Control (SC) period, a D2D UE can only transmit D2D MAC PDUs to one ProSe destination group, the selection of the resource pool(s) needs to be done only once per SA/data period.

According to the second variant, instead of providing an explicit mapping, the UE shall determine the appropriate radio resource pool for the selected ProSe destination group differently. In particular, each of the plurality of resource pools is assigned a particular priority, e.g. termed resource pool priority.

There are also several possibilities on how the actual priority levels available for the plurality of resource pools are implemented. The second variant foresees that the priorities of the ProSe destination groups and the resource pools shall be compared to appropriately select a resource pool based on the selected ProSe destination group. Consequently, the two priorities shall be defined in such a manner that they are comparable in a meaningful manner. An example given before for the priorities of the ProSe destination groups assumed 8 different priority levels, with priority level 1 as being the highest and priority level 8 being the lowest. Correspondingly, the priority of the resource pools can be defined and assigned in a similar manner, such that a resource pool which should only be used for important data, is assigned a high priority (e.g. 1), and a resource pool which can already be used for less important data, is assigned a low priority (e.g. 8).

These resource pool priorities and the assigning of the priorities could be done e.g. by the same ProSe function/entity in the network, which was already responsible for setting up the plurality of resource pools. In said case, the information of the priority level of a particular radio resource pool could be signaled together with the information on the particular radio resource pool itself; e.g. in the pool configuration signaled in SIB 18.

Alternatively, the priorities could be pre-configured in the UE (and the eNB) (e.g. by the standard or stored in the UICC), in the same manner as the mappings for the first variant of the third embodiment.

In any case, according to the second variant, the UE is configured with a plurality of resource pools (respectively for SA and D2D data), each of which has assigned a particular priority level. As mentioned above, the priorities of the resource pools are defined such that only data of sidelink logical channels belonging to a ProSe destination group with a group priority same (or higher) than the priority associated to the resource pool can be transmitted with radio resources from said resource pool.

Correspondingly, after the UE selected a ProSe destination group (based on the ProSe destination group priority), the UE compares the priority of the selected ProSe destination group with the priority of the various resource pools, and selects that resource pool (one for SA and one for D2D data) having a pool priority that is the same or lower than the ProSe destination group priority of the selected ProSe destination group.

Correspondingly, the UE can determine a sidelink grant based on radio resources of the selected radio resource pool. The radio resources of the determined sidelink grant can then be used and allocated to the various ProSe logical channels according to the LCP procedure discussed for various variants of the first and second embodiments.

The advantage of having a resource pool selection mechanism is that the UE behavior for the selecting a resource pool for Scheduling assignment and corresponding data transmission is predictable from eNodeB point of view. This allows eNodeB to control the load on the different resource pools. Furthermore, the interference situation could differ for the different resource pools, such that the ProSe data transmission experiences a different Quality of Service (QOS).

Alternatively, different resource pools could be defined for different cyclic prefix (CP) lengths, i.e. one of the plurality of the resource pools for the D2D transmission shall use the extended CP length, whereas other resource pools for the D2D transmission shall use the normal CP length.

In the following, the sequence of steps is briefly explained when the third embodiment is combined with the basic variant of the second embodiment. Accordingly, it is assumed that the UE is in scheduling Mode 2 (UE-autonomous). In a first step, the UE shall determine the ProSe destination group for which it wants to transmit D2D data in this TTI, respectively SA/data period, based on the ProSe destination group priority (e.g. the one having the highest among them). Then, the UE determines the corresponding resource pool based on the selected ProSe destination group (either based on the mapping information, or based on the priority comparison explained above). Based on the selected radio resource pool, the UE will select a sidelink grant from the selected radio resource pool and assign said radio resources of the grant to the ProSe logical channels of the selected ProSe destination group in a decreasing order of the ProSe LCG priority associated with the ProSe logical channels.

The third embodiment can however also be applied to the eNB-scheduled resource allocation mode (Mode 1), assuming that the plurality of resource pools are also available for the UE when being scheduled in Mode 1. In particular, in future releases the plurality of resource pools currently being defined for Mode 2 only, may become also usable for Mode 1 scheduling, such that the UE needs to be instructed to which resource pool the eNB-scheduled grant, received from the eNB, actually refers.

Consequently, according to this variant of the third embodiment, when the UE receives a sidelink grant from the eNB, it performs the improved LCP procedure as explained above in connection with the first and second embodiments. However, in order to apply the eNB grant, it will select that resource pool based on the selected ProSe destination group (according to any of the various variants already discussed for the third embodiment in connection with the improved Mode 1 resource pool selection).

Further Illustrative Embodiments

In the following different embodiments will be explained that can be combined with any of the variants of the first, second, and third embodiments explained above, but which may also be considered standalone, i.e. independently from any of the first, second, and third embodiments.

For one additional embodiment, it is assumed that it is possible to use, i.e. configure, both resource allocation modes (i.e. Mode 1 and Mode 2) at the same time, in contrast to the presently standardized implementation where the UE is configured with only one resource allocation mode. In said case, the resource allocation mode can be made e.g. logical channel specific, such that some logical channels are configured for scheduled resource allocation mode, whereas other logical channels are configured for autonomous resource allocation mode. The UE may be configured e.g. by the eNB via RRC signaling, in said respect.

Alternatively the resource allocation mode of a ProSe logical channel could be configured e.g. by the same ProSe function/entity in the network, which was already responsible for assigning the different priorities of the ProSe destination group respectively ProSe LCGs and signaled to the UE respectively eNodeB by higher layer protocol.

Alternatively, the resource allocation mode associated to ProSe logical channel could be pre-configured in the UE (and the eNB) (e.g. by the standard or stored in the UICC), in the same manner as the mappings for the first variant.

In consequence, the LCP procedure performed in the UE would then e.g. only consider those logical channels which are configured for the eNB-scheduled resource allocation mode in case the sidelink grant is received from eNB, and conversely the UE would then only consider those logical channels which are configured for UE-autonomous resource allocation mode in case the side link grant is determined by the UE autonomously from a resource pool (without an eNB grant). Thus, in a first step of the LCP procedure, those logical channels that do not refer to the same resource allocation mode as the currently-processed sidelink grant would be disregarded for the LCP procedure. Therefore, e.g. no radio resources would be allocated thereto. And, when considering the first embodiment, the step of selecting the ProSe destination group would be performed as if these disregarded logical channels would not be part of the ProSe destination group(s). Similarly, when considering the second embodiment, these disregarded logical channels, and their associated ProSe LCG priority, would be ignored when determining the order of logical channels with which the resources are allocated.

Furthermore, the UE would only report data of those logical channels configured for the eNB-scheduled resource allocation mode in the corresponding ProSe BSR.

Alternatively, the resource allocation mode could be made specific of the ProSe destination group, or of the ProSe Logical Channel group.

For another additional embodiment, it is assumed that semi-persistent scheduling is supported for D2D, and thus radio resources of said SPS grant shall be allocated to ProSe logical channels according to the LCP procedure. According to this additional embodiment, data of the ProSe destination group with the highest priority among the ProSe destination groups with available data shall be transmitted; i.e. when generating a new MAC PDU to be transmitted using SPS resources, the highest-priority ProSe destination group is selected for further proceeding with the LCP procedure. Consequently, the SPS resources are allocated to only those ProSe logical channels being associated with the selected ProSe destination group.

Alternatively, particular ProSe destination groups can be (pre-)configured for SPS or not, such that the UE, when allocating SPS resources, may choose from only those ProSE destination groups that are configured for SPS.

The configuration can be done e.g. by higher layer signaling, e.g. by using a flag that indicates that the corresponding ProSe destination group is intended for SPS. Alternatively, this SPS configuration of the ProSe destination groups can be pre-configured in the UE.

One of the advantages achieved by the LCP procedure of the first aspect is that ProSe data for high-priority ProSe destination groups are transmitted first, and are not delayed unnecessarily as in the prior art system. The different priority levels can be appropriately assigned to the different ProSe destination groups by a central ProSe function/entity so as to achieve the desired effect.

In summary, a second prioritization level is implemented for the LCP procedure, in addition to the first prioritization level based on the ProSe destination group priorities discussed in connection with the first aspect. In more detail, instead of providing only one Logical Channel Group, LCG, in connection with ProSe communication as in the prior art, the second aspect is based on a plurality of ProSe LCGs, each of which is associated with one out of a plurality of different priorities, termed e.g. ProSe LCG priority. According to one variant, the ProSe LCGs, and also the corresponding ProSe LCG priorities, can be set up and managed by a ProSe function/entity in the network responsible in said respect. In said case, information on the available ProSe LCGs and their corresponding priority levels can be transmitted to the UE and for example also to the eNB so as to further allow the eNB to improve its scheduling of radio resources for said user equipment. The UE shall then map each of its plurality of configured ProSe logical channels (e.g. STCHs) to one out of the plurality of ProSe LCGs.

When ProSe data is to be transmitted and provided that a sidelink grant is available (either signaled by eNB or determined by the UE autonomously from a resource pool), the improved LCP procedure of the second aspect, being an extension to the improved LCP procedure of the first aspect, introduces a second prioritization level based on the ProSe LCG priorities. Accordingly, in a first prioritization according to the first aspect, the UE selects that ProSe destination group having the highest priority, such that the generated PDU will only contain ProSe data to be transmitted to UEs of said selected ProSe destination group. Then, in a second prioritization, the available resources are allocated to the ProSe logical channels of said selected ProSe destination group by taking into account the ProSe LCG priority associated to the ProSe LCGs to which the ProSe logical channels are mapped, i.e. the ProSe logical channels are served in a decreasing order of their corresponding ProSe LCG priority. The PDU is thus sequentially constructed with ProSe data of the one selected ProSe destination group and from ProSe logical channels in a decreasing ProSe LCG priority order associated therewith. The thus generated PDU is then further processed and transmitted.

One of the advantages achieved by the LCP procedure of the second aspect, in addition to the advantage of the first aspect, is that ProSe data associated with delay-critical services (such as Voice over IP) is not delayed unnecessarily, since the corresponding ProSe logical channels carrying said delay-critical data are served according to their associated priority (associated via the mapped ProSe LCG).

Variants of the second aspect differ as to how the mapping of the ProSe logical channels to the ProSe LCGs is performed. For example, in one variant, a plurality of ProSe LCGs is defined, irrespective of any ProSe destination groups, and each of the ProSe logical channels configured in the user equipment is mapped to one out of the plurality of the ProSe LCGs, i.e. irrespective of the association between ProSe logical channels and ProSe destination groups. For instance, four different LCGs in total can be pre-defined for ProSe, and the UE, when or after setting up the ProSe logical channels, maps each of the ProSe logical channels to one of the four ProSe LCGs. In this variant, the four ProSe LCGs can be unambiguously identified by the corresponding LCG-ID. In an alternative variant, for each ProSe destination group a different set of different ProSe LCGs is defined, e.g. the plurality of ProSe LCGs for one ProSe destination group is different from the ProSe LCGs from any other ProSe destination group. For instance, when assuming four different LCGs per ProSe destination group, and 8 different ProSe destination groups, effectively there would be 8×4=32 different ProSe LCGs, identifiable e.g. by a combination of the ProSe destination group ID and the ProSe LCG-ID. Then, for each of the ProSe destination groups, each of the ProSe logical channels associated with said ProSe destination group is mapped to one of the ProSe LCGs of the ProSe destination group. For the latter variant, prioritization can be defined and implemented more precisely.

According to further variants of the second aspect, the buffer status reporting procedure for ProSe is adapted to the improved LCP procedure so as to include more buffer size information and thus allowing the eNB, receiving said ProSe BSR, to schedule ProSe resources more efficiently. In particular, a ProSe buffer status report is generated to include for each pair of ProSe destination group and ProSe LCG (e.g. actively used in the UE, and/or e.g. for which ProSe data is available), buffer size information of the available ProSe data for those ProSe logical channels being associated with the ProSe destination group and ProSe LCG of the pair. The UE then transmits the generated ProSe buffer status report to a radio base station controlling the radio resources for the user equipment in the mobile communication system.

According to a third aspect of the present disclosure, the ProSe destination group is additionally used to select an appropriate resource pool for the UE-autonomous resource scheduling mode (Mode 2). In particular, a plurality of radio resource pools are configured for the user equipment, e.g. by the eNodeB and/or a responsible ProSe function/entity in the network. As explained already for the first aspect, the ProSe destination groups are served in a decreasing order of priority with respect to the available radio resources.

Then, after this step of selecting the ProSe destination group, the UE selects one of said resource pools based on the selected ProSe destination group. This can be done in different ways.

In one variant, there is an association between each ProSe destination group and one of said resource pools, which can be determined centrally by a responsible ProSe function/entity in the network and is then transmitted to the UE or which is preconfigured in the UE. Correspondingly, the UE can then select that radio resource pool which is assigned to the selected ProSe destination group.

In an alternative variant, each of the radio resource pools is assigned a particular priority (e.g. by the ProSe function/entity mentioned before); the UE is also informed about the priority of each radio resource pool, e.g. in system information broadcast by a radio base station in its cell. After the ProSe destination group is selected according to the first step, the priority of said selected ProSe destination group is compared by the UE with the priorities of the available radio resource pools so as to select one particular radio resource pool. For example, an appropriate radio resource pool would have the same (or a lower) priority than the priority of the selected ProSe destination group, such that only ProSe data of ProSe logical channels belonging to a ProSe destination group with a group priority of the same (or higher) than the priority associated to the resource pool are transmitted with resources of said corresponding resource pool.

Correspondingly, in one general aspect, the techniques disclosed here feature a method for allocating radio resources to logical channels when performing a logical channel prioritization, LCP, procedure in a user equipment of a mobile communication system. A plurality of logical channels for Proximity Services, ProSe, are configured in the user equipment and are associated with one out of a plurality of ProSe destination groups as possible destinations of ProSe data. Furthermore, each of the plurality of ProSe destination groups is associated with a ProSe destination group priority, and each of the plurality of ProSe logical channels is mapped to one out of a plurality of ProSe Logical Channel Groups, LCGs. Also, each of the plurality of ProSe LCGs is associated with a ProSe LCG priority. The user equipment performs the following steps when generating a first Protocol Data Unit, PDU, for transmission. The UE selects that ProSe destination group with ProSe data available for transmission with the highest ProSe destination group priority. Then, the UE allocates radio resources to those ProSe logical channels with ProSe data available for transmission, that are associated with the selected ProSe destination group, in a decreasing order of the ProSe LCG priority associated with the ProSe LCGs to which those ProSe logical channels are mapped.

According to an advantageous variant which can be used in addition or alternatively to the above, the ProSe LCG priority is either pre-configured in the user equipment, or determined by a ProSe function in a ProSe entity of the mobile communication system and communicated to the user equipment. In the latter case, the determined ProSe LCG priority is optionally also communicated to a radio base station controlling the radio resources for the user equipment in the mobile communication system.

According to an advantageous variant which can be used in addition or alternatively to the above, the ProSe destination group priority is either pre-configured in the user equipment, or determined in a ProSe function in a ProSe entity of the mobile communication system and communicated to the user equipment. In the latter case, the determined ProSe destination group priority is optionally also to a radio base station controlling the radio resources for the user equipment in the mobile communication system.

According to an advantageous variant which can be used in addition or alternatively to the above, the mapping of the ProSe logical channels to the ProSe LCGs is performed by defining a set of different ProSe LCGs, wherein each of the ProSe logical channels configured in the user equipment is mapped to one out of the set of plurality of different ProSe LCGs; for example, the different ProSe LCGs are identified by a ProSe LCG ID. Alternatively, for each ProSe destination group a different set of different ProSe LCGs is defined, and each of the ProSe logical channels associated with one out of the plurality of ProSe destination groups is mapped to one of that set of different ProSe LCGs defined for said one of the plurality of ProSe destination groups; for example, the different ProSe LCGs are identified by a combination of an ID for the ProSe destination group and an ID for the ProSe LCG.

According to an advantageous variant which can be used in addition or alternatively to the above, a ProSe buffer status report is generated by the user equipment, including for each pair of ProSe destination group and ProSe LCG, buffer size information of the available ProSe data for those ProSe logical channels being associated with the ProSe destination group and ProSe LCG of the pair. Then, the generated ProSe buffer status report is transmitted to a radio base station controlling the radio resources for the user equipment in the mobile communication system. In one example, the ProSe buffer status report includes the following information for each pair of ProSe destination group and ProSe LCG: the ProSe destination group identity of the ProSe destination group of the pair, a ProSe LCG identity of the ProSe LCG of the pair, and buffer size information of the available ProSe data for those ProSe logical channels being associated with the ProSe destination group and ProSe LCG of the pair.

According to an advantageous variant which can be used in addition or alternatively to the above, a scenario is assumed where ProSe data for the ProSe destination group with the highest priority is still available for transmission after generating the first PDU, and ProSe data is available to be transmitted to at least another ProSe destination group. In said case, when generating a second PDU for transmission, the user equipment either selects that ProSe destination group with ProSe data available for transmission with the highest ProSe destination group priority, or selects that ProSe destination group with ProSe data available for transmission with the second-highest ProSe destination group priority.

According to an advantageous variant which can be used in addition or alternatively to the above, two sets of radio resources are available to the user equipment, wherein a first of the two sets of radio resources is used for the allocation of radio resources for the first PDU, and a second of the two sets of radio resources is used for the allocation of radio resources for the second PDU.

Correspondingly, in one general aspect, the techniques disclosed here feature a method for allocating radio resources to logical channels when performing a logical channel prioritization, LCP, procedure in a user equipment of a mobile communication system. A plurality of logical channels for Proximity Services, ProSe, are configured in the user equipment and are associated with one out of a plurality of ProSe destination groups as possible destinations of ProSe data. Furthermore, a plurality of radio resource pools are configured for the user equipment, and each of the plurality of ProSe destination groups is associated with a ProSe destination group priority. The user equipment performs the following steps when generating a first Protocol Data Unit, PDU, for transmission. The UE selects that ProSe destination group with ProSe data available for transmission with the highest ProSe destination group priority. Then, the UE selects the radio resource pool based on the selected ProSe destination group. Then, the UE allocates allocating radio resources of the selected radio resource pool to those ProSe logical channels with ProSe data available for transmission, that are associated with the selected ProSe destination group.

According to an advantageous variant which can be used in addition or alternatively to the above, the step of selecting the radio resource pool based on the selected ProSe destination group can be performed either by the user equipment according to association information, received from a network entity or pre-configured in the user equipment, indicating for each of the plurality of ProSe destination groups an associated radio resource pool out of the plurality of radio resource pools. Or, when each of the radio resource pools is assigned one out of a plurality of pool priorities, the user equipment selects that radio resource pool with an appropriate pool priority compared to the ProSe destination group priority of the selected ProSe destination group. In one example, the UE shall select the radio resource pool that has a pool priority that is the same or lower than the ProSe destination group priority of the selected ProSe destination group. In one further specific example, the user equipment is informed about the pool priority of each radio resource pool via broadcast information transmitted from a radio base station controlling the radio resources for the user equipment in the mobile communication system.

According to an advantageous variant which can be used in addition or alternatively to the above, each of the plurality of ProSe logical channels is mapped to one out of a plurality of ProSe Logical Channel Groups, LCGs. Further, each of the plurality of ProSe LCGs is associated with a ProSe LCG priority, and the step of allocating allocates the radio resources of the selected radio resource pool to those ProSe logical channels with ProSe data available for transmission, that are associated with the selected ProSe destination group, in a decreasing order of the ProSe LCG priority associated with the ProSe LCGs to which those ProSe logical channels are mapped. Correspondingly, in one general aspect, the techniques disclosed here feature a user terminal for allocating radio resources to logical channels when performing a logical channel prioritization, LCP, procedure in the user equipment of a mobile communication system. A plurality of logical channels for Proximity Services, ProSe, are configured in the user equipment and are associated with one out of a plurality of ProSe destination groups as possible destinations of ProSe data. Each of the plurality of ProSe destination groups is associated with a ProSe destination group priority, wherein each of the plurality of ProSe logical channels is mapped to one out of a plurality of ProSe Logical Channel Groups, LCGs, and wherein each of the plurality of ProSe LCGs is associated with a ProSe LCG priority. A processor of the UE selects that ProSe destination group with ProSe data available for transmission with the highest ProSe destination group priority, when generating a first Protocol Data Unit, PDU, for transmission. The processor furthermore allocates radio resources to those ProSe logical channels with ProSe data available for transmission, that are associated with the selected ProSe destination group, in a decreasing order of the ProSe LCG priority associated with the ProSe LCGs to which those ProSe logical channels are mapped.

According to an advantageous variant which can be used in addition or alternatively to the above, a storage medium of the UE stores the ProSe LCG priority being pre-configured in the user equipment. Alternatively or in addition, a receiver of the UE receives from a ProSe function in a ProSe entity of the mobile communication system the ProSe LCG priority, determined by said ProSe function. Also possible, the storage medium of the UE stores the ProSe destination group priority being pre-configured in the user equipment, and/or the receiver receives from a ProSe function in a ProSe entity of the mobile communication system the ProSe destination group priority determined by said ProSe function. According to an advantageous variant which can be used in addition or alternatively to the above, the processor maps each of the ProSe logical channels configured in the user equipment to one out of a set of different ProSe LCGs. Alternatively, for each ProSe destination group a different set of different ProSe LCGs is defined, and the processor maps each of the ProSe logical channels associated with one out of the plurality of ProSe destination groups to one of that set of different ProSe LCGs defined for said one ProSe destination group.

According to an advantageous variant which can be used in addition or alternatively to the above, the processor generates a ProSe buffer status report, including for each pair of ProSe destination group and ProSe LCG, buffer size information of the available ProSe data for those ProSe logical channels being associated with the ProSe destination group and ProSe LCG of the pair. The transmitter of the UE then transmits the generated ProSe buffer status report to a radio base station controlling the radio resources for the user equipment. In one example, the ProSe buffer status report includes the following information for each pair of ProSe destination group and ProSe LCG: the ProSe destination group identity of the ProSe destination group of the pair, a ProSe LCG identity of the ProSe LCG of the pair, and buffer size information of the available ProSe data for those ProSe logical channels being associated with the ProSe destination group and ProSe LCG of the pair.

According to an advantageous variant which can be used in addition or alternatively to the above, it is assumed that ProSe data for the ProSe destination group with the highest priority is still available for transmission after generating the first PDU, and ProSe data is available to be transmitted to at least another ProSe destination group. Then, the processor still selects that ProSe destination group with ProSe data available for transmission with the highest ProSe destination group priority, when generating a second PDU for transmission. Alternatively, the processor selects that ProSe destination group with ProSe data available for transmission with the second-highest ProSe destination group priority, when generating a second PDU for transmission.

Correspondingly, in one general aspect, the techniques disclosed here feature a user terminal for allocating radio resources to logical channels when performing a logical channel prioritization, LCP, procedure in the user equipment of a mobile communication system. A plurality of logical channels for Proximity Services, ProSe, are configured in the user equipment and are associated with one out of a plurality of ProSe destination groups as possible destinations of ProSe data. A plurality of radio resource pools are configured for the user equipment, wherein each of the plurality of ProSe destination groups is associated with a ProSe destination group priority. A processor of the UE selects that ProSe destination group with ProSe data available for transmission with the highest ProSe destination group priority, when generating a first Protocol Data Unit, PDU, for transmission. The processor then further selects the radio resource pool based on the selected ProSe destination group. Finally, the processor allocates radio resources of the selected radio resource pool to those ProSe logical channels with ProSe data available for transmission, that are associated with the selected ProSe destination group. According to an advantageous variant which can be used in addition or alternatively to the above, the processor selects the radio resource pool according to association information, received from a network entity or being pre-configured in the user equipment, indicating for each of the plurality of ProSe destination groups an associated radio resource pool. Alternatively, the processor selects that radio resource pool with an appropriate pool priority compared to the ProSe destination group priority of the selected ProSe destination group, wherein each of the radio resource pools is assigned one out of a plurality of pool priorities. For example, the processor selects that radio resource pool having a pool priority that is the same or lower than the ProSe destination group priority of the selected ProSe destination group.

According to an advantageous variant which can be used in addition or alternatively to the above, each of the plurality of ProSe logical channels is mapped to one out of a plurality of ProSe Logical Channel Groups, LCGs, and wherein each of the plurality of ProSe LCGs is associated with a ProSe LCG priority. Then, the processor allocates the radio resources of the selected radio resource pool to those ProSe logical channels with ProSe data available for transmission, that are associated with the selected ProSe destination group, in a decreasing order of the ProSe LCG priority associated with the ProSe LCGS to which those ProSe logical channels are mapped.

Fifth Embodiment Advantageous for MCPTT

The MCPTT Service, as exemplified in the background section, should provide a mechanism to prioritize MCPTT Group Calls based on the priorities associated with elements of the call (e.g., service type, requesting identity, and target identity). This requirement implies that the priority of a group call can depend on the requesting identity (AKA the user/UE originating the transmission), in addition to the communication target. This also confirms that the ProSe Layer 2 Group ID does not itself dictate priority. Rather the priority is worked out based on a number of factors at the application layer of MCPTT.

While the above described embodiments may also be employed for LCP, the present, fifth embodiment, provides particular benefits for MCPTT service. In particular, the group priority scheme introduced above may have some limitations and inflexibilities with respect to MCPTT. For example, let us consider a UE that participates in two ProSe Groups where group A communication is typically higher priority than group B communication. Due to the destination group prioritization scheme which first selects the group according to the group priority as described above, it would not be possible to support an emergency situation within group B where it would be desirable to priorities this specific group B traffic over all other traffic.

In the following description, the examples are described on the basis of the MCPTT service studies by the 3GPP currently. However, it is noted that this mechanism is employable for any kind of ProSe system in which priorities of different services and destinations are of importance for efficient group call operation.

It is the particular solution provided by embodiment 5, that each sidelink logical channel is assigned a priority level. The UE performs logical channel prioritization (i.e. deciding the order to serve the data queued on different SLRBs) based only on this priority level without taking into account the destination group priority.

In fact, this 5th embodiment may also be implemented in a system not supporting group priorities and merely assigning priority levels to particular logical channels.

In particular, the UE performs the following steps as is illustrated in FIG. 25. The UE selects in step 2510 the highest priority sidelink logical channel (having data available). The highest priority LC here is the LC having the highest priority among all LCs of all destination groups attended to by the UE. The selected sidelink logical channel determines the ProSe destination group. Thus, the UE determines in step 2520 the destination group to which the highest priority logical channel belongs. The determined destination group is then selected for data transmission and further prioritization is performed for the UE's logical channels of the selected destination group. Accordingly, in step 2530, the UE performs for all sidelink logical channels belonging to the selected ProSe destination group further prioritization. Then in step 2540, all sidelink logical channels belonging to the determined ProSe destination group are served in decreasing priority order (based on the priority associated to the respective sidelink logical channels of the destination group). Being served means that the data from the respective logical channels are mapped onto the allocated resources in the current transmission instant (transmission opportunity, such as the above described sidelink control, SC, period).

The present procedure may be employed by the UE working in either mode 1 (eNB controlled resource allocation mode) or in mode 2 (autonomous resource allocation mode). The present procedure may also operate in other systems, in which the transmission is controlled by another entity than eNB. This is because it already assumes some resources being available, irrespectively of the resource assignment procedure.

The above procedure is advantageously performed by the UE at every transmission opportunity where a new transport block needs to be generated. In the context of ProSe, the UE can according to the current specified ProSe functionality (Rel-12) only transmit data to one ProSe group within the SC period. In that sense the UE only needs to select the ProSe destination group based on the sidelink logical channel priorities once per SC period.

Still the step of the prioritization mechanism, i.e. the allocation of radio resources to the sidelink logical channels belonging to the selected ProSe destination group according to their priority is to be performed for each new transport block.

This provides the advantage that at forming of each new transport block, the UE which is allowed to transmit data uses the allocated capacity for conveying the most important data first. With each transport block transmission, the data available for transmission may change, and thus also the selection of the destination group and the logical channels according to the priorities may have different result from transport block to transport block. Especially for critical data, fast possibility of data transmission is important.

However, it is noted that the present disclosure is not limited to this example. For some applications it may be acceptable if the destination group is selected and the scheduling is performed every K (integer larger than 2) transport blocks. The remaining transport blocks are formed using the last allocation (thus transmitting to the last selected destination group and allocating resources to the logical channels for the selected group according to their priorities.

The above described procedure merely assumes that there is a priority for each sidelink logical channel defined and available in the UE, for instance temporarily or permanently stored. Moreover, there is also information available at the UE specifying for each sidelink logical channel, to which destination group it belongs.

For instance, the priority associated with each sidelink logical channel may be determined either by the UE or by the ProSe function and signaled to UE and/or to the eNB.

In the case when the ProSe function determines the logical channel priority, some signaling needs to be introduced between the ProSe entity (ProSe function) and the UE (and possibly the eNB).

For instance, the signaling may be a control signaling on a higher layer, i.e. a layer beyond the physical layer and the MAC layer. In particular, a protocol message may include a logical channel priority for each logical channel. The logical channel priority may be configured by the ProSe entity when establishing the sidelink logical channel at the UE, for instance in accordance with at least one of the UE identity, the destination group identity of the LC, the logical channel group to which the LC belongs, and/or the particular service carried by the LC or the like. The priority associated to a sidelink logical channel can be also changed or reconfigured when triggered for example by the application layer.

In general, a priority level could be also associated to each data packet of a service (such as application layer packets). Packets of the same priority level are mapped to the same bearer, i.e. sidelink logical channel. For example, if a ProSe service generates data packets which are associated with two different priority levels (for instance, voice and video in a video call may have different priorities), then the ProSe function (in ProSe entity) may configure the UE to establish two sidelink logical channels for the respective two data flows of the ProSe service, to which the packets are mapped to according to their priorities. In that sense, the prioritization procedure as described above can be also performed based on the priority levels associated to data packets of a service.

In mode 1, in which the resource assignment is controlled by the eNB, the eNB may be provided with the same configuration information as the UE. More in particular, the eNB may be provided with the priority levels associated to the respective established sidelink logical channels. The priority levels associated with the respective established sidelink LCs may be provided to the eNB by the ProSe entity or by the UE.

Alternatively, the eNB could be provided with the mapping information of sidelink logical channels to logical channel groups and the corresponding priority level of the logical channel groups in accordance with the sidelink logical channel priority. Based on the priority information and the sidelink buffer status report, the eNB is able to perform an efficient scheduling considering the priorities of transmissions from different UEs. According to the current defined sidelink buffer status report MAC control element, the UE reports the buffer status per ProSe destination group-logical channel group pair. Therefore it is beneficial to provide the eNB information on the priorities of the sidelink logical channels mapped to the corresponding ProSe destination group, i.e. onto these LCG pairs.

Advantageously, within the signaling from the ProSe entity the UE and/or eNB is configured with a sidelink logical channel priority and with mapping of the sidelink logical channel to LCGs and the destination groups.

In the case when the UE determines the logical channel priority for a sidelink logical channel on its own, it is assumed that the UE and/or the eNB is configured with a ProSe destination group priority and the LCG priority. This may be performed by the ProSe function in the ProSe entity as described for the previous embodiments.

It is noted that irrespectively of whether the UE determined the logical channel priority on its own or receives the configuration from the ProSe entity, the eNB may still do either of calculating the priorities or receive the configuration from the ProSe entity.

The UE (or possibly also eNB) then calculates based on some predefined formula the logical channel priority. For instance, the sidelink logical channel priority may be calculated as a product of the ProSe group priority (SLRBi) and the LCG priority (SLRBi). In general:

sidelink logical channel priority=f (SLRBi, SLRBi)

with f being an arbitrary function which is preferably proportional to the ProSe group priority (SLRBi) and the LCG priority (SLRBi). The logical channel priority may be calculated based on the destination group priority and the LCG priority as described in the previous embodiments.

Figure 26:
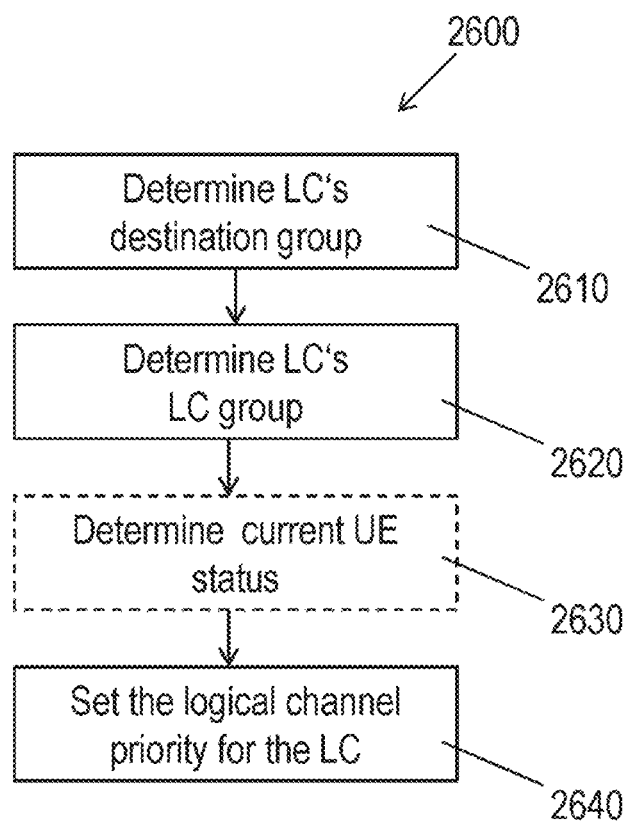
FIG. 26 is a flow diagram illustrating an exemplary method for priority setting for logical channels.

The calculation of the logical channel priority is illustrated in FIG. 26. The flow diagram of the method 2600 in FIG. 26 may be executed in any of the UE and the eNB. It may be used in mode 1 as well as in mode 2. In step 2610, the UE and/or eNB determines the destination group of the logical channel for which it is calculating the priority. This determination may be performed in response to receiving control information from the ProSe entity including the priority of the destination group. In step 2620, the UE determines the LCG priority for the logical channel for which it is calculating the priority. This may also be performed upon receiving the LGC priority from the ProSe entity. In step 2630, further parameters which may be used for determining the logical channel priority may be determined such as the UE's geographic location, UE emergency status or ID or others. Finally, in step 2640, the calculation based on these parameters is performed. The above approach 2600 may be performed by the UE and/or eNB for all logical channels configured for the UE.

Concerning the ProSe BSR reporting (Mode 1), the control elements defined in MAC of the ProSe Buffer status Reporting in the Rel-12 may be reused. In particular, in case sidelink LCs belonging to one ProSe destination group can be mapped to 4 different LCGs, the ProSe BSR can essentially distinguish between 64 different destination groups—LCG pairs (corresponding to 4-bit long destination group ID and 2-bit long LCG ID). Such signaling should provide enough granularity for an efficient scheduling to be performed by the eNB.

In Mode 2 (autonomous resource allocation mode), the resource pool selection as described above may be used. Based on selected ProSe destination group (which was selected based on sidelink logical channel with the highest priority), the resource pool is selected. Essentially the resource pools, which are configured by the cell for the autonomous resource allocation mode, should be associated with any kind of priority, e.g. group priority or logical channel priority, in order that the UE selects from the relevant resource pools. This should provide sufficient means to separate the resources used by UEs performing ProSe transmissions with different associated priorities. The eNB could for example configure different physical parameters for resource pools of different priorities. From UE side, when a UE wants to perform a ProSe transmission in the autonomous resource allocation mode, it first needs to select a ProSe destination group based on associated priorities, e.g. according to the logical channel priority. Based on the selected ProSe destination group the UE shall select the Tx resource pool from the list of resource pools. More in particular UE shall use a Tx resource pool having an associated priority which is same or lower than the priority of the selected ProSe destination group or alternative the priority of the highest priority logical channel (based on which the ProSe destination group was selected).

In other words, the UE advantageously further selects the resources to be allocated for the transmission of the data from a resource pool and to select the resource pool among a plurality of resource pools according to the destination group priority or a logical channel priority associated with a logical channel from which the data is to be transmitted. It is beneficial if the logical channel priority according to which the resource pool is selected is the highest logical channel priority among the logical channels for the destination group.

Alternatively, or in addition, there is a priority level associated to each resource pool, which the UE compares with the highest priority logical channel within the selected ProSe destination group.

In order to provide a more situation responsive prioritizing for the PTT service, which may be used for various emergency applications, the priority of a sidelink logical channel might change based on the current situation, e.g. geographical position, emergency situation, first responder etc.

The change of the logical channel priority may be performed dynamically, which means that it does not have to remain the same during the groupcall (for the bearer set up) but may change.

The modification may be performed by a reconfiguration of the logical channel parameter, i.e. priority. This may be performed by the Access Stratum which includes protocols below the Non-Access Stratum as defined in the background section.

Alternatively, a new logical channel is set up with the new modified priority while the logical channel with the old priority is maintained until the buffer is empty and then it is removed. Especially, in the case when the new priority is higher than the old priority, this approach may be beneficial in order to treat the packets of this new logical channel with higher priority. Optionally, the logical channel with the current (old) priority may be closed (removed). The priority modification may be triggered by the ProSe entity on the application layer.

If the UE reconfigures the priority for a logical channel, for which still transmission data is stored in the buffer, it may be generally beneficial to maintain the old priority (priority before its modification) valid for the that data in the buffer. This is also the case if the priority modification is lowering the priority. As the data in the buffer were generated while the logical channel had a higher priority, maintaining the old priority ensures that these data are conveyed faster.

An alternative behavior upon modification of the logical channel priority for a channel for which the buffer still contains data for transmission is to immediately flush the buffer in order to make sure that the new data is treated first. This behavior may be beneficial especially if the priority of the logical channel is modified to a higher priority.

Accordingly, if the current priority is higher than the modified priority, the UE may still transmit the data buffered before the modification with the current priority while treating the data buffered after the modification with the new priority. On the other hand, if the current priority is lower than the new priority, the UE may remove from the buffer data stored before the modification, i.e. flush the buffer.

The buffer flushing may imply that the flushed data get lost. Especially for conversational services as a (PTT) call or video call, retransmissions on higher layer such as application layer may not be useful. However, the present disclosure is not limited thereto and there may be some retransmission mechanism implemented in the higher layers.

However, it is noted that the rule to maintain the old priority for the buffered data may also be applied upon modification irrespectively of the type of change (increasing or decreasing the priority). The present disclosure is generally not limited to a particular behavior upon priority modification and the buffer may also be always flushed.

Further alternatives may be advantageous for certain scenarios. For instance, the UE behavior upon priority modification may depend on the reason of modification. For instance, if the logical channel priority changes due to emergency level change while the change is an increase, the buffer is flushed. Otherwise, the buffer is not flushed.

Alternatively, the buffer flushing may be controlled by the ProSe function by including into the priority modification message a buffer flush flag which can take two values, one indicating that the buffer is to be flushed and the other one indicating that the data is to be maintained.

Still alternatively, the UE behavior may depend on the priority value after modification. For instance, the buffer is flushed only if the modified priority is higher than a predefined threshold priority level. Accordingly, the most important data (for instance data with the highest priority only) shall be transmitted the fastest possible, while the data of other priorities would be handled with increased fairness.

Sixth Embodiment: Logical Channel Suspension

According to another embodiment of the present disclosure, a floor-control mechanism is provided. This embodiment may work independently of the previous embodiments or may be combined with any of the embodiments previously described. This sixth embodiment may also be employed with both Mode 1 and Mode 2.

The MCPTT service has several particularities. In particular, at one time, only a single party (member of the group call) may transmit (broadcast) data/talk. Accordingly, a mechanism for selecting which member is to transmit may have a substantial impact on the system efficiency. In the context of the push-to-talk systems, the term "floor-control" denotes the process of selecting which particular user in the group is allowed to talk and notifying the particular user, especially in the case when there are more users trying to transmit data at the same transmission opportunity.

Based on the 3GPP SA6 TR 23.779, v0.6.0, "Study on System Architecture Enhancements for Mission Critical PTT over LTE", available at www.3gpp.org, some proposals have been made to use application layer signaling to support floor control, essentially by one UE requesting the floor for a particular channel, and the applications in other UEs turning off their transmission on receiving such a request.

When the user equipment in the current studies does not have floor, and thus stops its transmission, the logical channels still remain active and are also used by the terminal for prioritizing of the data transmission to different groups.

In this embodiment, a user equipment operable in a wireless push to talk communications system supporting direct communication between a group of user equipments is provided. The user equipment includes a floor control unit that determines whether the user equipment is selected to transmit data among user equipments of the wireless communication system. If the user equipment is not selected, suspend its sidelink logical channels belonging to the ProSe group (group of user equipments, i.e. destination group from the point of view of one particular UE). If, on the other hand, the data originating user equipment is selected, resume its sidelink logical channels which were previously suspended. Advantageously, the suspended logical channels are not considered for prioritizing and resource allocation as described in the above embodiments.

The group of user equipment may be formed by two or more UEs. The floor control unit may be implemented by a processor, possibly also the same processor as the one which may be used by prioritizing procedure as described in preceding embodiments.

The determination of whether the data equipment was selected, may be performed in various different ways, depending on the implementation of the floor control. This embodiments may work with any such floor control, irrespectively of the layer on which the floor control takes place.

There is, for instance, one entity which is providing the group call members with allowance to transmit data. The central entity may be a user equipment, one of the members of the group call. For example, a UE transmits a request for floor (floor request message) and the central entity grants the request. The floor grant message may be broadcast so that the remaining stations receive it and determine that they are not selected, i.e. not allowed to transmit. It is noted that this example is not to limit the present disclosure. The central entity may also be a device different from a UE. It may be, for instance an eNB or another entity such as a relay or a server.

Advantageously, the floor control (transmission of floor request messages and possibly floor grants) is performed on a higher layer, i.e. above MAC. In particular, the floor control may be performed on an application layer.

Alternatively, there may be no central entity involved. In particular, the UEs may all receive the floor request and stop their transmission for the given time. For example based on their own priority and the priority of other UEs within the group requesting the "floor" each UE itself could decide whether to temporarily suspend sidelink logical channels or the ProSe group transmissions or to resume them, as will be also described in more detail in the following embodiment.

The suspending and resuming may be performed in various different ways. When the logical channel is suspended, the buffer content is maintained and the data stored therein are transmitted upon resuming the logical channel.

In summary, based on the result of the floor control mechanism, sidelink logical channels or ProSe destination groups can be suspended and again resumed for the LCP procedure. The suspension and/or resuming may advantageously be performed (initiated) by a higher layer, such as application layer. In particular, according to an exemplary implementation, the higher layer will inform lower layers to suspend/resume certain sidelink logical channels/ProSe groups.

According to one exemplary implementation each sidelink logical channel has an associated status flag stored in the UE, which indicates whether the corresponding sidelink logical channel is suspended or "active". Higher layer within the UE, e.g. ProSe function, sets the flag according to the result of the floor control mechanism running on the application layer. The LCP procedure within the MAC considers during the transport block generation procedure not only the priority of sidelink logical channel or any other priority like ProSe group priority and LCG priority, but also the status of this flag, More in particular for the generation of a new transport block the LCP procedure or MAC layer considers only those sidelink logical channels for which the status flag is not set to suspended. When looking at FIG. 25, this means that in step 2510 the LC with the highest priority is selected among those LCs which have the active flag set (i.e. which are active rather than suspended). The prioritization in step 2530 is also performed only among active channels.

In case a higher priority UE is transmitting currently, sidelink transmission of other UEs within the group shall be suspended. LCP procedure in the UE will not consider suspended sidelink logical channels/ProSe groups. As described above this will result in that the UE will not generate and transmit a new transport block with data of a suspended sidelink logical channel respectively ProSe group.

In case the floor control mechanism acknowledges/allows a sidelink transmission for a UE within a ProSe group, the sidelink logical channels belonging to the ProSe group shall become active (resumed). The LCP procedure in the UEs considers active/resumed sidelink logical channels/ProSe groups. Higher layer (application layer) may suspend/resume sidelink logical channels/ProSe groups and inform MAC about it.

In particular, the UE may perform also the following: In case the higher layer suspends a sidelink logical channel/ProSe group for which UE is currently transmitting data within an SC period, the UE shall stop transmission of the SCI/data (DTX) within the SC period.

Figure 27:
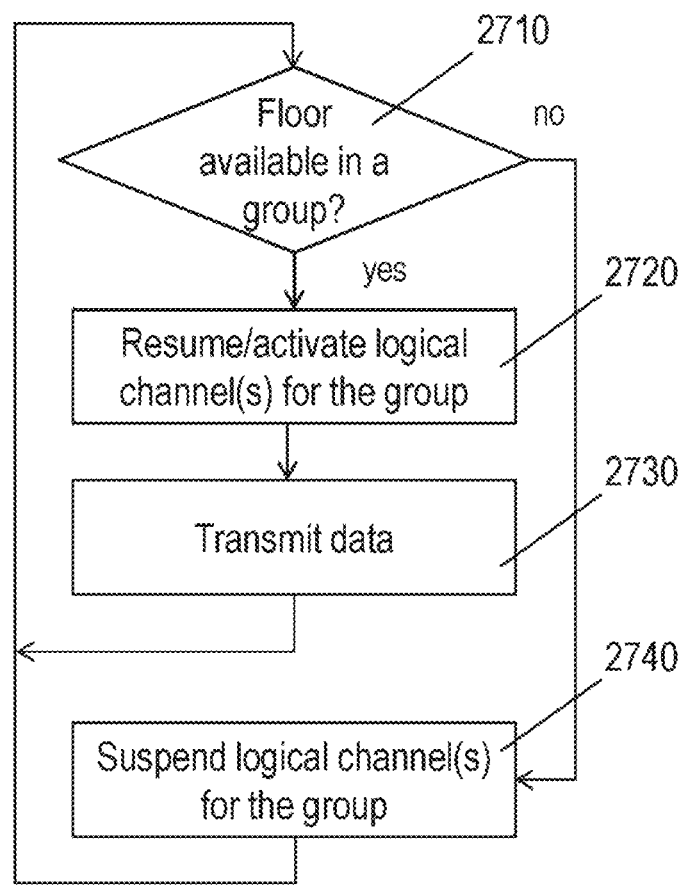
FIG. 27 is a flow diagram illustrating an exemplary method for supporting flow control by suspending/resuming logical channels.

The UE will not consider the suspended sidelink logical channels/ProSe groups for the LCP/BSR/grant selection procedure for the next SC period. FIG. 27 illustrates an exemplary method 2700 according to the sixth embodiment. In particular, if the UE obtains the floor in a certain ProSe group (which is evaluated in step 2710) then the UE considers all sidelink logical channels (if there are any suspended logical channels belonging to the ProSe group, resumes those logical channels) for the ProSe group in step 2720 as resumed or active and transmits the data in step 2730 from the buffers of the logical channels according to the prioritizing and allocation procedure as described in embodiments 1 to 5. If, on the other hand, the UE has not the floor, then in step 2740, it shall suspend all logical channels of the certain ProSe group.

Seventh Embodiment

In the above embodiment, the floor control was described as a mere mechanism for assigning the floor to the UEs which request it without evaluating their needs. However, especially in the mission critical scenario, floor control may be more efficient if the floor is given first to the UEs which have more critical need to communicate their data.

Basically, an efficient floor control requires the ability of one UE to pre-empt another in order to enable a fair usage of the multicast/broadcast resources by a plurality of users (two or more).

The floor control thus also requires rules for assigning the channel to different users. Accordingly, prioritizing of the users rather than merely cyclically scheduling users that have data to be transmitted is also of benefit.

In this embodiment, the floor control is based on a priority of a ProSe user, which will be called a UE priority in the following. This priority may in general be a priority independent of the logical channel priority, logical channel group priority or the group priority as described above. However, the UE priority may also be related to the priority of a sidelink transmission of a ProSe user within a given ProSe group. In other words, there may be a mapping between the logical channel priority, logical channel group priority and/or the destination group priority and the UE priority.

Figure 28:
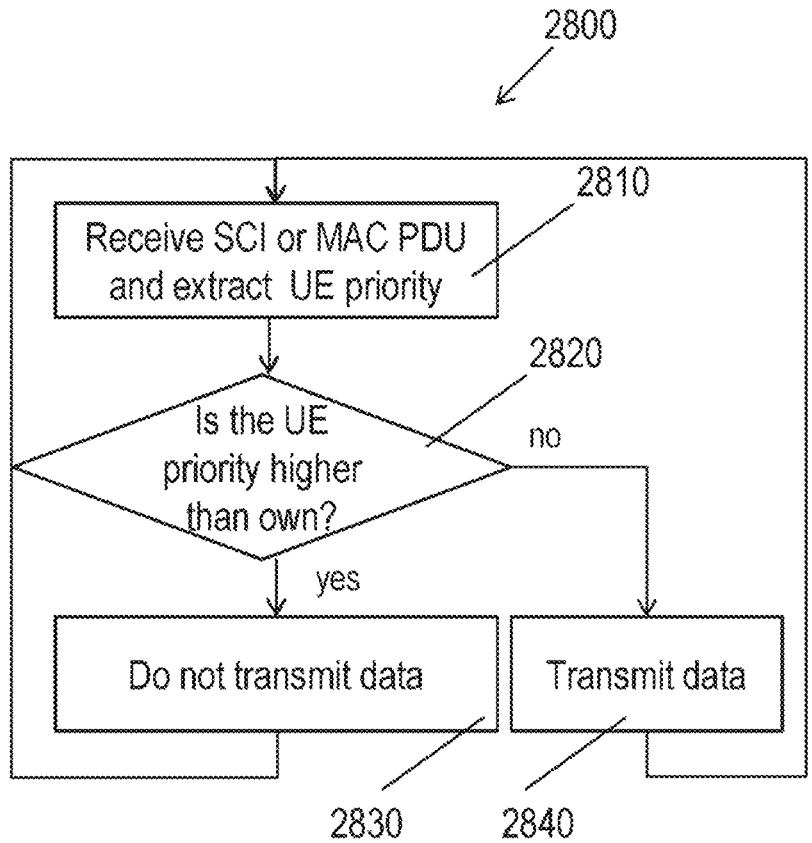
FIG. 28 is a flow diagram illustrating an exemplary method for performing flow control based on priorities.

The UE priority handling in floor control is schematically illustrated in FIG. 28. In particular, the method 2800 includes the step of extracting 2810, from a sidelink control information on physical layer or a medium access control, MAC, protocol data unit, PDU, received from another user equipment, a user equipment priority indicator, wherein the user equipment priority indicator indicates the priority of the user equipment or the data to be transmitted by the user equipment. In step 2820, the extracted user equipment priority indicator is compared with an own user equipment priority stored in the user equipment or a priority of the data to be transmitted. If the own user equipment priority is lower than the extracted user equipment priority, it is determined (for instance, corresponding to step 2710 described with respect to FIG. 27) that the user equipment is not selected for the transmission and the data buffered for the logical channels of the user terminal are not transmitted 2830.

It is noted that step 2830 may also include suspending the logical channels of the user equipment for the ProSe destination group as described in the sixth embodiment.

If, on the other hand, the own user equipment priority is higher than the extracted user equipment priority of all other terminals requesting floor, it is determined (for instance, corresponding to step 2710 described with respect to FIG. 27) that the user equipment is selected for the transmission and the data buffered for the logical channels of the user terminal are transmitted 2840. The transmission 2840 may be performed based on the prioritization mechanism as shown in any of the embodiments 1 to 5.

If two or more UEs which send the floor request have the same priority, highest among the UEs of the group, those UEs with same priority may all transmit or some random selection may be performed by each UE to decide whether to transmit or not. In general, this should happen very rarely if at all for the MCPTT service.

Even though the intention indicated in the previous embodiment has been to apply the floor control on the application layer, the priority of a sidelink transmission or a ProSe user is advantageously an input to the floor control mechanism. Thus, it may be beneficial to move at least a portion of the floor control to lower layers, i.e. to the physical layer or MAC as exemplified above.

Accordingly, data or/and the related sidelink control information (SCI) includes some priority information, based on which the "floor control" mechanism can be realized on PHY/MAC layer, which has latency advantages compared to some higher layer "floor control" mechanism. The SCI information is another name for the concept of the scheduling assignment (SA) described already above in the background portion for both Mode 1 and Mode 2.

Figure 29:
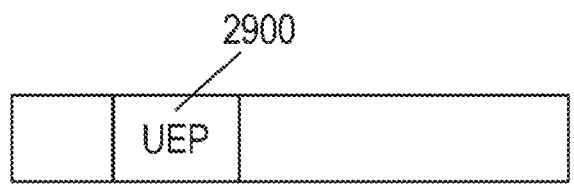
FIG. 29 is a schematic drawing illustrating a format of a sidelink control information.

In particular, PHY and MAC layer protocol have a lower latency compared to an application layer protocol. Thus, it is advantageous to add priority indication to PHY/MAC signaling. For instance the sidelink control information may include a priority field 2900 as shown in FIG. 29. The SCI is a control message of physical layer which may be approximately compared to DCI in the LTE, Rel. 8 and later. It basically includes the allocation information as described above under the name scheduling assignment (SA), i.e. it may specify closer the resources, for example including any of modulation and coding, redundancy version, frequency band, (sub)frame, MIMO parameters or the like etc.

The UE which is transmitting to a certain ProSe group (destination group ID), compares its own priority, which may be signaled by higher layer (and may be set by the ProSe entity) or preconfigured in the terminal, or the priority of the data to be transmitted with the priority received within the priority field 2900 (user equipment priority, UEP) of SCI received from other UEs in the same group. If the priority in the received SCI message is higher than the own priority, the transmitting UE will stop transmitting data/SCI for this SC period and possibly also in subsequent SC periods.

In particular, the UE priority may be preconfigured by the manufacturer or operator in the UE. A simple but efficient implementation may be achieved by preconfiguring some UEs as master UEs which can preempt other UEs configured with lower priority.

Another, more flexible approach may be to configure the UE priority by the ProSe entity, which provides the advantage of changing the UE priority for different missions or different scenarios.

Still further, the UE priority may be determined autonomously by the UE or configured by the ProSe entity based on mapping of the logical channel priority. For instance, logical channel with the highest priority maps on the high UE priority, whereas all other LC priorities map on the low UE priority (here it is exemplarily assumed that the UE priority can only take 2 values, high and low which may be 0 and 1 or 1 and 0 respectively). The UE priority may then be determined by mapping the highest LC of the UE for the given group onto a UE priority value. The above example is not to limit the present disclosure. Rather, the mapping may look differently. For instance, there may be more than one highest LC priority values mapping on the high UE priority. Moreover, the UE priority may take more than two values. It is noted that the UE priority may also directly be the logical channel priority.

The configurable UE priority (by ProSe entity or by the UE itself) has the advantage that the priority may be flexibly changed. A UE priority may also be stored/configured per destination (ProSe) group so that one UE may have a different priority in different ProSe groups.

With this approach, even if the floor is taken by a UE, it is ensured that another UE with higher priority may preempt the transmitting UE and take the floor. This results in the UEs with higher priority transmitting their data with smaller latency than the remaining UEs. The remaining UEs must wait until the floor is available for their priority level. Depending on the deployment scenario, it may be beneficial to increase the priority of the UE or the priority of the corresponding LCs proportionally to the time period during which the data have been stored in the buffer for transmitting.

Figure 30:
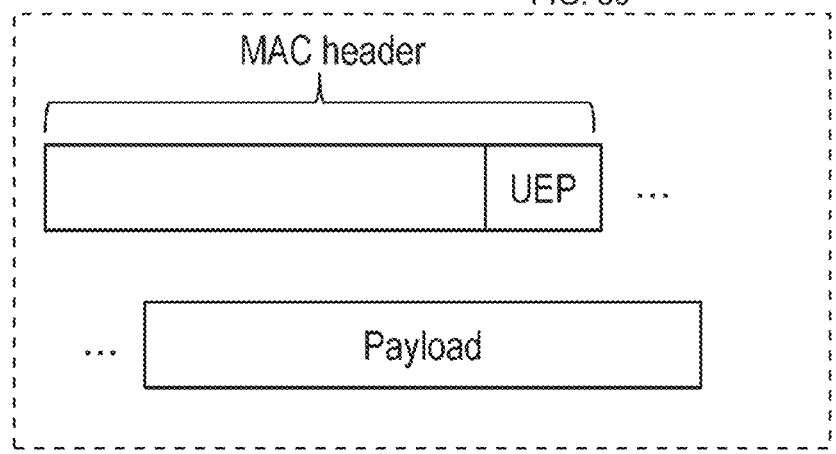
FIG. 30 is a schematic drawing illustrating a format of a MAC PDU.

Alternatively, or in addition to the priority field within SCI PHY messages, data transport blocks (TBs) may also contain a priority field in the respective MAC header as is illustrated in FIG. 30.

Based on the priority indication carried in the priority field of the MAC header the UE may decide whether or not to transmit data to the ProSe group as described above.

In particular, a MAC PDU includes a MAC header and a MAC payload. As shown in FIG. 30, the currently used MAC header structure may be reused for signaling the priority field. In particular, MAC header advantageously contains the UE priority indication within the "R" reserved bit in the MAC subheader. The "R" field in the MAC has been left for use in later standard versions and is thus suitable to introduce the priority indication and still maintain backward compatibility to earlier releases. The MAC header is described in 3GPP TS 36.321, v12.5.0, Section 6.2.4.

The UE priority field may carry a preemption indicator, which merely indicates whether the UE transmits emergency data or normal data. The UE transmitting the emergency data would then be able to preempt UEs transmitting normal data as exemplified above. In particular, the priority indication may be a single bit of which one value indicates "emergency" whereas the remaining second value indicates normal priority.

Since there is also a SRC (source) field in the MAC header which identifies the transmitting ProSe UE ID, the ProSe function (in the ProSe entity) may provide a mapping between ProSe UE ID and the corresponding UE priority which would basically indicate the basic UE priority, i.e. the priority of the UE irrespectively of the particular data currently transmitted. Together with the "R" field which could be used as described above as a kind of "emergency indicator" the receiving UE can calculate the priority of the transmitting UE and act then according to the above described procedure, i.e. if the priority determined by MAC header fields (in view of the basic UE priority configured by the ProSe entity and stored in the own UE) is higher than the own priority, the UE will stop transmitting data in this SC period and optimally in subsequent SC periods, i.e. number of subsequent SC periods for which the UE is not transmitting data this ProSe group could be signaled or preconfigured. In other words, the UE may store assignment between the UEs in the group and their basic priorities and to extract the UE priority indicator from the MAC header and to calculate the current UE priority of a UEs in the group as a function of the basic priority and the extracted priority indicator. This may be, for instance a sum function or a multiplication or any other function. In this way, some UEs may be configured with higher priority (masters) whereas there still is also a possibility of UEs with lower priority to preempt the master UEs in the current case of emergency, i.e. if the emergency data are to be transmitted.

Figure 31:
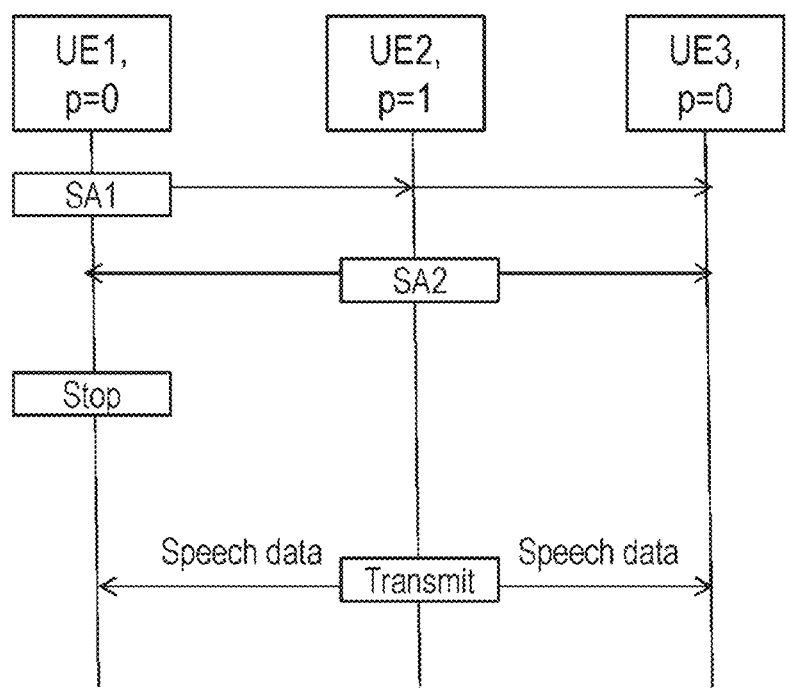
FIG. 31 is a schematic drawing illustrating a message flow implementing an exemplary floor control mechanism for a group of three UEs.

FIG. 31 illustrates an exemplary floor control mechanism. There is a group G1 of three UEs, UE1 with floor control priority (UE priority) p=0 corresponding to low priority, UE2 with a high priority p=1 and a UE3 with the low priority p=0. Both, UE1 and UE2 submit SCI (SA) since they have data to be transmitted in a buffer for this group G1. The corresponding SA1 and SA2 are received by all respective terminals (or at least by UE1 and U2). UE1 extracts from the SA2 received from the UE2 the priority p=1 of UE2 and compares it with the own priority p=0, which is lower. Consequently, UE1 shall not transmit the data in the present SC period. The UE2 received SA1 and makes similar comparison of the extracted p=0 with its own p=1 which is higher. Consequently, UE2 takes the floor and transmits data, for instance speech data.

It is noted that the UE may advantageously stop transmission for longer than the SC period. This may be advantageous especially for speech data, for which it is assumed that the speech portion will take several SC periods to be transmitted. Thus, the UE may stop for the duration of a floor control period, larger than the SC period. The floor control period may be configurable.

It is noted that this seventh embodiment may be advantageously combined with the sixth embodiment concerning suspending/resuming logical channels depending on the floor control results. However, the seventh embodiment may also work without the sixth embodiment. Similarly, the seventh embodiment may be advantageously combined with the first to fifth embodiment.

Figure 32:
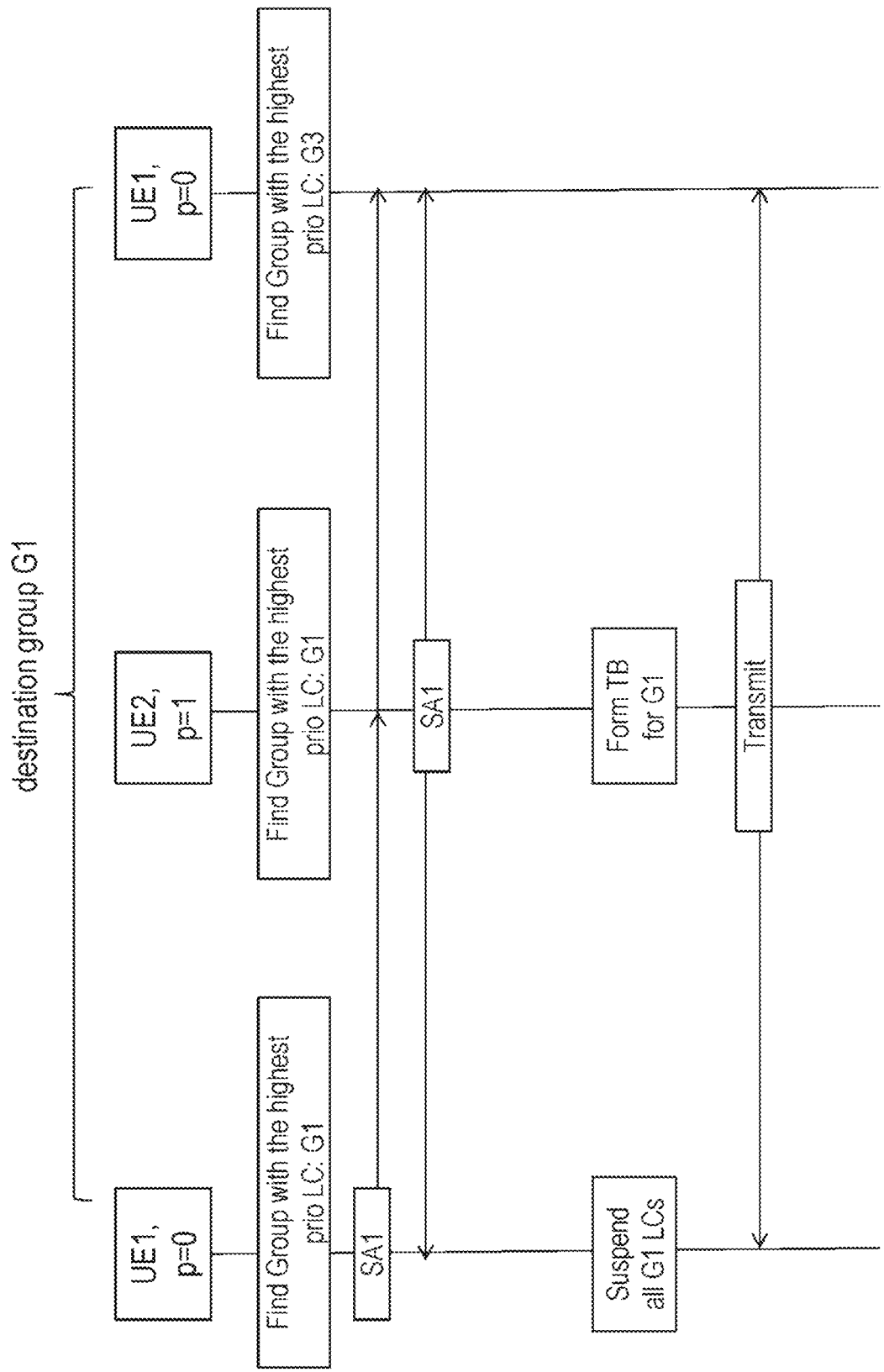
FIG. 32 is a schematic drawing illustrating a message flow implementing an exemplary floor control mechanism for a group of three UEs.

An example of a combination of the above embodiments is illustrated in FIG. 32. In particular, group G1 similar to the example described with reference to FIG. 31 includes UE1, UE2, and UE3. All three UEs have data to be transmitted and thus, perform on their own the prioritization procedure as described in any of embodiments 1 to 5. As a result, UE1 and UE2 are to transmit to group G1, whereas UE3 is to transmit to another group. The transmission of SA1 and SA2 and their mutual reception by UE1 and UE2 is performed as described above. UE1 stops the transmission and suspends its logical channels for group G1 according to embodiment 6.

Figure 33:
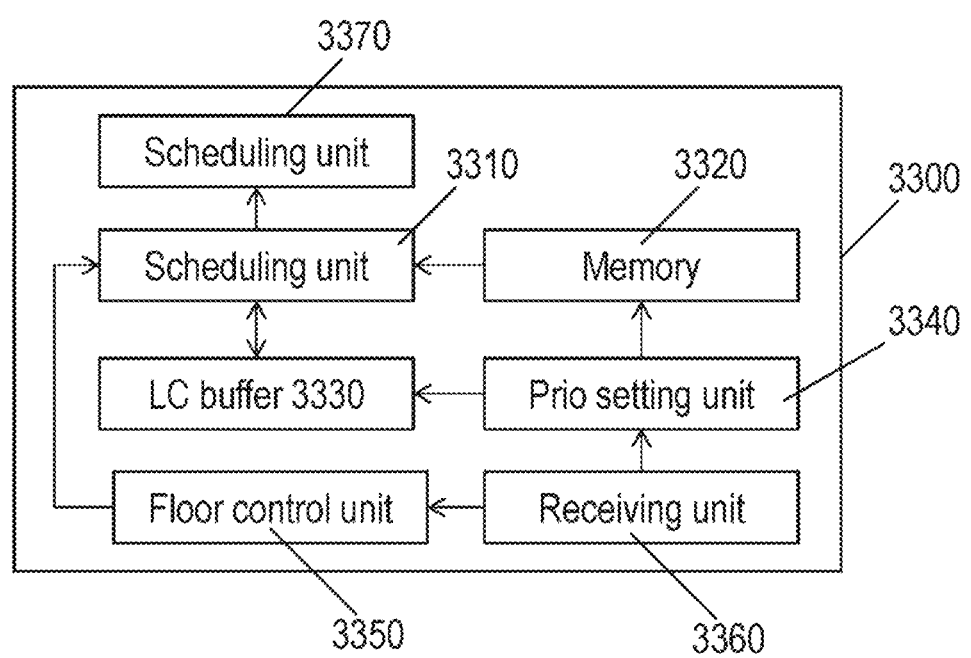
FIG. 33 is a block diagram illustrating an example of a user equipment implementing the prioritization of logical channels.

In summary, as also illustrated in FIG. 33, according to the fifth embodiment, a user equipment operable in a wireless communications system supporting direct communication between user equipments, including: a storage 3320 with a sidelink configuration stored and specifying a plurality of destination groups, each destination group including possible destinations for sidelink data as well as storing a logical channel priority for each logical channel out of logical channels configured for the sidelink destination groups; a scheduling unit 3310 that: selects a sidelink destination group with a sidelink logical channel having sidelink data available for transmission with the highest logical channel priority among the sidelink logical channels having data available for transmission; and allocates radio resources to the sidelink logical channels belonging to the selected sidelink destination group in decreasing priority order.

The user terminal may further include a transmission unit 3370 which transmits the data according to the prioritization performed and in the allocated resources.

Advantageously, the logical channel priority depends on at least two of: a destination group priority associated with a destination group the data destination, a logical channel group priority associated with a group of logical channels, grouped according to the type of data carried, a geographical location of the user equipment, an emergency level in which the user equipment is operating, and a user equipment identifier.

The user equipment may further include a receiving unit 3360 for receiving an indication of the logical channel priorities for the respective logical channels determined by a ProSe function in a ProSe entity of the mobile communication system and storing the logical priorities in the storage.

Alternatively, the scheduling unit 3310 of the user equipment determines a logical channel priority for a logical channel at its end. This may be performed on the basis of parameters received from the ProSe entity such as group priority and/or LCG priority as well as based on further received and/or stored parameters.

The user equipment may further include a buffer 3330 for storing data to be transmitted for a logical channel; and a priority setting unit 3340 for modifying a current priority for said logical channel into a modified priority either based on own recalculation of the priority or based on a command received from a ProSe function. As described above, the modification may be performed by opening a new logical channel with the modified priority and let the logical channel with the remaining data set up until the data in the buffer are transmitted.

Alternatively, the data stored in the buffer before modification are either flushed or transmitted with the current priority depending on at least one of: whether the current priority ID higher than the modified priority; the level of the modified priority; and the cause of modification. Moreover, the user equipment may include a floor control unit 3350 that determines whether the user equipment is selected to transmit data among user equipments of the wireless communication system; if the user equipment is not selected, suspends its sidelink logical channels; and, if the data originating user equipment is selected, resumes its sidelink logical channels which were previously suspended, wherein the scheduling unit does not consider the suspended logical channels for selecting and allocating resources to.

For example, the floor control unit 3350 may determine whether or not the user equipment is to transmit data according to messages exchanged in the wireless communication system between the user equipments and/or a proximity service entity in a layer above MAC; and upon determining that the user equipment is not to transmit data, the user equipment stops transmission of own data and/or sidelink control information within a sidelink control period which is the period corresponding to one transmission of scheduling assignments and the corresponding data.

The floor control unit 3350 may also: extract, from a sidelink control information on physical layer or a medium access control, MAC, protocol data unit, PDU, received from another user equipment, a user equipment priority indicator, wherein the user equipment priority indicator indicates the priority of the user equipment or the data to be transmitted by the user equipment; compare the extracted user equipment priority indicator with an own user equipment priority stored in the user equipment or a priority of the data to be transmitted; if the own user equipment priority is lower than the extracted user equipment priority, determine that the user equipment is not selected for the transmission.

In particular, if the user equipment has the floor and receives at the same time sidelink control information from another user equipment with a higher user equipment priority, the floor control unit stops the transmission and thus leaves the floor to the other user equipment.

The user equipment priority may be carried within a MAC header of the MAC PDU and be configured by a proximity services, ProSe, entity of the wireless communication system.

The user equipment may further include a buffer status reporting unit for reporting to a network node of the wireless communication system the status of a buffer 3330 associated with the logical channel priority.

Furthermore, a network node operable in a wireless communications system supporting direct communication between user equipments is provided, the network node including: a storage with a sidelink configuration stored per user equipment and specifying a plurality of destination groups, each destination group including possible destinations for sidelink data as well as storing a logical channel priority for each logical channel out of logical channels configured for the sidelink destination groups; and a scheduling unit that: selects a sidelink destination group with a sidelink logical channel having sidelink data available for transmission with the highest logical channel priority among the sidelink logical channels having data available for transmission; and allocates radio resources to the user equipment in the selected sidelink destination group accordingly.

Moreover, the network node may further include a transmission unit for transmitting a scheduling assignment to the user equipment for which the priority determination and resource allocation has been performed. The scheduling assignment is generated by the network node based on its evaluation of priorities and resource requests from a plurality of UEs belonging to one or more groups of UEs. The network node may be a base station such as the eNB in the LTE or any other access point.

Moreover, a method is provided to be performed at a user equipment operable in a wireless communications system supporting direct communication between user equipments, the method including: storing a sidelink configuration specifying a plurality of destination groups, each destination group including possible destinations for sidelink data as well as storing a logical channel priority for each logical channel out of logical channels configured for the sidelink destination groups; and selecting a sidelink destination group with a sidelink logical channel having sidelink data available for transmission with the highest logical channel priority among the sidelink logical channels having data available for transmission, and allocating radio resources to the sidelink logical channels belonging to the selected sidelink destination group in decreasing priority order. Hardware and Software Implementation of the present disclosure According to a first aspect, the invention improves the logical channel prioritization, LCP, procedure by which a user equipment allocates the available radio resources (e.g. allocated by a grant of the eNB or selected by the UE itself from a resource pool) to the different logical channels with available ProSe data. To said end, a prioritization mechanism is introduced for the LCP procedure for managing the resource allocation between the different ProSe logical channels. Although the prioritization mechanism is mostly described as if it were part of the LCP procedure, this is not necessarily the case, and it may be alternatively considered to be external to the LCP procedure.

As discussed in the background section, different ProSe destination groups are defined. According to the first aspect, each of the plurality of ProSe destination groups is assigned one out of a plurality of different priorities, exemplarily termed ProSe destination group priority. The different ProSe destination groups are set up and managed by a corresponding ProSe function/entity in the network. According to one variant, the different ProSe destination group priorities can be likewise set up and managed in the network by said or another ProSe entity. In said case, information on the available ProSe destination groups and their corresponding priority levels shall be transmitted to the UE. On the other hand, this information on the ProSe destination groups and their corresponding priority levels can also be transmitted to the eNB so as to allow the Enb to improve its scheduling of radio resources for said user equipment. According to still another variant, the ProSe destination groups and also their ProSe destination group priority can be pre-configured in the UE (and the radio base station), such that the exchange of information over the network is not necessary.

As mentioned before, different ProSe logical channels are set up in the user equipment for ProSe direct communication, and are additionally also associated with one out of the plurality of ProSe destination groups. When ProSe data is to be transmitted, i.e. ProSe data becomes available for transmission for the ProSe logical channel(s), the UE can perform ProSe direct communication in either eNB-scheduled Resource allocation mode (also referred to as Mode 1) or UE autonomous resource selection mode (also referred to as Mode 2) depending on its configuration. In either way, the UE needs to allocate the available radio resources for ProSe transmission (be it eNB-scheduled resources, or resources from a resource pool) between the different ProSe logical channels (e.g. STCHs) by performing an LCP procedure.

The improved LCP procedure of the first aspect considers the priority of the ProSe logical channels. In particular, a user equipment is provided, operable in a wireless communications system supporting direct communication between user equipments, comprising: a storage with a sidelink configuration stored and specifying a plurality of destination groups, each destination group including possible destinations for sidelink data as well as storing a logical channel priority for each logical channel out of logical channels configured for the sidelink destination groups; a scheduling unit configured to: select a sidelink destination group with a sidelink logical channel having sidelink data available for transmission with the highest logical channel priority among the sidelink logical channels having data available for transmission, allocate radio resources to the sidelink logical channels belonging to the selected sidelink destination group in decreasing priority order.

Furthermore, a network node operable in a wireless communications system supporting direct communication between user equipments is provided, the network node comprising: a storage with a sidelink configuration stored per user equipment and specifying a plurality of destination groups, each destination group including possible destinations for sidelink data as well as storing a logical channel priority for each logical channel out of logical channels configured for the sidelink destination groups; and a scheduling unit configured to: select a sidelink destination group with a sidelink logical channel having sidelink data available for transmission with the highest logical channel priority among the sidelink logical channels having data available for transmission, allocate radio resources to the user equipment in the selected sidelink destination group accordingly.

Moreover, a method is provided to be performed at a user equipment operable in a wireless communications system supporting direct communication between user equipments, the method comprising: storing a sidelink configuration specifying a plurality of destination groups, each destination group including possible destinations for sidelink data as well as storing a logical channel priority for each logical channel out of logical channels configured for the sidelink destination groups; and selecting a sidelink destination group with a sidelink logical channel having sidelink data available for transmission with the highest logical channel priority among the sidelink logical channels having data available for transmission, and allocating radio resources to the sidelink logical channels belonging to the selected sidelink destination group in decreasing priority order.

Other exemplary embodiments relate to the implementation of the above described various embodiments using hardware and software. In this connection a user terminal (mobile terminal) and an eNodeB (base station) are provided. The user terminal and base station is adapted to perform the methods described herein, including corresponding entities to participate appropriately in the methods, such as receiver, transmitter, processors.

It is further recognized that the various embodiments may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments may also be performed or embodied by a combination of these devices.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, flash memory, registers, hard disks, CD-ROM, DVD, etc.

It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

Summarizing, the present disclosure relates to a method to be performed at a user equipment and to a user equipment operable in a wireless communications system supporting direct communication between user equipments. Accordingly, a sidelink configuration is stored in the user equipment, specifying a plurality of destination groups, each destination group including possible destinations for sidelink data as well a logical channel priority is stored for each logical channel out of logical channels configured for the sidelink destination groups. The terminal then selects a sidelink destination group with a sidelink logical channel having sidelink data available for transmission with the highest logical channel priority among the sidelink logical channels having data available for transmission, and allocates radio resources to the sidelink logical channels belonging to the selected sidelink destination group in decreasing priority order.

What is claimed is:

1. An integrated circuit for controlling a user equipment operable in a wireless communications system supporting direct communication between user equipments, the integrated circuit comprising:
control circuitry, which, in operation:
selects a sidelink destination group (ProSe destination) associated with a sidelink logical channel having a highest logical channel priority among sidelink logical channels, which have data available for transmission in a sidelink control period (SC period) and which have not previously been selected in the same sidelink control period, wherein each of the sidelink logical channel belongs to a sidelink destination group, each of the sidelink logical channels is allocated to a logical channel group (LCG) depending on a priority of said each sidelink logical channel and on a priority of the logical channel group, and the logical channel group is defined per sidelink destination group; and
allocates radio resources to sidelink logical channels belonging to the selected sidelink destination group in decreasing priority order; and
transmitting circuitry, which, in operation, transmits the data using the allocated radio resources.

2. The integrated circuit according to claim 1, wherein the logical channel priority depends on at least one factor chosen from:
a destination group priority associated with the sidelink destination group;
a logical channel group priority associated with a group of logical channels, grouped according to a data type;
a geographical location of the user equipment;
an emergency level in which the user equipment is operating; or
a user equipment identifier.

3. The integrated circuit according to claim 1, further comprising:
receiving circuitry, which, in operation, receives an indication of logical channel priorities of the respective logical channels determined by a ProSe (proximity services) function in a ProSe entity of the wireless communications system, and stores the logical priorities.

4. The integrated circuit according to claim 1, wherein the control circuitry, in operation, determines a logical channel priority of a logical channel.

5. The integrated circuit according to claim 1, further comprising:
a buffer, which, in operation, stores data to be transmitted for a logical channel; wherein,
the control circuitry, in operation, modifies a current priority of said logical channel into a modified priority either based on own recalculation of the priority or based on a command received from a ProSe function.

6. The integrated circuit according to claim 5, wherein the data stored in the buffer before modification are either flushed or transmitted with the current priority depending on at least one factor chosen from:
a comparative determination of whether the current priority is higher than the modified priority;
a level of the modified priority; or
a cause of the modification.

7. The integrated circuit according to claim 1, wherein the control circuitry, in operation:
determines that the user equipment is selected or not selected to transmit data among the user equipments of the wireless communications system;
responsive to determining that the user equipment is not selected, suspends sidelink logical channels associated with the user equipment and does not select or allocate resources to the suspended sidelink logical channels; and
responsive to determining that the user equipment is selected, resumes the sidelink logical channels which were previously suspended.

8. The integrated circuit according to claim 7, wherein the control circuitry, in operation: determines that the user equipment is not to transmit data, according to messages exchanged in the wireless communications system between the user equipments and/or a proximity service entity in a layer above MAC (medium access control), and responsive to determining that the user equipment is not to transmit data, stops transmission of data and/or sidelink control information.

9. The integrated circuit according to claim 7, wherein the control circuitry, in operation:
   extracts, from sidelink control information on physical layer or a MAC (medium access control) PDU (protocol data unit), received from another user equipment, a user equipment priority indicator;
   compares the extracted user equipment priority indicator with an own user equipment priority stored in the user equipment or a priority of the data to be transmitted; and
   responsive to the own user equipment priority being lower than the extracted user equipment priority indicator, determines that the user equipment is not selected to transmit data.

10. The integrated circuit according to claim 9, wherein, responsive to the user equipment having a floor and receiving sidelink control information from another user equipment with a higher user equipment priority, the control circuitry stops transmission of the data via the transmitting circuitry.

11. The integrated circuit according to claim 9, wherein the user equipment priority indicator is carried within a MAC header of the MAC PDU and is configured by a ProSe (proximity services) entity of the wireless communications system.

12. The integrated circuit according to claim 1, wherein the control circuitry, in operation, reports to a network node of the wireless communications system a status of a buffer associated with a logical channel priority.

13. The integrated circuit according to claim 1, wherein the control circuitry, in operation, selects the radio resources to be allocated from a resource pool, and selects the resource pool among a plurality of resource pools according to a priority associated with the selected sidelink destination group or a logical channel priority associated with a logical channel from which the data is to be transmitted.

* * * * *